(12) United States Patent
Niv

(10) Patent No.: US 12,009,737 B2
(45) Date of Patent: Jun. 11, 2024

(54) POWER SUPPLY WITH CONTROLLED SHUNTING ELEMENT

(71) Applicant: ETA-BAR LTD., Petach-Tikva (IL)

(72) Inventor: Nehemia Niv, Petach-Tikva (IL)

( * ) Notice: Subject to any disclaimer, the term of this patent is extended or adjusted under 35 U.S.C. 154(b) by 238 days.

(21) Appl. No.: 17/588,350

(22) Filed: Jan. 31, 2022

(65) Prior Publication Data

US 2022/0231596 A1 Jul. 21, 2022

Related U.S. Application Data

(62) Division of application No. 16/462,945, filed as application No. PCT/IB2017/057373 on Nov. 23, 2017, now Pat. No. 11,277,065.

(Continued)

(51) Int. Cl.
*H02M 1/32* (2007.01)
*H02M 1/08* (2006.01)
(Continued)

(52) U.S. Cl.
CPC .............. *H02M 1/32* (2013.01); *H02M 1/083* (2013.01); *H02M 7/217* (2013.01); *H02M 1/322* (2021.05); *H02M 5/4585* (2013.01); *H02M 7/062* (2013.01)

(58) Field of Classification Search
CPC .......... H02M 1/12; H02M 1/32; H02M 1/322; H02M 3/3155; H02M 3/158; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; G05F 1/30; G05F 1/33; G05F 1/32; G05F 1/34; G05F 1/38; G05F 1/52; H02J 7/12

See application file for complete search history.

(56) References Cited

U.S. PATENT DOCUMENTS 3,355,650 A 11/1967 Tolmie
3,978,388 A 8/1976 De Vries
(Continued)

FOREIGN PATENT DOCUMENTS

EP 0891039 A2 1/1999

*Primary Examiner* — Jeffrey A Gblende

(57) ABSTRACT

An integrated circuit including a power supply including an AC input, an AC to DC rectifier, a DC output of the rectifier, a switch for shunting the AC input, and a controller including a first connection to the DC output, a second connection to the AC input, wherein the controller is configured to monitor the DC output, determine if the DC output is within a first threshold of a desired output, monitor instantaneous AC voltage across the AC input, determine if an absolute difference of the AC input from zero voltage is less than a second threshold, and if the DC output is within the first threshold and the absolute difference of the instantaneous AC input from zero voltage is less than the second threshold, then provide a command to the switch to shunt the AC input. Related apparatus and methods are also described.

19 Claims, 77 Drawing Sheets

Related U.S. Application Data

(60) Provisional application No. 62/425,943, filed on Nov. 23, 2016.

(51) Int. Cl.
*H02M 7/217* (2006.01)
*H02M 5/458* (2006.01)
*H02M 7/06* (2006.01)

(56) References Cited

U.S. PATENT DOCUMENTS

| | | |
|---|---|---|
| 7,483,280 B2 | 1/2009 | Benabdelaziz et al. |
| 8,710,804 B2 | 4/2014 | Ptacek et al. |
| 10,027,243 B2 * | 7/2018 | Mallory ............... H02H 7/1252 |
| 10,158,300 B2 * | 12/2018 | Newman, Jr. .......... H05B 45/37 |
| 10,389,282 B2 * | 8/2019 | Tsukii ................ H02M 1/4225 |
| 11,277,065 B2 * | 3/2022 | Niv ....................... H02M 1/083 |
| 2002/0075708 A1 | 6/2002 | Van Den Berg et al. |
| 2005/0117374 A1 | 6/2005 | Sheehy et al. |
| 2010/0309694 A1 | 12/2010 | Huang et al. |
| 2011/0025278 A1 | 2/2011 | Balakrishnan et al. |
| 2011/0057724 A1 | 3/2011 | Pabon |
| 2014/0056039 A1 | 2/2014 | Laletin et al. |
| 2014/0233285 A1 | 8/2014 | Nishijima |
| 2014/0320007 A1 | 10/2014 | Stamm et al. |
| 2015/0062987 A1 | 3/2015 | Chen |
| 2015/0263511 A1 | 9/2015 | Sandner et al. |
| 2016/0111892 A1 * | 4/2016 | Joehren .................. H02M 1/32 307/104 |

\* cited by examiner

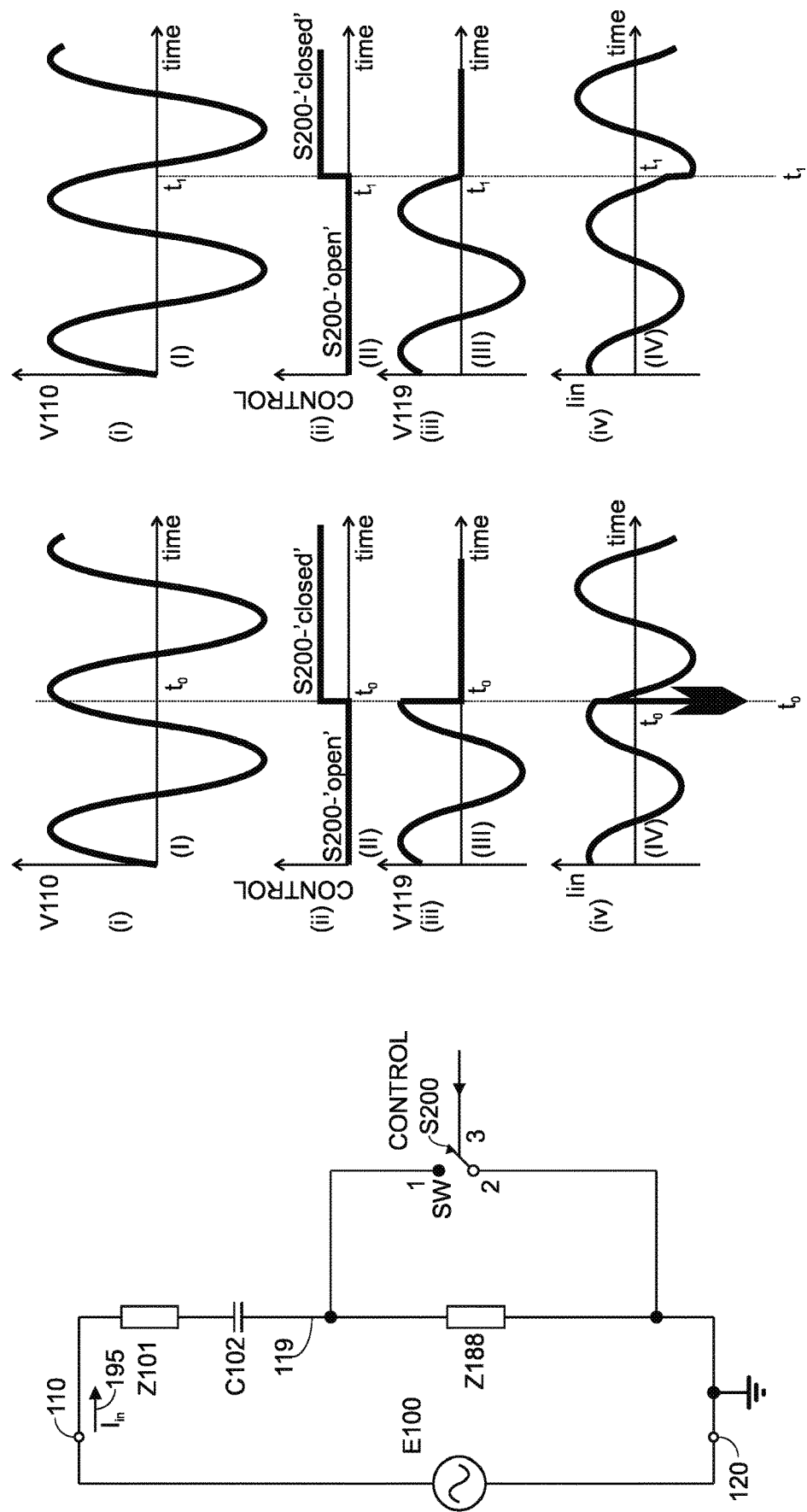

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10µF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C25 | CAPACITOR | 150nF | 50V | AVX |
| 11 | D1 | CIDACTOR | P0640SCLRP | | LittleFuse |
| 12 | D2 | DIODE | S1BB | | Diodes Incorporated |
| 13 | D3 | DIODE | S1BB | | Diodes Incorporated |
| 14 | D4 | DIODE | BAS16 | | Fairchild |
| 15 | D5 | ZENER DIODE | 1N4751A | | Fairchild |
| 16 | Q1 | N-CHANNEL MOSFET | BUK9K18-40E | | NXP |
| 17 | Q2 | N-CHANNEL MOSFET | BUK9K18-40E | | NXP |
| 18 | Q3 | N-CHANNEL MOSFET | 2N7002K | | Fairchild |
| 19 | Q4 | N-CHANNEL MOSFET | 2N7002K | | Fairchild |
| 20 | Q6 | N-CHANNEL MOSFET | 2N7002K | | Fairchild |
| 21 | R1 | RESISTOR | 10Ω | 2 Watt | VISHAY |
| 22 | R2 | RESISTOR | 2MΩ 1% | 0.125 Watt | VISHAY |
| 23 | R3 | RESISTOR | 2MΩ 1% | 0.125 Watt | VISHAY |
| 24 | R4 | RESISTOR | 300KΩ 1% | 0.125 Watt | VISHAY |
| 25 | R5 | RESISTOR | 300KΩ 1% | 0.125 Watt | VISHAY |
| 26 | R6 | RESISTOR | 20MΩ 1% | 0.125 Watt | VISHAY |
| 27 | R7 | RESISTOR | 10MΩ 1% | 0.125 Watt | VISHAY |
| 28 | R8 | RESISTOR | 1MΩ 1% | 0.125 Watt | VISHAY |
| 29 | R9 | RESISTOR | 3MΩ 1% | 0.125 Watt | VISHAY |
| 30 | R10 | RESISTOR | 604KΩ 1% | 0.125 Watt | VISHAY |

FIG. 16

| NO. | REF | DESCRIPTION | VALUE | MANUFACTURER |
|---|---|---|---|---|
| 31 | R11 | RESISTOR | 2MΩ 1%   0.125 Watt | VISHAY |
| 32 | R12 | RESISTOR | 1MΩ 1%   0.125 Watt | VISHAY |
| 33 | R13 | RESISTOR | 2MΩ 1%   0.125 Watt | VISHAY |
| 34 | R14 | RESISTOR | 5.1MΩ 1%   0.125 Watt | VISHAY |
| 35 | R15 | RESISTOR | 10MΩ 1%   0.125 Watt | VISHAY |
| 36 | R16 | RESISTOR | 1MΩ 1%   0.125 Watt | VISHAY |
| 37 | R17 | RESISTOR | 5.1MΩ 1%   0.125 Watt | VISHAY |
| 38 | R35 | RESISTOR | 0.5Ω 1%   0.125 Watt | VISHAY |
| 39 | R36 | RESISTOR | 0.5Ω 1%   0.125 Watt | VISHAY |
| 40 | R103 | RESISTOR | 6.2MΩ 1%   0.125 Watt | VISHAY |
| 41 | U1 | I.C. | TLV70450DBVR | TI |
| 42 | U2 | I.C. | TLV3701 | TI |
| 43 | U3 | I.C. | TLV3201 | TI |
| 44 | U4 | I.C. | TC7SE14FU | TOSHIBA |
| 45 | U5 | I.C. | 74AHC1G86 | NXP |
| 46 | U6 | I.C. | NC7SZ175P6X | Fairchild |
| 47 | U7 | I.C. | 74HC221PWR | NXP |

FIG. 17

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10μF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C25 | CAPACITOR | 150nF | 50V | AVX |
| 11 | D1 | CIDACTOR | P0640SCLRP | | LittleFuse |
| 12 | D2 | DIODE | S1BB | | Diodes Incorporated |
| 13 | D3 | DIODE | S1BB | | Diodes Incorporated |
| 14 | D5 | ZENER DIODE | 1N4751A | | Fairchild |
| 15 | D8 | DIODE | BAS16 | | Fairchild |
| 16 | Q1 | N-CHANNEL MOSFET | BUK9K18-40E | | NXP |
| 17 | Q2 | N-CHANNEL MOSFET | BUK9K18-40E | | NXP |
| 18 | R1 | RESISTOR | 10Ω | 2 Watt | VISHAY |
| 19 | R2 | RESISTOR | 2MΩ 1% | 0.125 Watt | VISHAY |
| 20 | R3 | RESISTOR | 2MΩ 1% | 0.125 Watt | VISHAY |
| 21 | R4 | RESISTOR | 300KΩ 1% | 0.125 Watt | VISHAY |
| 22 | R5 | RESISTOR | 300KΩ 1% | 0.125 Watt | VISHAY |
| 23 | R8 | RESISTOR | 1MΩ 1% | 0.125 Watt | VISHAY |
| 24 | R9 | RESISTOR | 3MΩ 1% | 0.125 Watt | VISHAY |
| 25 | R10 | RESISTOR | 604KΩ 1% | 0.125 Watt | VISHAY |
| 26 | R11 | RESISTOR | 2MΩ 1% | 0.125 Watt | VISHAY |
| 27 | R12 | RESISTOR | 1MΩ 1% | 0.125 Watt | VISHAY |
| 28 | R13 | RESISTOR | 2MΩ 1% | 0.125 Watt | VISHAY |
| 29 | R13 | RESISTOR | 2MΩ 1% | 0.125 Watt | VISHAY |
| 30 | R17 | RESISTOR | 200KΩ 1% | 0.125 Watt | VISHAY |
| 31 | R103 | RESISTOR | 6.2MΩ 1% | 0.125 Watt | VISHAY |
| 32 | U1 | I.C. | TLV70450DBVR | | TI |
| 33 | U2 | I.C. | TLV3701 | | TI |
| 34 | U3 | I.C. | TLV3201 | | TI |
| 35 | U4 | I.C. | TC7SE14FU | | TOSHIBA |
| 36 | U5 | I.C. | 74AHC1G86 | | NXP |
| 37 | U6 | I.C. | NC7SZ175P6X | | Fairchild |
| 38 | U7 | I.C. | 74HC221PWR | | NXP |

FIG. 19

| NO. | REF | DESCRIPTION | VALUE | | MANUFACTURER |
|---|---|---|---|---|---|
| 1 | C30 | CAPACITOR | 10pF | 630V | AVX |
| 2 | D20 | ZENER DIODE | MMBZ5244BLT1G | | On Semi |
| 3 | D21 | ZENER DIODE | MMBZ5244BLT1G | | On Semi |
| 4 | D22 | DIODE | BAV99 | | Fairchild |
| 5 | Q20 | N-CHANNEL MOSFET | BSS127S | | Diode Incorporated |
| 6 | Q21 | N-CHANNEL MOSFET | BSS127S | | Diode Incorporated |
| 7 | Q22 | N-CHANNEL MOSFET | 2B7002K | | Fairchild |
| 8 | R121 | RESISTOR | 100MΩ | 0.125 Watt | VISHAY |
| 9 | R122 | RESISTOR | 100MΩ | 0.125 Watt | VISHAY |
| 10 | R123 | RESISTOR | 100MΩ | 0.125 Watt | VISHAY |
| 11 | R124 | RESISTOR | 470KΩ | 0.125 Watt | VISHAY |
| 12 | R125 | RESISTOR | 470KΩ | 0.125 Watt | VISHAY |

FIG. 24A

| NO. | REF | DESCRIPTION | VALUE | | MANUFACTURER |
|---|---|---|---|---|---|
| 1 | C30 | CAPACITOR | 10pF | 630V | AVX |
| 2 | D20 | ZENER DIODE | MMBZ5244BLT1G | | On Semi |
| 3 | D21 | ZENER DIODE | MMBZ5244BLT1G | | On Semi |
| 4 | D22 | DIODE | BAV99 | | Fairchild |
| 5 | Q20 | N-CHANNEL MOSFET | BSS127S | | Diode Incorporated |
| 6 | Q21 | N-CHANNEL MOSFET | BSS127S | | Diode Incorporated |
| 7 | Q22 | N-CHANNEL MOSFET | 2B7002K | | Fairchild |
| 8 | R121 | RESISTOR | 100MΩ | 0.125 Watt | VISHAY |
| 9 | R122 | RESISTOR | 100MΩ | 0.125 Watt | VISHAY |
| 10 | R123 | RESISTOR | 100MΩ | 0.125 Watt | VISHAY |
| 11 | R124 | RESISTOR | 10KΩ | 0.125 Watt | VISHAY |
| 12 | R125 | RESISTOR | 10KΩ | 0.125 Watt | VISHAY |
| 13 | R126 | RESISTOR | 10KΩ | 0.125 Watt | VISHAY |
| 14 | R127 | RESISTOR | 10KΩ | 0.125 Watt | VISHAY |

FIG. 24B

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10µF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C30 | CAPACITOR | 10pF | 630V | AVX |
| 11 | C25 | CAPACITOR | 150nF | 50V | AVX |
| 12 | D1 | CIDACTOR | P0640SCLRP | | LittleFuse |
| 13 | D2 | DIODE | S1BB | | Diodes Incorporated |
| 14 | D3 | DIODE | S1BB | | Diodes Incorporated |
| 15 | D5 | ZENER DIODE | 1N4751A | | Fairchild |
| 16 | D8 | DIODE | BAS16 | | Fairchild |
| 17 | Q1 | N-CHANNEL MOSFET | BUK9K18-40E | | NXP |
| 18 | Q2 | N-CHANNEL MOSFET | BUK9K18-40E | | NXP |
| 19 | Q20 | N-CHANNEL MOSFET | BSS127S | | Diode Incorporated |
| 20 | Q21 | N-CHANNEL MOSFET | BSS127S | | Diode Incorporated |
| 21 | Q22 | N-CHANNEL MOSFET | 2B7002K | | Fairchild |
| 22 | R1 | RESISTOR | 10Ω | 2 Watt | VISHAY |
| 23 | R2 | RESISTOR | 2MΩ 1% | 0.125 Watt | VISHAY |
| 24 | R3 | RESISTOR | 2MΩ 1% | 0.125 Watt | VISHAY |

FIG. 26

| NO. | REF | DESCRIPTION | VALUE | MANUFACTURER |
|---|---|---|---|---|
| 25 | R4 | RESISTOR | 300KΩ 1%    0.125 Watt | VISHAY |
| 26 | R5 | RESISTOR | 300KΩ 1%    0.125 Watt | VISHAY |
| 27 | R8 | RESISTOR | 1MΩ 1%    0.125 Watt | VISHAY |
| 28 | R9 | RESISTOR | 3MΩ 1%    0.125 Watt | VISHAY |
| 29 | R10 | RESISTOR | 604KΩ 1%    0.125 Watt | VISHAY |
| 30 | R11 | RESISTOR | 2MΩ 1%    0.125 Watt | VISHAY |
| 31 | R12 | RESISTOR | 1MΩ 1%    0.125 Watt | VISHAY |
| 32 | R13 | RESISTOR | 2MΩ 1%    0.125 Watt | VISHAY |
| 33 | R17 | RESISTOR | 200KΩ 1%    0.125 Watt | VISHAY |
| 34 | R18 | RESISTOR | 100MΩ 1%    0.125 Watt | VISHAY |
| 35 | R121 | RESISTOR | 100MΩ    0.125 Watt | VISHAY |
| 36 | R122 | RESISTOR | 100MΩ    0.125 Watt | VISHAY |
| 37 | R123 | RESISTOR | 100MΩ    0.125 Watt | VISHAY |
| 38 | R124 | RESISTOR | 470KΩ    0.125 Watt | VISHAY |
| 39 | R125 | RESISTOR | 470KΩ    0.125 Watt | VISHAY |
| 40 | U1 | I.C. | TLV70450DBVR | TI |
| 41 | U2 | I.C. | TLV3701 | TI |
| 42 | U3 | I.C. | TLV3201 | TI |
| 43 | U4 | I.C. | TC7SE14FU | TOSHIBA |
| 44 | U5 | I.C. | 74AHC1G86 | NXP |
| 45 | U6 | I.C. | NC7SZ175P6X | Fairchild |
| 46 | U7 | I.C. | 74HC221PWR | NXP |

FIG. 27

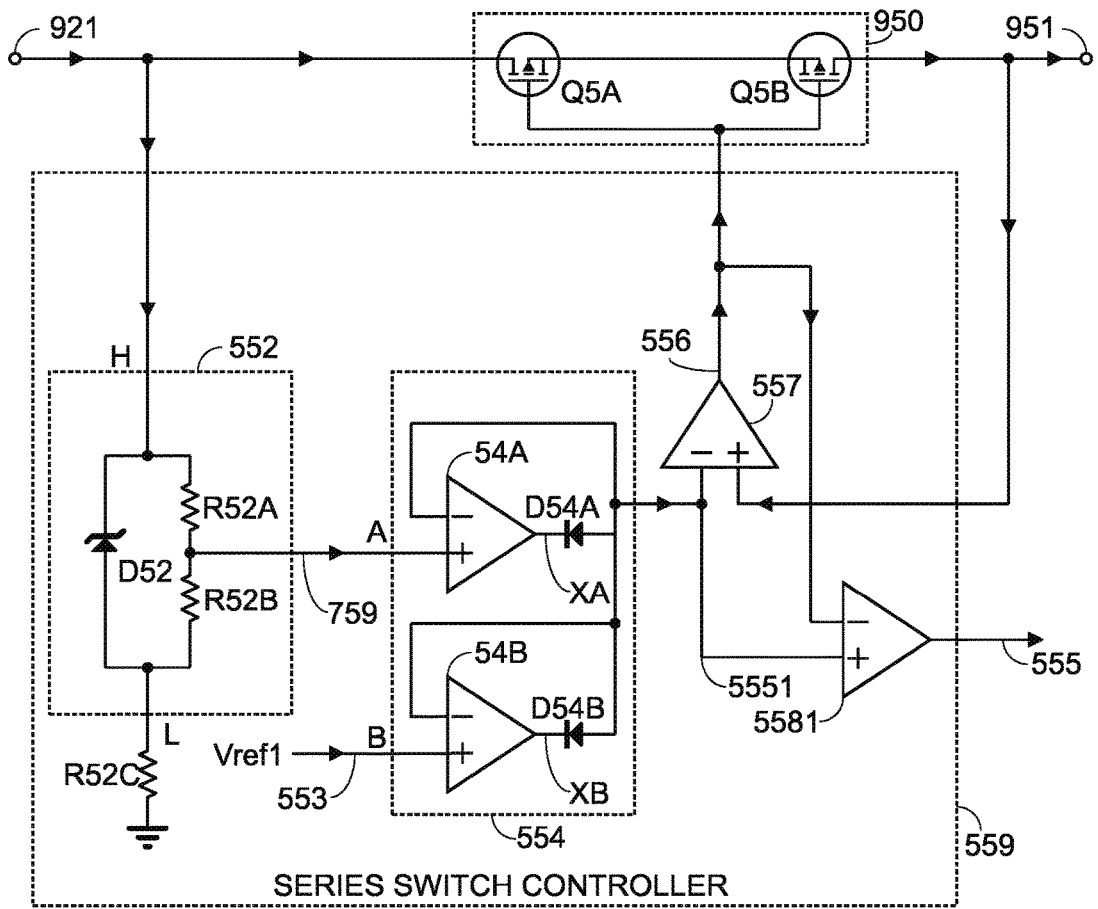
FIG. 31A
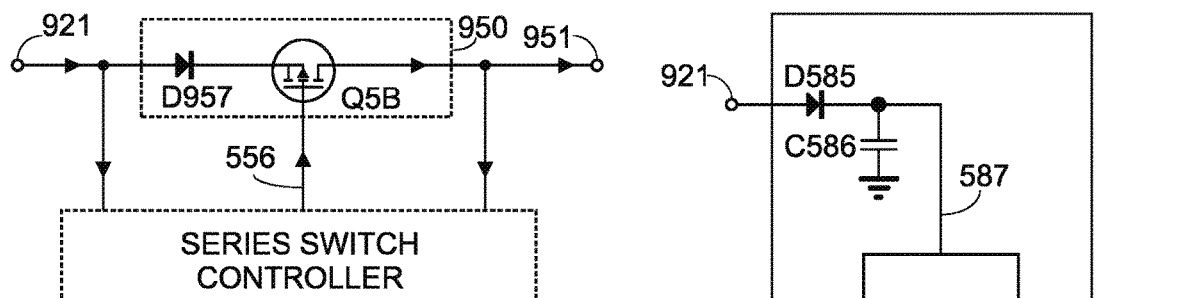
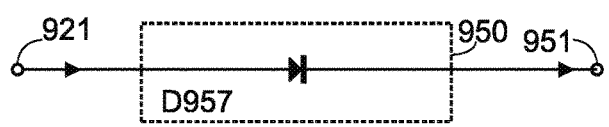
FIG. 31B
FIG. 31C
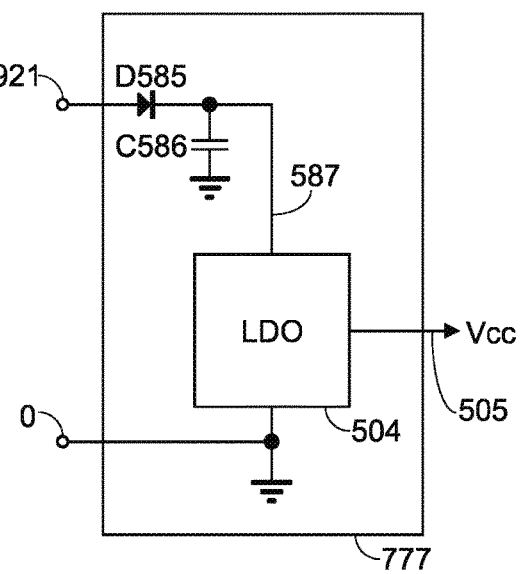
FIG. 31D

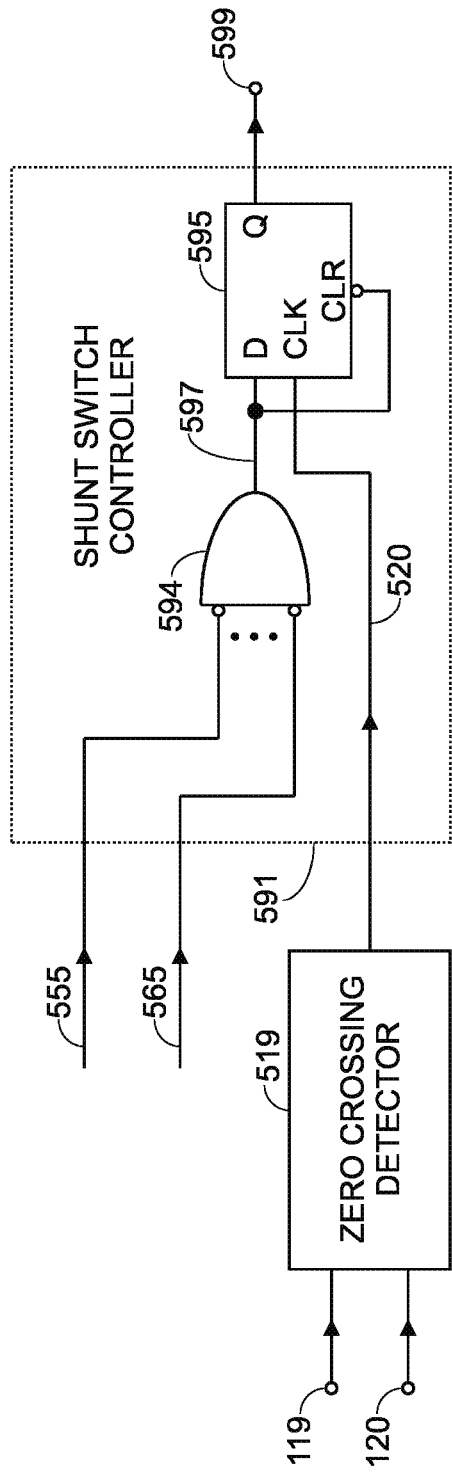
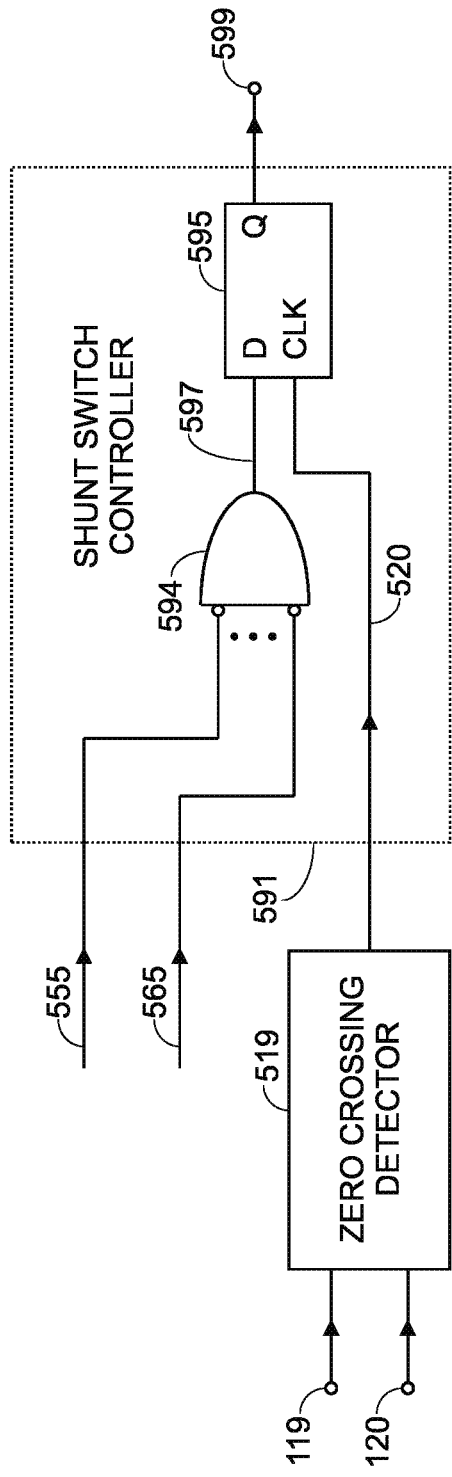
FIG. 32A
FIG. 32B

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10µF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C10 | CAPACITOR | 100nF | 50V | AVX |
| 11 | C11 | CAPACITOR | 100nF | 50V | AVX |
| 12 | C12 | CAPACITOR | 100nF | 50V | AVX |
| 13 | C13 | CAPACITOR | 100nF | 50V | AVX |
| 14 | C14 | CAPACITOR | 100nF | 50V | AVX |
| 15 | C15 | CAPACITOR | 1nF | 50V | AVX |
| 16 | C16 | CAPACITOR | 10nF | 50V | AVX |
| 17 | C17 | CAPACITOR | 100nF | 50V | AVX |
| 18 | C18 | ELECT. CAPACITOR | 47uF | 35V | AVX |
| 19 | C25 | CAPACITOR | 150nF | 50V | AVX |
| 20 | D1 | CIDACTOR | P0640SCLRP | | LittleFuse |
| 21 | D2 | DIODE | S1BB | | Diodes Incorporated |
| 22 | D3 | DIODE | S1BB | | Diodes Incorporated |
| 23 | D4 | DIODE | BAS16 | | Fairchild |
| 24 | D5 | ZENER DIODE | 1N4751A | | Fairchild |
| 25 | D6 | SCHOTTKY DIODE | DB3X407KDL | | Panasonic |
| 26 | D7 | SCHOTTKY DIODE | DB3X407KDL | | Panasonic |
| 27 | D10 | DIODE | BAS16 | | Fairchild |
| 28 | Q1 | N-CHANNEL MOSFET | BUK9K18-40E | | NXP |
| 29 | Q2 | N-CHANNEL MOSFET | BUK9K18-40E | | NXP |
| 30 | Q3 | N-CHANNEL MOSFET | 2N7002K | | Fairchild |
| 31 | Q4 | N-CHANNEL MOSFET | 2N7002K | | Fairchild |
| 32 | Q6 | N-CHANNEL MOSFET | 2N7002K | | Fairchild |
| 33 | Q7 | N-CHANNEL MOSFET | 2N7002K | | Fairchild |
| 34 | Q8 | P-CHANNEL MOSFET | BSS83P | | Infineon |
| 35 | Q9 | P-CHANNEL MOSFET | BSS83P | | Infineon |
| 36 | Q10 | P-CHANNEL MOSFET | BSS83P | | Infineon |
| 37 | Q17 | N-CHANNEL MOSFET | 2N7002K | | Fairchild |
| 38 | R1 | RESISTOR | 10Ω | 2 Watt | VISHAY |
| 39 | R2 | RESISTOR | 2MΩ 1% | 0.125 Watt | VISHAY |
| 40 | R3 | RESISTOR | 2MΩ 1% | 0.125 Watt | VISHAY |

FIG. 36

| NO. | REF | DESCRIPTION | VALUE | MANUFACTURER |
|---|---|---|---|---|
| 40 | R4 | RESISTOR | 300KΩ 1%    0.125 Watt | VISHAY |
| 41 | R5 | RESISTOR | 300KΩ 1%    0.125 Watt | VISHAY |
| 42 | R6 | RESISTOR | 20MΩ 1%    0.125 Watt | VISHAY |
| 43 | R7 | RESISTOR | 10MΩ 1%    0.125 Watt | VISHAY |
| 44 | R8 | RESISTOR | 1MΩ 1%    0.125 Watt | VISHAY |
| 45 | R9 | RESISTOR | 3MΩ 1%    0.125 Watt | VISHAY |
| 46 | R10 | RESISTOR | 604KΩ 1%    0.125 Watt | VISHAY |
| 47 | R11 | RESISTOR | 2MΩ 1%    0.125 Watt | VISHAY |
| 48 | R12 | RESISTOR | 1MΩ 1%    0.125 Watt | VISHAY |
| 49 | R13 | RESISTOR | 2MΩ 1%    0.125 Watt | VISHAY |
| 50 | R14 | RESISTOR | 5.1MΩ 1%    0.125 Watt | VISHAY |
| 51 | R15 | RESISTOR | 10MΩ 1%    0.125 Watt | VISHAY |
| 52 | R16 | RESISTOR | 1MΩ 1%    0.125 Watt | VISHAY |
| 53 | R17 | RESISTOR | 5.1MΩ 1%    0.125 Watt | VISHAY |
| 54 | R20 | RESISTOR | 51KΩ 1%    0.125 Watt | VISHAY |
| 55 | R21 | RESISTOR | 5.6MΩ 1%    0.125 Watt | VISHAY |
| 56 | R22 | RESISTOR | 604KΩ 1%    0.125 Watt | VISHAY |
| 57 | R23 | RESISTOR | 20MΩ 1%    0.125 Watt | VISHAY |
| 58 | R24 | RESISTOR | 6.2MΩ 1%    0.125 Watt | VISHAY |
| 59 | R25 | RESISTOR | 604KΩ 1%    0.125 Watt | VISHAY |
| 60 | R26 | RESISTOR | 4.02MΩ 1%    0.125 Watt | VISHAY |
| 61 | R27 | RESISTOR | 6.2MΩ 1%    0.125 Watt | VISHAY |
| 62 | R28 | RESISTOR | 4.7MΩ 1%    0.125 Watt | VISHAY |
| 63 | R29 | RESISTOR | 1.85MΩ 1%    0.125 Watt | VISHAY |
| 64 | R31 | RESISTOR | 1MΩ 1%    0.125 Watt | VISHAY |
| 65 | R30 | RESISTOR | 1MΩ 1%    0.125 Watt | VISHAY |
| 66 | R32 | RESISTOR | 5.1MΩ 1%    0.125 Watt | VISHAY |
| 67 | R35 | RESISTOR | 0.5Ω 1%    0.125 Watt | VISHAY |
| 68 | R36 | RESISTOR | 0.5Ω 1%    0.125 Watt | VISHAY |
| 69 | R103 | RESISTOR | 6.2MΩ 1%    0.125 Watt | VISHAY |
| 70 | U1 | I.C. | TLV70450DBVR | TI |
| 71 | U3 | I.C. | TLV3201 | TI |
| 72 | U4 | I.C. | TC7SE14FU | TOSHIBA |
| 73 | U5 | I.C. | 74AHC1G86 | NXP |
| 74 | U6 | I.C. | NC7SZ175P6X | Fairchild |
| 75 | U7 | I.C. | 74HC221PWR | NXP |
| 76 | U8 | I.C. | TLV3704D | TI |
| 77 | U9 | I.C. | 74HC02D | NXP |
| 78 | U10 | I.C. | 74HC74 | ON-Semi |
| 79 | U11 | I.C. | 74HC74 | ON-Semi |
| 80 | RL1 | RELAY | ALE12B24 | Panasonic |
| 81 | PB1 | PushButton Switch | D6R90 F1 | C&K |

FIG. 37

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10μF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C10 | CAPACITOR | 100nF | 50V | AVX |
| 11 | C11 | CAPACITOR | 100nF | 50V | AVX |
| 12 | C12 | CAPACITOR | 100nF | 50V | AVX |
| 13 | C13 | CAPACITOR | 100nF | 50V | AVX |
| 14 | C14 | CAPACITOR | 100nF | 50V | AVX |
| 15 | C15 | CAPACITOR | 1nF | 50V | AVX |
| 16 | C16 | CAPACITOR | 10nF | 50V | AVX |
| 17 | C17 | CAPACITOR | 100nF | 50V | AVX |
| 18 | C18 | ELECT. CAPACITOR | 47uF | 35V | AVX |
| 19 | C25 | CAPACITOR | 150nF | 50V | AVX |
| 20 | C26 | CAPACITOR | 1nF | 50V | AVX |
| 21 | D1 | CIDACTOR | P0640SCLRP | | LittleFuse |
| 22 | D2 | DIODE | S1BB | | Diodes Incorporated |
| 23 | D3 | DIODE | S1BB | | Diodes Incorporated |
| 24 | D4 | DIODE | BAS16 | | Fairchild |
| 25 | D5 | ZENER DIODE | 1N4751A | | Fairchild |
| 26 | D6 | SCHOTTKY DIODE | DB3X407KDL | | Panasonic |
| 27 | D7 | SCHOTTKY DIODE | DB3X407KDL | | Panasonic |
| 28 | D8 | DIODE | BAS16 | | Fairchild |
| 29 | D10 | DIODE | BAS16 | | Fairchild |
| 30 | D11 | DIODE | BAS16 | | Fairchild |
| 31 | Q1 | N-CHANNEL MOSFET | BUK9K18-40E | | NXP |
| 32 | Q2 | N-CHANNEL MOSFET | BUK9K18-40E | | NXP |
| 33 | Q3 | N-CHANNEL MOSFET | 2N7002K | | Fairchild |
| 34 | Q4 | N-CHANNEL MOSFET | 2N7002K | | Fairchild |
| 35 | Q7 | N-CHANNEL MOSFET | 2N7002K | | Fairchild |
| 36 | Q8 | P-CHANNEL MOSFET | BSS83P | | Infineon |
| 37 | Q9 | N-CHANNEL MOSFET | 2N7002K | | Fairchild |
| 38 | Q9 | N-CHANNEL MOSFET | 2N7002K | | Fairchild |
| 39 | Q17 | N-CHANNEL MOSFET | 2N7002K | | Fairchild |
| 40 | R1 | RESISTOR | 10Ω | 2 Watt | VISHAY |
| 41 | R2 | RESISTOR | 2MΩ 1% | 0.125 Watt | VISHAY |
| 42 | R3 | RESISTOR | 2MΩ 1% | 0.125 Watt | VISHAY |

FIG. 40

| NO. | REF | DESCRIPTION | VALUE | MANUFACTURER |
|---|---|---|---|---|
| 43 | R4 | RESISTOR | 300KΩ 1%     0.125 Watt | VISHAY |
| 44 | R5 | RESISTOR | 300KΩ 1%     0.125 Watt | VISHAY |
| 45 | R6 | RESISTOR | 20MΩ 1%      0.125 Watt | VISHAY |
| 46 | R7 | RESISTOR | 10MΩ 1%      0.125 Watt | VISHAY |
| 47 | R8 | RESISTOR | 1MΩ 1%       0.125 Watt | VISHAY |
| 48 | R9 | RESISTOR | 3MΩ 1%       0.125 Watt | VISHAY |
| 49 | R10 | RESISTOR | 604KΩ 1%    0.125 Watt | VISHAY |
| 50 | R11 | RESISTOR | 2MΩ 1%       0.125 Watt | VISHAY |
| 51 | R12 | RESISTOR | 1MΩ 1%       0.125 Watt | VISHAY |
| 52 | R13 | RESISTOR | 2MΩ 1%       0.125 Watt | VISHAY |
| 53 | R14 | RESISTOR | 5.1MΩ 1%     0.125 Watt | VISHAY |
| 54 | R15 | RESISTOR | 10MΩ 1%      0.125 Watt | VISHAY |
| 55 | R16 | RESISTOR | 1MΩ 1%       0.125 Watt | VISHAY |
| 56 | R17 | RESISTOR | 200KΩ 1%    0.125 Watt | VISHAY |
| 57 | R18 | RESISTOR | 100MΩ 1%    0.125 Watt | VISHAY |
| 58 | R20 | RESISTOR | 51KΩ 1%      0.125 Watt | VISHAY |
| 59 | R21 | RESISTOR | 5.6MΩ 1%     0.125 Watt | VISHAY |
| 60 | R22 | RESISTOR | 604KΩ 1%    0.125 Watt | VISHAY |
| 61 | R23 | RESISTOR | 20MΩ 1%      0.125 Watt | VISHAY |
| 62 | R24 | RESISTOR | 6.2MΩ 1%     0.125 Watt | VISHAY |
| 63 | R25 | RESISTOR | 604KΩ 1%    0.125 Watt | VISHAY |
| 64 | R26 | RESISTOR | 4.02MΩ 1%   0.125 Watt | VISHAY |
| 65 | R27 | RESISTOR | 6.2MΩ 1%     0.125 Watt | VISHAY |
| 66 | R28 | RESISTOR | 4.7MΩ 1%     0.125 Watt | VISHAY |
| 67 | R29 | RESISTOR | 1.85MΩ 1%   0.125 Watt | VISHAY |
| 68 | R30 | RESISTOR | 1MΩ 1%       0.125 Watt | VISHAY |
| 69 | R31 | RESISTOR | 1MΩ 1%       0.125 Watt | VISHAY |
| 70 | R32 | RESISTOR | 5.1MΩ 1%     0.125 Watt | VISHAY |
| 71 | R33 | RESISTOR | 200KΩ 1%    0.125 Watt | VISHAY |
| 72 | R103 | RESISTOR | 6.2MΩ 1%     0.125 Watt | VISHAY |
| 73 | U1 | I.C. | TLV70450DBVR | TI |
| 74 | U3 | I.C. | TLV3201 | TI |
| 75 | U4 | I.C. | TC7SE14FU | TOSHIBA |
| 76 | U5 | I.C. | 74AHC1G86 | NXP |
| 77 | U6 | I.C. | NC7SZ175P6X | Fairchild |
| 78 | U7 | I.C. | 74HC221PWR | NXP |
| 79 | U8 | I.C. | TLV3704D | TI |
| 80 | U9 | I.C. | 74HC02D | NXP |
| 81 | U10 | I.C. | 74HC74 | ON-Semi |
| 82 | U11 | I.C. | 74HC74 | ON-Semi |
| 83 | RL1 | RELAY | ALE12B24 | Panasonic |
| 84 | PB1 | PushButton Switch | D6R90 F1 | C&K |

FIG. 41

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10μF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C25 | CAPACITOR | 150nF | 50V | AVX |
| 11 | C38 | CAPACITOR | 100nF | 50V | AVX |
| 12 | D1 | CIDACTOR | P0640SCLRP | | LittleFuse |
| 13 | D2 | DIODE | S1BB | | Diodes Incorporated |
| 14 | D3 | DIODE | S1BB | | Diodes Incorporated |
| 15 | D4 | DIODE | BAS16 | | Fairchild |
| 16 | D5 | ZENER DIODE | 1N4742A | | VISHAY |
| 17 | D11 | ZENER DIODE | 1N4742A | | VISHAY |
| 18 | D11 | ZENER DIODE | 1N4742A | | VISHAY |
| 19 | Q1 | N-CHANNEL MOSFET | BUK9K18-40E | | NXP |
| 20 | Q2 | N-CHANNEL MOSFET | BUK9K18-40E | | NXP |
| 21 | Q3 | N-CHANNEL MOSFET | 2N7002K | | Fairchild |
| 22 | Q4 | N-CHANNEL MOSFET | 2N7002K | | Fairchild |
| 23 | Q6 | N-CHANNEL MOSFET | 2N7002K | | Fairchild |
| 24 | Q51 | P-CHANNEL MOSFET | BSS83P | | Infineon |
| 25 | Q52 | N-CHANNEL MOSFET | 2N7002K | | Fairchild |
| 26 | R1 | RESISTOR | 10Ω | 2 Watt | VISHAY |
| 27 | R2 | RESISTOR | 2MΩ 1% | 0.125 Watt | VISHAY |
| 28 | R3 | RESISTOR | 2MΩ 1% | 0.125 Watt | VISHAY |
| 29 | R4 | RESISTOR | 300KΩ 1% | 0.125 Watt | VISHAY |
| 30 | R5 | RESISTOR | 300KΩ 1% | 0.125 Watt | VISHAY |

FIG. 46

| NO. | REF | DESCRIPTION | VALUE | MANUFACTURER |
|---|---|---|---|---|
| 31 | R6 | RESISTOR | 20MΩ 1%    0.125 Watt | VISHAY |
| 32 | R7 | RESISTOR | 10MΩ 1%    0.125 Watt | VISHAY |
| 33 | R8 | RESISTOR | 1MΩ 1%    0.125 Watt | VISHAY |
| 34 | R9 | RESISTOR | 3MΩ 1%    0.125 Watt | VISHAY |
| 35 | R10 | RESISTOR | 604KΩ 1%    0.125 Watt | VISHAY |
| 36 | R11 | RESISTOR | 2MΩ 1%    0.125 Watt | VISHAY |
| 37 | R12 | RESISTOR | 1MΩ 1%    0.125 Watt | VISHAY |
| 38 | R13 | RESISTOR | 2MΩ 1%    0.125 Watt | VISHAY |
| 39 | R14 | RESISTOR | 5.1MΩ 1%    0.125 Watt | VISHAY |
| 40 | R15 | RESISTOR | 10MΩ 1%    0.125 Watt | VISHAY |
| 41 | R16 | RESISTOR | 1MΩ 1%    0.125 Watt | VISHAY |
| 42 | R17 | RESISTOR | 5.1MΩ 1%    0.125 Watt | VISHAY |
| 43 | R35 | RESISTOR | 0.5Ω 1%    0.125 Watt | VISHAY |
| 44 | R36 | RESISTOR | 0.5Ω 1%    0.125 Watt | VISHAY |
| 45 | R51 | RESISTOR | 1Ω 1%    0.125 Watt | VISHAY |
| 46 | R52 | RESISTOR | 100KΩ 1%    0.125 Watt | VISHAY |
| 47 | R53 | RESISTOR | 1MΩ 1%    0.125 Watt | VISHAY |
| 48 | R54 | RESISTOR | 100Ω 1%    0.125 Watt | VISHAY |
| 49 | R59 | RESISTOR | 604KΩ 1%    0.125 Watt | VISHAY |
| 50 | R60 | RESISTOR | 1.4MΩ 1%    0.125 Watt | VISHAY |
| 51 | R103 | RESISTOR | 6.2MΩ 1%    0.125 Watt | VISHAY |
| 52 | U1 | I.C. | TLV70450DBVR | TI |
| 53 | U2 | I.C. | TLV3701 | TI |
| 54 | U3 | I.C. | TLV3201 | TI |
| 55 | U4 | I.C. | TC7SE14FU | TOSHIBA |
| 56 | U5 | I.C. | 74AHC1G86 | NXP |
| 57 | U6 | I.C. | NC7SZ175P6X | Fairchild |
| 58 | U7 | I.C. | 74HC221PWR | NXP |
| 59 | U22 | I.C. | NC7SZ175P6X | Fairchild |
| 60 | U23 | I.C. | NC7SZ157 | Fairchild |
| 61 | U24 | I.C. | TLV3701 | TI |

FIG. 47

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10μF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C25 | CAPACITOR | 150nF | 50V | AVX |
| 11 | C35 | CAPACITOR | 100nF | 50V | AVX |
| 12 | C36 | CAPACITOR | 100nF | 50V | AVX |
| 13 | C37 | CAPACITOR | 100nF | 50V | AVX |
| 14 | D1 | CIDACTOR | P0640SCLRP | | LittleFuse |
| 15 | D2 | DIODE | S1BB | | Diodes Incorporated |
| 16 | D3 | DIODE | S1BB | | Diodes Incorporated |
| 17 | D5 | ZENER DIODE | 1N4751A | | Fairchild |
| 18 | D8 | DIODE | BAS16 | | Fairchild |
| 19 | Q1 | N-CHANNEL MOSFET | BUK9K18-40E | | NXP |
| 20 | Q2 | N-CHANNEL MOSFET | BUK9K18-40E | | NXP |
| 21 | R1 | RESISTOR | 10Ω | 2 Watt | VISHAY |
| 22 | R2 | RESISTOR | 2MΩ 1% | 0.125 Watt | VISHAY |
| 23 | R3 | RESISTOR | 2MΩ 1% | 0.125 Watt | VISHAY |
| 24 | R4 | RESISTOR | 300KΩ 1% | 0.125 Watt | VISHAY |
| 25 | R5 | RESISTOR | 300KΩ 1% | 0.125 Watt | VISHAY |

FIG. 53

| NO. | REF | DESCRIPTION | VALUE | MANUFACTURER |
|---|---|---|---|---|
| 26 | R8 | RESISTOR | 1MΩ 1%    0.125 Watt | VISHAY |
| 27 | R9 | RESISTOR | 3MΩ 1%    0.125 Watt | VISHAY |
| 28 | R10 | RESISTOR | 604KΩ 1%    0.125 Watt | VISHAY |
| 29 | R11 | RESISTOR | 2MΩ 1%    0.125 Watt | VISHAY |
| 30 | R12 | RESISTOR | 1MΩ 1%    0.125 Watt | VISHAY |
| 31 | R13 | RESISTOR | 2MΩ 1%    0.125 Watt | VISHAY |
| 32 | R17 | RESISTOR | 200KΩ 1%    0.125 Watt | VISHAY |
| 33 | R18 | RESISTOR | 100MΩ 1%    0.125 Watt | VISHAY |
| 34 | R50 | RESISTOR | 20MΩ 1%    0.125 Watt | VISHAY |
| 35 | R51 | RESISTOR | 1MΩ 1%    0.125 Watt | VISHAY |
| 36 | R52 | RESISTOR | 1MΩ 1%    0.125 Watt | VISHAY |
| 37 | R53 | RESISTOR | 20MΩ 1%    0.125 Watt | VISHAY |
| 38 | R54 | RESISTOR | 1MΩ 1%    0.125 Watt | VISHAY |
| 39 | R55 | RESISTOR | 1MΩ 1%    0.125 Watt | VISHAY |
| 40 | R56 | RESISTOR | 10MΩ 1%    0.125 Watt | VISHAY |
| 41 | R57 | RESISTOR | 200KΩ 1%    0.125 Watt | VISHAY |
| 42 | R103 | RESISTOR | 6.2MΩ 1%    0.125 Watt | VISHAY |
| 43 | U1 | I.C. | TLV70450DBVR | TI |
| 44 | U2 | I.C. | TLV3701 | TI |
| 45 | U3 | I.C. | TLV3201 | TI |
| 46 | U4 | I.C. | TC7SE14FU | TOSHIBA |
| 47 | U5 | I.C. | 74AHC1G86 | NXP |
| 48 | U6 | I.C. | NC7SZ175P6X | Fairchild |
| 49 | U7 | I.C. | 74HC221PWR | NXP |
| 50 | U20 | I.C. | LT1673CN8 | Linear Technology |
| 51 | U21 | I.C. | 74HC4053 | NXP |

FIG. 54

| NO. | REF | DESCRIPTION | VALUE | | MANUFACTURER |
|---|---|---|---|---|---|
| 1 | C1 | CAPACITOR | 150nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10µF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C25 | CAPACITOR | 150nF | 50V | AVX |
| 11 | C35 | CAPACITOR | 100nF | 50V | AVX |
| 12 | C37 | CAPACITOR | 100nF | 50V | AVX |
| 13 | D1 | CIDACTOR | P0640SCLRP | | LittleFuse |
| 14 | D2 | DIODE | S1BB | | Diodes Incorporated |
| 15 | D3 | DIODE | S1BB | | Diodes Incorporated |
| 16 | D5 | ZENER DIODE | 1N4751A | | Fairchild |
| 17 | D8 | DIODE | BAS16 | | Fairchild |
| 18 | Q1 | N-CHANNEL MOSFET | BUK9K18-40E | | NXP |
| 19 | Q2 | N-CHANNEL MOSFET | BUK9K18-40E | | NXP |
| 20 | R1 | RESISTOR | 10Ω | 2 Watt | VISHAY |
| 21 | R2 | RESISTOR | 2MΩ 1% | 0.125 Watt | VISHAY |
| 22 | R3 | RESISTOR | 2MΩ 1% | 0.125 Watt | VISHAY |
| 23 | R4 | RESISTOR | 300KΩ 1% | 0.125 Watt | VISHAY |
| 24 | R5 | RESISTOR | 300KΩ 1% | 0.125 Watt | VISHAY |

FIG. 57

| NO. | REF | DESCRIPTION | VALUE | MANUFACTURER |
|---|---|---|---|---|
| 25 | R8 | RESISTOR | 1MΩ 1%    0.125 Watt | VISHAY |
| 26 | R9 | RESISTOR | 3MΩ 1%    0.125 Watt | VISHAY |
| 27 | R10 | RESISTOR | 604KΩ 1%    0.125 Watt | VISHAY |
| 28 | R11 | RESISTOR | 2MΩ 1%    0.125 Watt | VISHAY |
| 29 | R12 | RESISTOR | 1MΩ 1%    0.125 Watt | VISHAY |
| 30 | R13 | RESISTOR | 2MΩ 1%    0.125 Watt | VISHAY |
| 31 | R17 | RESISTOR | 200KΩ 1%    0.125 Watt | VISHAY |
| 32 | R18 | RESISTOR | 100MΩ 1%    0.125 Watt | VISHAY |
| 33 | R50 | RESISTOR | 20MΩ 1%    0.125 Watt | VISHAY |
| 34 | R51 | RESISTOR | 1MΩ 1%    0.125 Watt | VISHAY |
| 35 | R52 | RESISTOR | 1MΩ 1%    0.125 Watt | VISHAY |
| 36 | R53 | RESISTOR | 20MΩ 1%    0.125 Watt | VISHAY |
| 37 | R54 | RESISTOR | 1MΩ 1%    0.125 Watt | VISHAY |
| 38 | R55 | RESISTOR | 1MΩ 1%    0.125 Watt | VISHAY |
| 39 | R56 | RESISTOR | 10MΩ 1%    0.125 Watt | VISHAY |
| 40 | R57 | RESISTOR | 200KΩ 1%    0.125 Watt | VISHAY |
| 41 | R103 | RESISTOR | 6.2MΩ 1%    0.125 Watt | VISHAY |
| 42 | U1 | I.C. | TLV70450DBVR | TI |
| 43 | U2 | I.C. | TLV3701 | TI |
| 44 | U3 | I.C. | TLV3201 | TI |
| 45 | U4 | I.C. | TC7SE14FU | TOSHIBA |
| 46 | U5 | I.C. | 74AHC1G86 | NXP |
| 47 | U6 | I.C. | NC7SZ175P6X | Fairchild |
| 48 | U7 | I.C. | 74HC221PWR | NXP |
| 49 | U20 | I.C. | LT1673CN8 | Linear Technology |

FIG. 58

| NO. | REF | DESCRIPTION | VALUE | | MANUFACTURER |
|---|---|---|---|---|---|
| 1 | C1 | CAPACITOR | 10nF | 630V | AVX |
| 2 | C2 | ELECT. CAPACITOR | 470uF | 16V | AVX |
| 3 | C3 | CAPACITOR | 100nF | 50V | AVX |
| 4 | C4 | CAPACITOR | 10µF | 10V | AVX |
| 5 | C5 | CAPACITOR | 10nF | 50V | AVX |
| 6 | C6 | CAPACITOR | 200pF | 50V | AVX |
| 7 | C7 | CAPACITOR | 100nF | 50V | AVX |
| 8 | C8 | CAPACITOR | 1nF | 50V | AVX |
| 9 | C9 | CAPACITOR | 100nF | 50V | AVX |
| 10 | C10 | CAPACITOR | 100nF | 50V | AVX |
| 11 | C11 | CAPACITOR | 100nF | 50V | AVX |
| 12 | C12 | CAPACITOR | 100nF | 50V | AVX |
| 13 | C13 | CAPACITOR | 100nF | 50V | AVX |
| 14 | C14 | CAPACITOR | 100nF | 50V | AVX |
| 15 | C15 | CAPACITOR | 1nF | 50V | AVX |
| 16 | C18 | ELECT. CAPACITOR | 47uF | 35V | AVX |
| 17 | C25 | CAPACITOR | 150nF | 50V | AVX |
| 18 | C26 | CAPACITOR | 1nF | 50V | AVX |
| 19 | C30 | CAPACITOR | 100nF | 50V | AVX |
| 20 | D1 | CIDACTOR | P0640SCLRP | | LittleFuse |
| 21 | D2 | DIODE | S1BB | | Diodes Incorporated |
| 22 | D3 | DIODE | S1BB | | Diodes Incorporated |
| 23 | D4 | DIODE | BAS16 | | Fairchild |
| 24 | D5 | ZENER DIODE | 1N4751A | | Fairchild |
| 25 | D6 | SCHOTTKY DIODE | DB3X407KDL | | Panasonic |
| 26 | D7 | SCHOTTKY DIODE | DB3X407KDL | | Panasonic |
| 27 | D8 | DIODE | BAS16 | | Fairchild |
| 28 | D11 | DIODE | BAS16 | | Fairchild |
| 29 | Q1 | N-CHANNEL MOSFET | BUK9K18-40E | | NXP |
| 30 | Q2 | N-CHANNEL MOSFET | BUK9K18-40E | | NXP |
| 31 | Q3 | N-CHANNEL MOSFET | 2N7002K | | Fairchild |
| 32 | Q4 | N-CHANNEL MOSFET | 2N7002K | | Fairchild |
| 33 | Q7 | N-CHANNEL MOSFET | 2N7002K | | Fairchild |
| 34 | Q8 | P-CHANNEL MOSFET | BSS83P | | Infineon |

FIG. 66

| NO. | REF | DESCRIPTION | VALUE | | MANUFACTURER |
|---|---|---|---|---|---|
| 35 | Q17 | N-CHANNEL MOSFET | 2N7002K | | Fairchild |
| 36 | R1 | RESISTOR | 100Ω | 1 Watt | VISHAY |
| 37 | R2 | RESISTOR | 2MΩ 1% | 0.125 Watt | VISHAY |
| 38 | R3 | RESISTOR | 2MΩ 1% | 0.125 Watt | VISHAY |
| 39 | R4 | RESISTOR | 300KΩ 1% | 0.125 Watt | VISHAY |
| 40 | R5 | RESISTOR | 300KΩ 1% | 0.125 Watt | VISHAY |
| 41 | R6 | RESISTOR | 20MΩ 1% | 0.125 Watt | VISHAY |
| 42 | R7 | RESISTOR | 10MΩ 1% | 0.125 Watt | VISHAY |
| 43 | R8 | RESISTOR | 2MΩ 1% | 0.125 Watt | VISHAY |
| 44 | R9 | RESISTOR | 1MΩ 1% | 0.125 Watt | VISHAY |
| 45 | R10 | RESISTOR | 2KΩ 1% | 0.125 Watt | VISHAY |
| 46 | R11 | RESISTOR | 4MΩ 1% | 0.125 Watt | VISHAY |
| 47 | R12 | RESISTOR | 1MΩ 1% | 0.125 Watt | VISHAY |
| 48 | R13 | RESISTOR | 2MΩ 1% | 0.125 Watt | VISHAY |
| 49 | R14 | RESISTOR | 5.1MΩ 1% | 0.125 Watt | VISHAY |
| 50 | R15 | RESISTOR | 1.6MΩ 1% | 0.125 Watt | VISHAY |
| 51 | R16 | RESISTOR | 1MΩ 1% | 0.125 Watt | VISHAY |
| 52 | R17 | RESISTOR | 200KΩ 1% | 0.125 Watt | VISHAY |
| 53 | R18 | RESISTOR | 100MΩ 1% | 0.125 Watt | VISHAY |
| 54 | R20 | RESISTOR | 51KΩ 1% | 0.125 Watt | VISHAY |
| 55 | R21 | RESISTOR | 2MΩ 1% | 0.125 Watt | VISHAY |
| 56 | R22 | RESISTOR | 2KΩ 1% | 0.125 Watt | VISHAY |
| 57 | R33 | RESISTOR | 200KΩ 1% | 0.125 Watt | VISHAY |
| 58 | R103 | RESISTOR | 50MΩ 1% | 0.125 Watt | VISHAY |
| 59 | U1 | I.C. | TPS706-33-WSON-6 | | TI |
| 60 | U3 | I.C. | TLV3201 | | TI |
| 61 | U4 | I.C. | TC7SE14FU | | TOSHIBA |
| 62 | U5 | I.C. | 74AHC1G86 | | NXP |
| 63 | U6 | I.C. | NC7SZ175P6X | | Fairchild |
| 64 | U7 | I.C. | 74HC221PWR | | NXP |
| 65 | U8 | I.C. | TLV3704D | | TI |
| 66 | U9 | I.C. | 74AHC1G02 | | Diode-Incorporated |
| 67 | U10 | I.C. | 74HC74 | | ON-Semi |
| 68 | U11 | I.C. | TPS706-33-WSON-6 | | TI |

FIG. 67

POWER SUPPLY WITH CONTROLLED SHUNTING ELEMENT

RELATED APPLICATION/S

This application is a Divisional Application of U.S. patent application Ser. No. 16/462,945 filed on 22 May 2019 which claims priority from International Patent Application no. PCT/IB2017/057373 filed 23 Nov. 2017 which claims priority from U.S. Provisional Application No. 62/425,943 filed Nov. 23, 2016, the contents of which are incorporated herein by reference in their entirety.

FIELD AND BACKGROUND OF THE INVENTION

The present invention, in some embodiments thereof, relates to controlling a power supply and, more particularly, but not exclusively, to a controller and methods for controlling an AC to DC converter, and even more particularly, but not exclusively, to a controller and methods for controlling an AC to DC converter which provides power only occasionally.

Additional background art includes:

U.S. Pat. No. 7,483,280 to Ghafour Benabdelaziz, which describes a capacitive power supply circuit, comprising a power storage element between two output terminals for providing a rectified output voltage; in series between a first input terminal for applying an A.C. voltage and a first of the output terminals, at least one capacitor and a first diode; a switch controllable by application of a signal on a triggering terminal; and means for controlling said switch to the on state when the output voltage is in a predetermined range of values.

U.S. Patent Application Publication Number 2002/0075708 of Aijan Van Der Berg, which describes a power supply comprising a rectifier having an input side connectable to an AC main power supply and an output side connectable to a load; and a controllable shunt switch circuit, wherein the shunt switch circuit is arranged on the input side of the rectifier to selectively shunt the rectifier via the output side thereof.

U.S. Pat. No. 3,355,650 to Robert J. Tolmie, which describes use of a switch to shunt a rectifier in order to control the rectifier output. The switch flips ON (connected) when the AC input voltage of the rectifier exceeds a predetermined voltage level, which is greater or smaller than zero.

U.S. Patent Application Publication Number 2014/0233285 of Kenichi Nishijima, which describes an integrated circuit device, for a power supply that is connected to an AC power source via an input circuit having a capacitor, is able to reliably discharge the capacitor when the AC power source is interrupted. The integrated circuit device includes a first discharge circuit that operates in response to an internal supply voltage and discharges the capacitor via a first switch element that is turned on when the input voltage provided via the input circuit falls below a set voltage, and a second discharge circuit having a second switch element that is turned off when receiving the internal supply voltage but is turned on in response to the input voltage when the supply of internal supply voltage is interrupted.

U.S. Pat. No. 8,710,804 to Karel Ptacek, which describes a power supply may include a filter stage coupled to an input terminal of a discharge circuit and a supply capacitor coupled to an output terminal of the discharge circuit. In accordance with another embodiment, a method for discharging at least one capacitor includes discharging the at least one capacitor in response to a signal at the input terminal of the discharge circuit being different from a reference signal.

U.S. Patent Application Publication Number 2010/0309694 of Wei-Hsuan Huang, which describes a start-up circuit to discharge EMI filter is developed for power saving. It includes a detection circuit detecting a power source for generating a sample signal. A sample circuit is coupled to the detection circuit for generating a reset signal in response to the sample signal. The reset signal is utilized for discharging a stored voltage of the EMI filter.

European Patent Number EP 0891039 to Christian, which describes a capacitive network part has a two-way rectifier arrangement for supplying a load from an alternating current network. There is an arrangement for switching over the second two-way rectifier into a single-path mode depending on the load. A changeover signal which is used to change over into one-way mode is formed by observing the rectified voltage which is applied to a charging capacitor. The DC voltage is stabilized using a first Zener diode (D1) in parallel with the load.

U.S. Pat. No. 3,978,388 to Hans De Vreis, which describes a current supply arrangement for an electronic remote control receiver, wherein a series circuit comprising a protective impedance, a capacitor and a full-wave rectifier is connected between two input terminals intended for connection to an alternating current network, a voltage limiter is operatively associated with the full-wave rectifier.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to controlling a power supply and, more particularly, but not exclusively, to a controller and methods for controlling an AC to DC converter, and even more particularly, but not exclusively, to a controller and methods for controlling an AC to DC converter which provides power only occasionally.

According to an aspect of some embodiments of the present invention there is provided an integrated circuit including an AC to DC power supply including an AC input for connection to an AC source, an AC to DC rectifier connected to the AC input, a DC output connected to the rectifier, for providing DC voltage, and a switch for shunting the AC input to the AC to DC rectifier, and a controller including a first connection to the DC output for the controller to determine an output value of the DC output, a second connection to the AC input for the controller to determine voltage across the AC input, and a command output for the controller to provide a command signal to the switch to shunt the AC input, wherein the controller is configured to monitor output of the DC output, determine if the DC output is within a first threshold range of a desired output, monitor instantaneous AC voltage across the AC input, determine if an absolute difference of the AC input from zero voltage is less than a second threshold value, and if (a) the DC output is within the first threshold range of the desired output, and (b) the absolute difference of the instantaneous AC input from zero voltage is less than the second threshold value, then provide a command signal to the switch to shunt the AC input.

According to some embodiments of the invention, the AC to DC power supply includes a common ground of the AC input and the DC output half wave rectifier.

According to some embodiments of the invention, the AC to DC power supply includes a plurality of DC outputs, the AC to DC power supply further includes a plurality of series switches, each one of the series switches for connecting and disconnecting an associated one of the plurality of DC outputs, and the controller includes a plurality of second connections, each second connection to an associated one of the plurality of DC outputs, for determining an output value of each one of the associated DC outputs, and a plurality of command outputs, each one of the command outputs fax providing a command signal to an associated one of the plurality of series switches to connect or disconnect.

According to some embodiments of the invention, at least a first one of the plurality of DC outputs provides output voltage of opposite polarity than at least a second one of the plurality of DC outputs.

According to some embodiments of the invention, the controller is configured to monitor an output of a first, positive polarity DC output, monitor an output of a second, negative polarity DC output, and provide the switch for shunting the AC input a command selected from a group consisting of shunt the AC input when the first DC output is greater than the desired voltage value for the first DC output and the AC input is positive, release the shunt to the AC input when the first DC output is less than a desired voltage value for the first DC output and the AC input is positive, shunt the AC input when the second DC output is less than the desired voltage value for the second DC output and the AC input is negative, and release the shunt to the AC input when the second DC output is above a desired voltage value for the second DC output and the AC input is negative.

According to some embodiments of the invention, the AC to DC power supply includes a full wave rectifier.

According to some embodiments of the invention, the AC to DC power supply includes a plurality of DC outputs, the AC to DC power supply further includes a plurality of series switches, each one of the series switches for connecting and disconnecting an associated one of the plurality of DC outputs, and the controller includes a plurality of second connections, each second connection to an associated one of the plurality of DC outputs, for determining an output value of each one of the associated DC outputs, and a plurality of command outputs, each one of the command outputs for providing a command signal to an associated one of the plurality of series switches to connect or disconnect.

According to some embodiments of the invention, the integrated circuit further includes an electronic circuit selected from a group consisting of an Internet of Things device, a System On Chip, a WiFi device, a radio frequency communicator, an Analog to Digital converter, a Digital to Analog converter, and a controller.

According to some embodiments of the invention, further including based on the monitoring output of the plurality of DC outputs, connecting each one of the plurality of DC outputs when a DC output voltage associated with the DC output falls below a desired voltage value for the DC output and disconnecting the DC output when the DC output voltage is greater than the desired voltage value for the DC output.

According to some embodiments of the invention, the switch includes a MOSFET.

According to some embodiments of the invention, the switch includes two MOSFETs, the two MOSFETs are part of a rectifying circuit in the AC to DC power supply, and the two MOSFETs are configured to conduct together during a shunt mode.

According to some embodiments of the invention, the controller is configured to control each one of the two MOSFETs individually to conduct.

According to some embodiments of the invention, the controller is configured to provide the command signal to the input switch to shunt input to the AC to DC power supply when each one of the plurality of DC outputs is within a first threshold range associated with each one of the DC outputs, and the absolute difference of the AC input from zero voltage is less than a second threshold value.

According to some embodiments of the invention, the power supply accepts incoming AC power at a voltage in a range of 85-380V.

According to some embodiments of the invention, the power supply provides DC in a range of 0.8-60V.

According to some embodiments of the invention, further including terminals for connecting an external capacitor in parallel to the DC output.

According to some embodiments of the invention, the controller is configured to calculate when the absolute difference of the instantaneous AC input from zero voltage will be less than the second threshold.

According to some embodiments of the invention, the calculating when the absolute difference of the instantaneous AC input from zero voltage will be less than the second threshold includes using stored values based on instantaneous voltage values from previous AC cycles.

According to an aspect of some embodiments of the present invention there is provided a rectifier controller including a first connection to a rectifier output for determining rectifier output, a second connection to a rectifier input for determining voltage across an input to the rectifier, a command output for providing a command signal to a switch for shunting input to the rectifier.

According to some embodiments of the invention, the rectifier controller is configured to provide a command signal to a switch for shunting input to the rectifier based on the determining the rectifier output and the determining voltage across the input to the rectifier.

According to some embodiments of the invention, the rectifier controller is included in a power supply of an Internet of Things (IoT) device.

According to some embodiments of the invention, the rectifier controller is configured to monitor output of the rectifier, determine if output of the rectifier is within a first threshold range of a desired output, monitor instantaneous voltage over the input of the rectifier, determine if an absolute difference of the instantaneous voltage across the input of the rectifier from zero is less than a second threshold range, and if the output of the rectifier is within the first threshold range of the desired output, and the difference of the instantaneous voltage across the input of the rectifier from zero voltage is less than the second threshold range, then provide a command signal to the switch for shunting input to the rectifier.

According to an aspect of some embodiments of the present invention there is provided a method for reducing electric power waste in an AC input to a rectifier including
monitoring output of a rectifier.
determining if output of the rectifier is within a first threshold range of a desired output, monitoring instantaneous voltage across an input of the rectifier, determining if an absolute difference of the instantaneous voltage across the input of the rectifier from zero voltage is less than a second threshold, and if the output of the rectifier is within the first threshold range of the desired output, and the absolute difference of the instantaneous voltage across the input of the rectifier from zero voltage is less than the second threshold, then shunting the input of the rectifier.

According to some embodiments of the invention, further including calculating when the absolute difference of the instantaneous voltage across the input of the rectifier from zero voltage will be less than the second threshold.

According to some embodiments of the invention, the calculating when the difference of the instantaneous voltage across the input of the rectifier from zero voltage will be less than the second threshold includes using stored values based on instantaneous voltage values from previous AC cycles.

According to an aspect of some embodiments of the present invention there is provided an AC to DC power supply including an AC input including a first capacitor in series to a rectifier, a DC output including a second capacitor in parallel, an input switch for shunting input to the rectifier, and a controller including a first connection to the rectifier output for determining an output value of the DC output, a second connection to an input of the rectifier for determining voltage across the input of the rectifier, a command output for providing a command signal to the input switch.

According to some embodiments of the invention, the AC to DC power supply includes a half wave rectifier.

According to some embodiments of the invention, the AC to DC power supply includes a full wave rectifier.

According to some embodiments of the invention the AC to DC rectifier is included in a power supply of an Internet of Things (IoT) device.

According to some embodiments of the invention, the controller is configured to shunt input to the rectifier when an absolute difference between instantaneous AC input voltage to the rectifier from zero voltage is less than a threshold value.

According to some embodiments of the invention, the controller is configured to monitor output of the rectifier, determine if output of the rectifier is within a first threshold range of a desired output, monitor voltage across the input of the rectifier, determine if a difference between instantaneous voltage across the input of the rectifier from zero voltage is less than a second threshold, and if the output of the rectifier is within the first threshold range of the desired output, and the difference between instantaneous voltage across the input of the rectifier from zero voltage is less than a second threshold range, then provide a command signal to the input switch to shunt input to the rectifier.

According to some embodiments of the invention, the input switch includes a MOSFET.

According to some embodiments of the invention, the switch includes two MOSFETs, and the two MOSFETs are pail of a the rectifying circuit in the AC to DC power supply and wherein power supply is configured to control the two MOSFETs to conduct together during a shunt mode.

According to some embodiments of the invention, further including the power supply configured to control only one of the two MOSFETs to conduct during a rectifying mode.

According to some embodiments of the invention, the power supply includes a plurality of DC outputs, the power supply further includes a plurality of series switches, each one of the series switches for connecting and disconnecting an associated one of the plurality of DC outputs, the controller includes a plurality of second connections, each second connection to an associated one of the plurality of DC outputs, for determining an output value of each one of the associated DC outputs, and a plurality of command outputs, each one of the command outputs for providing a command signal to an associated one of the plurality of series switches to connect or disconnect.

According to some embodiments of the invention, the controller is configured to provide the command signal to the input switch to shunt input to the AC to DC rectifier when each one of the plurality of DC outputs is within a first threshold range associated with each one of the DC outputs, and a difference of the instantaneous voltage across the input of the rectifier from zero voltage is less than a second threshold.

According to some embodiments of the invention, at least a first one of the plurality of DC outputs provides output voltage of opposite polarity than at least a second one of the plurality of DC outputs.

According to some embodiments of the invention, the power supply accepts incoming AC power at a voltage in a range of 85-265V.

According to some embodiments of the invention, the rectifier provides output voltage in a range of 1.5-60V.

According to an aspect of some embodiments of the present invention there is provided a method for boosting power for an IoT device including receiving AC power and converting to DC power, using the DC power to charge a first capacitor to a first voltage for powering the IoT device, using the DC power to charge a second capacitor to a second voltage value that is greater than the first voltage, monitoring voltage on the first capacitor, monitoring voltage on the second capacitor, connecting the first capacitor to the IoT device, and connecting the second capacitor through a DC to DC converter to boost the output current to the IoT device.

According to some embodiments of the invention, further including based on the monitoring voltage on the first capacitor, connecting the first capacitor to a charging current when a voltage on the first capacitor falls below the first voltage value and disconnecting the first capacitor from the charging current when the voltage on the first capacitor is greater than the first voltage value, and based on the monitoring voltage on the second capacitor, connecting the second capacitor to a charging current when a voltage on the second capacitor falls below the second voltage value and disconnecting the second capacitor from the charging current when the voltage on the second capacitor is greater than the second voltage value.

According to some embodiments of the invention, further including monitoring (a) if an absolute difference between instantaneous received AC power from zero voltage is less than a threshold, (b) if the voltage on the first capacitor is not less than the first voltage value, (c) if the voltage on the second capacitor is not less than the second voltage value, and if (a) and (b) and (c) are true then provide a command signal to an input switch to shunt AC power input from providing input.

According to an aspect of some embodiments of the present invention there is provided an AC to DC power supply for an IoT device including an AC input for connection to an AC source, an AC to DC rectifier connected to the AC input, a first capacitor for charging to a first voltage value equal to a desired output voltage for the IoT device, a first series switch for connecting and disconnecting the DC output of the rectifier to the first capacitor, a second capacitor for charging to a second voltage value greater than the desired output voltage for the IoT device, a second series switch for connecting and disconnecting the DC output of the rectifier to the second capacitor, a DC to DC converter for reducing the voltage on the second capacitor to the desired output voltage for the IoT device, and a controller for monitoring voltage on the first capacitor, voltage on the second capacitor, wherein the controller is configured to connect the first series switch when the voltage on the first capacitor falls below the first voltage value and disconnect the first series switch when the voltage on the first capacitor is greater than the first voltage value, and connect the second series switch when the voltage on the second capacitor falls below the second voltage value and disconnect the second series switch when the voltage on the second capacitor is greater than the second voltage value.

According to some embodiments of the invention, further including an input switch for shunting input to the AC to DC rectifier, wherein the controller is further configured to determine (a) if an absolute difference of an instantaneous voltage across the input of the AC to DC rectifier from zero voltage is less than a threshold, (b) if the voltage on the first capacitor is not less than the first voltage value, (c) if the voltage on the second capacitor is not less than the second voltage value, and if (a) and (b) and (c) are true then provide a command signal to the input switch to shunt input to the charging component.

According to an aspect of some embodiments of the present invention there is provided a rectifier bridge including two MOSFETs wherein the two MOSFETs are configured to conduct simultaneously.

According to an aspect of some embodiments of the present invention there is provided a method of shunting input to a rectifier bridge including controlling two MOSFETs which are part of a rectifier bridge to conduct simultaneously to shunt input to the rectifier bridge.

According to an aspect of some embodiments of the present invention there is provided apparatus including a controlled constant current sink, and a detector, wherein the detector is configured to control turning OFF or ON the controlled constant current sink based on the detector detecting absence or presence of an AC signal, respectively.

According to some embodiments of the invention, the detector is connected across the controlled constant current sink and the apparatus has exactly two terminals.

According to an aspect of some embodiments of the present invention there is provided a method for controlling a constant current sink including detecting absence or presence of an AC signal, turning the constant current sink ON when detecting absence of an AC signal, and turning the constant current sink OFF when detecting presence of an AC signal.

According to some embodiments of the invention, the detecting is across the controlled constant current sink.

According to an aspect of some embodiments of the present invention there is provided a Rectifier-Controller for stabilizing one or more outputs which are driven by a rectifier by controlling a Shunt-Switch that can short the AC inputs of that rectifier, including a Feedback-System that samples one or more of the outputs and provides a binary decision according to the sampled signals, and a controller which controls the Shunt-Switch according to zero crossing events of the AC inputs of the rectifier and the output of the Feedback-System.

The terms "shunt" and "shunting" in all their grammatical forms are used throughout the present specification and claims to mean diverting current from flowing through an input of a power supply or an input of a rectifier.

According to some embodiments of the invention, the Feedback-System indicates a true signal at its output, when each of the absolute values of the sampled signals is higher than a predetermined value associated with the sampled signal thereof, otherwise the Feedback-System output indicates a false signal.

According to some embodiments of the invention, the Feedback-System including a Positive-Feedback-System that samples one or more of the absolute value of the outputs which are driven by the positive output voltage of the rectifier, and indicates a true signal at its output, when each of the sampled signals is higher than a predetermined value associated with the sampled output thereof, otherwise the output of the Positive-Feedback-System indicates a false signal, and a Negative-Feedback-System that samples one or more of the absolute value of the outputs which are driven by the negative output voltage of the rectifier, and indicates a true signal at its output, when each of the sampled signals is higher than a predetermined value associated with the sampled output thereof, otherwise the output of the negative-Feedback-System indicates a false signal, during the positive cycles of the voltage across the AC inputs of the rectifier, the output of the Feedback-System tracks the output of the Positive-Feedback-System, and during the negative cycles of the voltage across the AC inputs of the rectifier, the output of the Feedback-System tracks the output of the Negative-Feedback-System.

According to some embodiments of the invention, the controller flips ON the Shunt-Switch on a zero crossing events of the AC inputs of the rectifier while the output of the Feedback-System indicates true signal, and flips OFF the Shunt-Switch when the output of the Feedback-System indicates false signal.

According to some embodiments of the invention, the controller flips ON or OFF the Shunt-Switch on zero crossing events of the AC inputs of the rectifier while the output of the Feedback-System indicates true or false signal, respectively.

According to some embodiments of the invention, further including one or more Series-Apparatuses, which its input is driven by the positive or the negative voltage outputs of the rectifier and its output generates another output, the Series-Apparatus conducts between its input and its output when the absolute value of its input voltage is higher by a predetermined value than the absolute value of its output, while the absolute value of its output is lower than another predetermined value, otherwise the Series-Apparatus disconnects its input from its output.

According to some embodiments of the invention, at least one of the predetermined values is varying according to a function of at least one of the following: time, the electrical parameters of the outputs which are driven by the rectifier, the electrical parameters of a load which is driven by the outputs.

According to some embodiments of the invention, further including a capacitor connected between the AC inputs of the rectifier.

According to some embodiments of the invention, further including a capacitor connected in series to the Shunt-Switch.

According to an aspect of some embodiments of the present invention there is provided an apparatus of a full wave bridge rectifier including at least two Controlled-Switches that can short the AC input of the bridge rectifier and which drive the positive or the negative DC outputs of the bridge rectifier, a controller, wherein the controller turns ON both Controlled-Switches simultaneously or independently in order to stabilize one or more outputs which are driven by that DC output of the bridge rectifier and the voltage drop across each of the Controlled-Switches during ON condition is less than 0.3V.

According to some embodiments of the invention, the voltage drop across each of the Controlled-Switches during ON condition is less than 0.2V.

According to some embodiments of the invention, the voltage drop across each of the Controlled-Switches during ON condition is less than 0.1V.

According to some embodiments of the invention, further including a capacitor connected between the AC inputs of the rectifier.

According to some embodiments of the invention, the controlled switches are MOSFETs.

According to an aspect of some embodiments of the present invention there is provided an apparatus including a controlled switch and a detector, the controlled switch is turned OFF or ON according to the detector detection of absence or presence of AC signals, respectively.

According to some embodiments of the invention, the controlled switch is controlled AC current sink.

According to some embodiments of the invention, the controlled switch is combined with series resistor.

According to some embodiments of the invention, the apparatus has two terminals.

According to an aspect of some embodiments of the present invention there is provided an apparatus that converts an AC input to one or more DC outputs wherein the power consumption through the AC input of the apparatus raises as a result of a current pulse at one or more of the DC outputs, according to the average of the power went out where the average is calculated for a time period which is not less than one hundred times of the width time of the current pulse, including a capacitor connected in series with a controlled switch which are connected to the AC input of the apparatus.

According to some embodiments of the invention, the average is calculated for a time which is not less than one thousand times of the width time of the current pulse.

According to some embodiments of the invention, the average is calculated fora time which is not less than ten thousand times of the width time of the current pulse.

According to an aspect of some embodiments of the present invention there is provided an AC to DC converter that has at least two DC outputs which feed a single DC output through regulators that stabilizes the DC level of that single output wherein at least one of the regulators is enabled upon a request from a load which is fed by that single output, including at least one input line for high power request by the load which enables at least one of the regulators.

According to some embodiments of the invention, at least one of the regulators is linear regulator.

According to some embodiments of the invention, at least one of the regulators is switch mode power supply.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon.

Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the to drawings makes apparent to those skilled in the art how embodiments of the invention may be practiced.

In the drawings:

FIG. 3A is a simplified illustration of a switching element of an AC to DC converter according to an example embodiment of the invention;

FIG. 3B is a simplified timing diagram corresponding showing timing of electric signals in an example embodiment of the invention;

FIG. 3C is a simplified timing diagram corresponding showing timing of electric signals in an example embodiment of the invention;

FIG. 16 and FIG. 17 show a Bill of Material (BOM) table corresponding to the example embodiment of FIG. 15;

FIG. 19 shows a Bill of Material (BOM) table corresponding to the example embodiment of FIG. 18;

FIG. 24A and FIG. 24B are Bill of Material tables corresponding to corresponding to the example embodiments of FIG. 23A and FIG. 23B, respectively;

FIG. 26 and FIG. 27 show a Bill of Material (BOM) table corresponding to the example embodiment of FIG. 25;

FIG. 31A is a simplified illustration of a series switch and a series switch controller according to an example embodiment of the invention;

FIG. 31B is a simplified illustration of a series switch and a series switch controller according to an example embodiment of the invention;

FIG. 31C is a simplified illustration of a series switch according to an example embodiment of the invention;

FIG. 31D is a simplified illustration of a voltage regulator according to an example embodiment of the invention;

FIG. 32A is a simplified illustration of an example embodiment of the invention;

FIG. 32B is a simplified illustration of an example embodiment of the invention;

FIG. 36 and FIG. 37 show a Bill of Material (BOM) table corresponding to the example embodiments of FIG. 34 and FIG. 35;

FIG. 40 and FIG. 41 show a Bill of Material (BOM) table corresponding to the example embodiments of FIG. 38 and FIG. 39;

FIG. 46 and FIG. 47 show a Bill of Material (BOM) table corresponding to the example embodiment of FIG. 45;

FIG. 53 and FIG. 54 show a Bill of Material (BOM) table corresponding to the example embodiments of FIG. 51 and FIG. 52;

FIG. 57 and FIG. 58 show a Bill of Material (BOM) table corresponding to the example embodiments of FIG. 55 and FIG. 56;

FIG. 66 and FIG. 67 show a Bill of Material (BOM) table corresponding to the example embodiments of FIG. 64 and FIG. 65;

Figure 70:
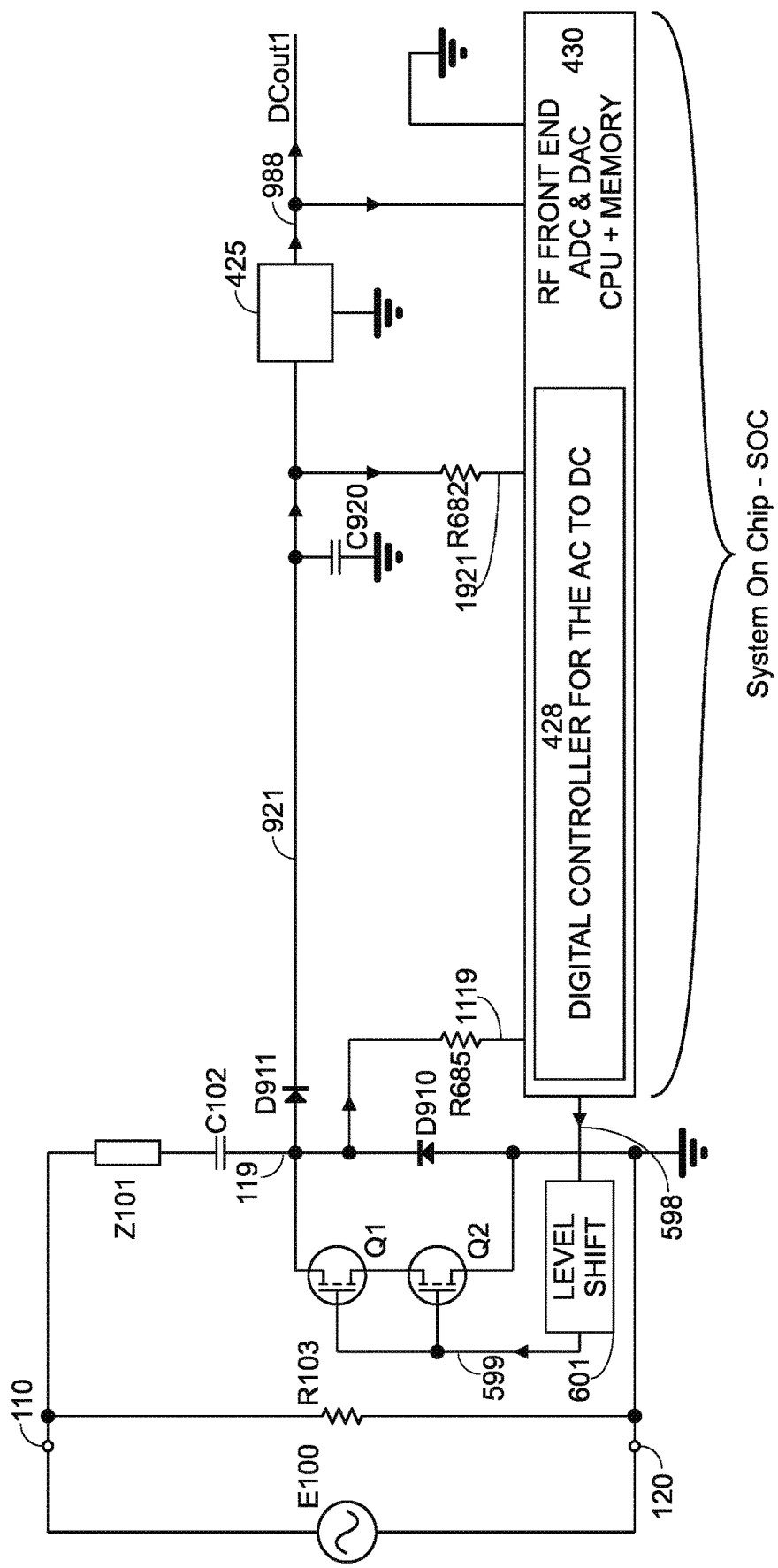
Figure 71:
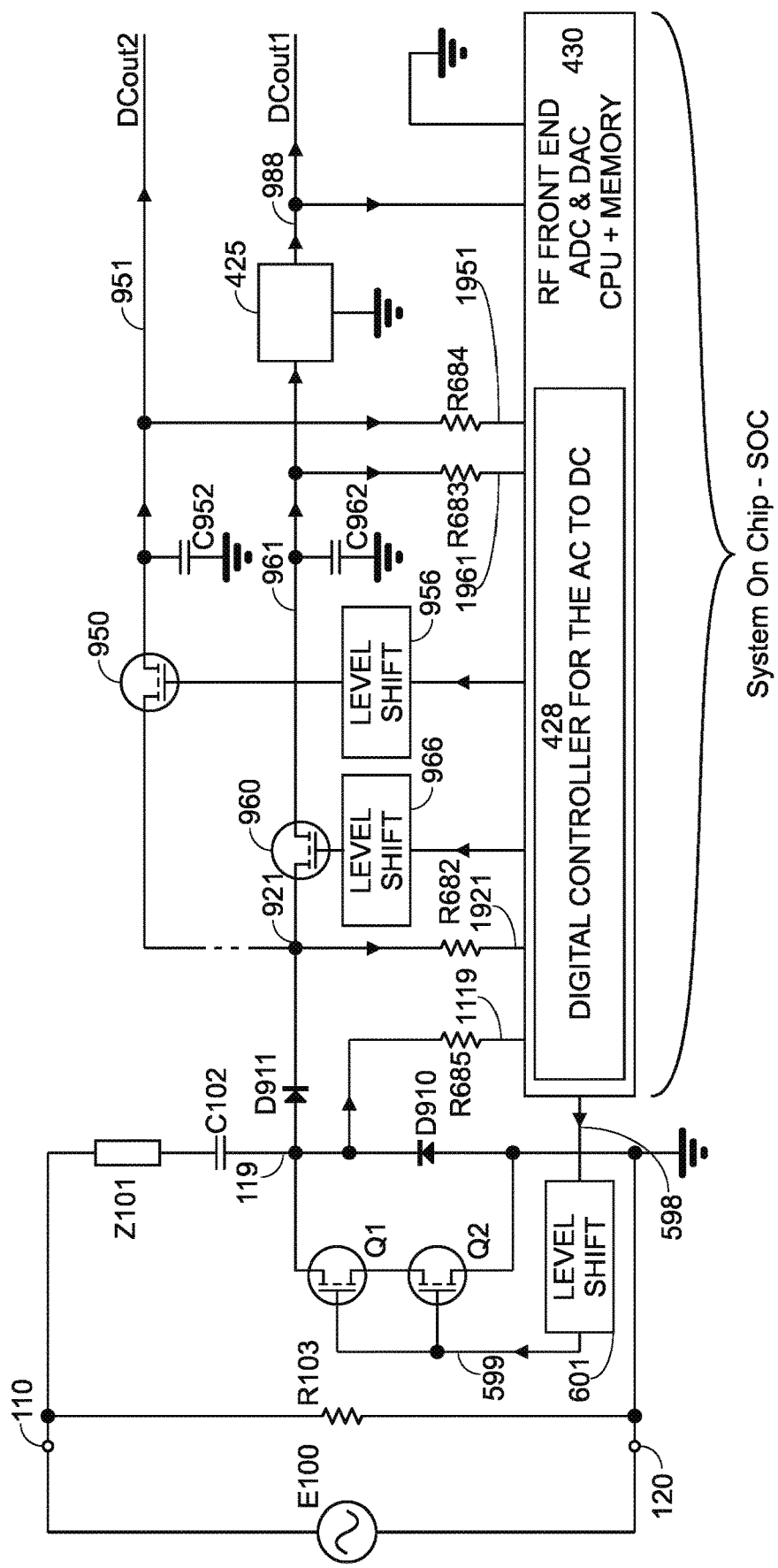

FIG. 70 is a simplified illustration of a single DC output with common input output ground AC to DC converter implemented with low voltage silicon technology according to an example embodiment of the invention; and FIG. 71 is a simplified illustration of a multiple DC output AC to DC converter with common input output ground implemented with low voltage silicon technology according to an example embodiment of the invention.

DESCRIPTION OF SPECIFIC EMBODIMENTS OF THE INVENTION

The present invention, in some embodiments thereof, relates to a controller and methods for controlling a power supply and, more particularly, but not exclusively, to a controller and methods for controlling an AC to DC converter, and even more particularly, but not exclusively, to a controller and methods for controlling an AC to DC converter which provides power only occasionally.

Introduction

Standby power is the electrical consumption of appliances while turned OFF. Usually the standby power of each single appliance is fairly low; however, the accumulated household standby power is substantial due to the total number of appliances constantly connected to electricity.

For most equipment in standby mode, only a small portion of the consumed standby power is actually required for the functional operation of the equipment. Most of the consumed power in standby mode is wasted within the Power-Supply itself. For example: practically an efficiency of a full loaded 10 watt AC to DC power supply can be over 85%. However, the efficiency of the same power supply when it's loaded with 1 milliWatt can be less than 1%, since there is power drawn by the internal circuitry of the power supply.

During the past few years, new standby power standards demanded a limitation of consumed standby power to less than 1 Watt, soon to be followed with a reduction to 100 milliWatt. The new standby power standard dictated the use of Switch Mode Power Supply (SMPS) with special care for standby consumption. Most of these power supplies stop working when detect that there is no load. The detection is made at a very low frequency, and the average power consumption during this period can be very low. Such power supplies are suitable for chargers. However, they are not suitable for devices that require power during standby mode such as Internet of Things (IoT) devices.

An aspect of the invention relates to providing a low-power AC to DC converter.

In some embodiments the AC to DC converter includes a controller which provides ultra-low standby power consumption while using some components of an inexpensive traditional to power supply.

In some embodiments the controller is optionally implemented on a low-voltage silicon chip, potentially providing some or all of the following advantages:
- ultra-low standby power consumption;
- a wide input voltage range;
- non-switching;
- compatible with Electro Magnetic Compatibility (EMC) standards without additional changes;
- low cost;
- can improve EMC performance when used as a secondary power supply; and
- inherent current limit and/or output short protection while keeping high efficiency.

In some embodiments an input impedance of the AC to DC converter has a capacitance characteristic. When using the converter as a power supply the converter potentially eliminates a need for EMC filtration.

In some embodiments an internal structure of the AC to DC converter includes an inherent current limit and/or short protection feature. During a current limit mode or a short protection mode the efficiency of the AC to DC converter is kept high without additional power dissipation. Such a feature can be used in many design applications.

By way of a non-limiting example, when driving a relay, output voltage of the AC to DC converter is optionally configured to a pick-up voltage of the relay, and a current limit of the AC to DC converter is optionally configured to the hold current of the relay. Such a design requires few components and is potentially inexpensive and potentially reduces the power consumption of the relay. A typical ratio between the pick-up voltage and the hold voltage of a relay is in the range of 10. Thus, in some embodiments the power consumption reduction can 100 times lower compare to the power consumption when powering the relay with its pick-up voltage.

By way of another non-limiting example, embodiments of the AC to DC converter are potentially beneficial when driving a low power load with short pulses of power consumption, such as when driving an Internet of Things (IoT) device. An IoT device is typically characterized by low-standby power consumption in a range of milliWatts, and typically during the time of the connection with the Internet the peak power consumption can rise to a range of Watts for short periods. Since most of the time the IoT device is in standby mode, a ratio between a duration in standby mode to the duration of the connection mode is typically in the range of 300 up to 10,000,000.

In some embodiments a power supply and/or an AC to DC converter is provided that complies with the new standby power standards.

Overview

A broad aspect of some embodiments of the invention relates to a power supply design which is built to receive input of electric power and provide electric power as an output. A controller in the power supply monitors status of output power and/or input power, and when there is no need, the power supply shuts off or reduces power input and/or power output in a manner which reduces power waste.

In some embodiments, the controller monitors status of at least one of electric voltage, electric current and electric power.

In some embodiments, the power supply receives an AC input.

In some embodiments, the power supply provides a DC output.

In some embodiments shutting off power input is performed at an instant which minimizes power wasted during the shutting off. The power waste which is minimized includes, by way of some non-limiting examples, power wasted as heat dissipation and/or power wasted by electromagnetic radiation.

In some embodiments shutting off power is performed by shunting input to an AC power supply at a moment when there is zero, or close to zero, voltage at an input to the power supply. Such shunting prevents or reduces sudden spikes in current/voltage, which can cause electromagnetic interference, and also causes power loss. Sensitive circuitry such as radio frequency receivers, a System On Chip, and others, are impacted by high frequency electromagnetic interference, and benefit from cancelling or reducing such interference.

In some embodiments, the input AC power operates, by way of some non-limiting examples, at 50, 60, or 400 Hz. Lower and higher frequencies are also supported.

In some embodiments, shutting off power is performed in synchronization with AC zero-crossings at the input to the power supply. Such shutting off of power can happen at a frequency up to twice the frequency of the AC source, by way of a non-limiting example, up to 100 or 120 or 800 times per second.

An example scenario is now described when an embodiment of the invention can be used. The example is not intended to limit a scope of the invention, and additional uses for embodiments of the invention are described within the present application.

By way of a non-limiting example, the power supply is an AC to DC converter. The AC to DC converter includes a capacitor which is charged to a desired voltage, and provides output. When the output current is low, there can be a reduction in wasted energy by shutting off power input, until the capacitor cannot supply output at the desired voltage/current/power. The power supply shuts off power input in order to minimize wasting energy. The input power can be turned on again when desired or needed.

In some embodiments, a contract associated with the AC to DC converter optionally senses that the capacitor is supplying output at the desired voltage/current/power, and optionally operates a switch to disconnect input power.

In some embodiments, a controller in the AC to DC converter optionally senses that the capacitor cannot supply output at the desired voltage/current/power, and optionally operates a switch to reconnect input power.

In some embodiments, a controller in the AC to DC converter optionally senses that the capacitor is nearing a state when the capacitor cannot supply output at the desired voltage/current/power, and optionally operates a switch to reconnect to input power based on the controller calculating in advance a time when such reconnection is desired.

In some embodiments, in addition to calculating when such reconnection is desired, the controller optionally senses when to perform the reconnection at an instance which does not cause a spike in input voltage/current/power.

In some embodiments the AC to DC converter includes a series capacitor that feeds the AC input of the AC to DC converter. In some embodiments the controller of the AC to DC converter optionally senses when the AC input provides zero or close to zero voltage across the AC input, and performs the reconnection at that time, so that no spike occurs over the series capacitor. Such a spike would otherwise potentially cause a waste of energy.

In some embodiments the AC input power control of the AC to DC converter is optionally performed by a shunt switch.

In some embodiments the shunting is optionally performed by a switch or by one or more MOSFET(s).

An aspect of some embodiments of the invention relates to a rectifier bridge comprising two MOSFETs wherein the two MOSFETs are configured to conduct simultaneously.

An aspect of some embodiments of the invention relates to an AC to DC converter including a controller which senses when output level of the voltage, current or power falls, and opens the shunt switch at the input of the AC to DC converter to provide DC power.

An aspect of some embodiments of the invention relates to a power supply such as, by way of a non-limiting example, an AC to DC converter, for providing power to an Internet of Things (IoT) device, which draws little or no power at some quiescent period of time, and significantly higher power or several higher power levels at other, times. In some embodiments the power supply is suitable for additional circuits which operate with a similar cycle, which draws little or no power at some quiescent period of time, and significantly higher power at another, peak period of time.

In some embodiments the AC to DC converter charges a capacitor toward the DC, output side of the converter, using a lower current than required by the IoT device during the peak period. Since power wasted in the AC to DC converter is proportional to the current passing through the converter squared (i2), the power supply charges the capacitor in a power saving fashion. When the IoT device draws current, the higher current consumes energy only from the capacitor onward toward the IoT device.

In some embodiments the capacitor comprises a supercapacitor.

In some embodiments the AC to DC converter charges the capacitor toward the DC, output side of the converter to a higher voltage than required by the IoT device during the peak period. Since the energy in a capacitor is proportional to $V^2 \cdot C$, the AC to DC converter can potentially use smaller capacitors (C) and higher voltages to store a same amount of electric energy. Using a smaller capacitor potentially saves cost, and/or size.

In some embodiments the AC to DC converter stores energy required for peak power consumption, for example of an IoT device, during standby mode. Power requirements of the AC to DC converter are potentially lower compared to a traditional AC to DC converter. By way of a non-limiting example, a 1 Watt AC to DC converter is conventionally needed to power an IoT device with a 1 Watt peak power consumption, even when the IoT device has a duty cycle ratio of 1:1,000. In some embodiments the same IoT device can operate with an AC to DC converter power requirement in a range of milliWatts. Some embodiments of the AC to DC converter potentially significantly reduce the size, and/or weight, and/or price and/or cost of the AC to DC converter compared to a conventional AC to DC converter.

An aspect of some embodiments of the invention relates to a power supply receiving input of AC power at a voltage of a wall socket power line, and converting the incoming AC power to DC power at a voltage suitable for use by an electronic circuit on a chip, such as, by way of some non-limiting examples, an integrated circuit, a System On Chip, and an Internet of Things device.

In some embodiments the incoming voltage is at a standard AC voltage such as 110V, 220V, in a range of 85V to 265V, 380V, 400V, or some other such standard or other AC voltage level.

In some embodiments the output DC voltage is at a standard DC voltage suitable for use by an electronic circuit on a chip, such as, by way of some non-limiting examples, (all the voltages can be either positive or negative) 5V, 3.3V, 3V, 2.7V, 1.8V, 1.5V, 1.2V, 0.9V, 0.8V or some other such standard or other DC voltage level.

An aspect of some embodiments of the invention relates to a power supply receiving input of AC power and providing both positive and negative DC output using just one input power shunt, at a correct timing in input AC cycle, to control providing correct DC output for both the positive DC output and the negative DC output.

An aspect of some embodiments of the invention relates to a power supply including a controller which stabilizes output (voltage, current, or power) when there is heavy load, light load or no load at the output.

In some embodiments, the controller operates a switch to shunt an input of the power supply.

In some embodiments, the switch shunts the input across a capacitor.

In some embodiments, the switch shunt includes a series capacitor.

In some embodiments the power supply is produced without an EMC component, since a capacitor shunts the input of the power supply.

In some embodiments the power supply is an AC to DC converter.

In some embodiments the controller stabilizes output (voltage, current or power) of an AC to DC converter in the power supply, by sensing the output, and optionally operating a switch to shunt the input to the AC to DC converter when the output is within some threshold value of a desired output.

In some embodiments the shunting is performed at an instant in the input AC cycle which minimizes wasted energy.

In some embodiments the controller senses when input voltage and/or current is at zero, or very close to zero, and performs the shunting at that instance.

In some embodiments the controller calculates an instant when input voltage and/or current is due to reach zero, or very close to zero, based on sensing the AC input cycle. In some embodiments, a switch is optionally used for shunting even if the switch does not respond instantaneously, and the switch is optionally triggered at a time before the input voltage and/or current is calculated to reach zero, so that the shunting will occur at a time when the input voltage and/or current is at zero.

In some embodiments the calculation procedure of estimating an instant when input voltage and/or current is due to reach zero adapts the estimation according to previous cycles of the AC input.

In some embodiments the AC to DC converter is configured to provide more than one output of DC voltage/current/power. In some embodiments the multiple DC voltage/current/power outputs may provide different DC voltage/current/power values.

In some embodiments, when the AC to DC converter is configured to provide multiple outputs, the controller is optionally configured to sense the multiple outputs and optionally operates switches to disconnect an output capacitor which does not require additional charging.

In some embodiments the controller is a single-output controller. In some embodiments the controller is a multiple-output controller.

In some embodiments the AC to DC converter includes more than one output controller which controls one or more series switches.

In some embodiments the AC to DC converter includes a voltage regulator for regulating output voltage of one or more DC outputs.

In some embodiments, the AC to DC converter includes a four-diode rectifier bridge. In some embodiments, the AC to DC converter includes less than four diodes in the rectifier.

In some embodiments, the AC to DC converter includes a full wave rectifier. In some embodiments, the AC to DC converter includes a half wave rectifier.

An aspect of some embodiments of the invention relates to an AC to DC converter provides stabilized output voltage at two different polarities, using a controller and a single switch.

In some embodiments, the controller operates the switch to shunt an input of the power supply.

An aspect of some embodiments of the invention relates to an AC to DC converter for driving a relay, providing an output voltage of the AC to DC converter equal to a pick-up voltage of the relay, and a current limit of the AC to DC converter equal to a hold current of the relay.

In some embodiments a controller in the AC to DC converter is used to stabilize the voltage and the current to the relay as described above with reference to stabilizing output of the AC to DC converter.

An aspect of some embodiments of the invention relates to a feedback system which samples one or more outputs of an AC to DC converter, and optionally provides a decision to a controller which controls a shunt-switch for shorting the AC inputs of the converter.

In some embodiments the decision to short is provided based on detecting zero crossing events of the AC inputs of the AC to DC converter and/or zero crossing events of series switches related to the output of the AC to DC converter.

In some embodiments the feedback-system optionally provides a first, fir example TRUE output when absolute values of sampled signals is higher than a predetermined threshold value associated with the sampled signal, else the Feedback-System output provides a second, for example FALSE output. The speed requirements of the feedback system is in the range of twice the frequency of the AC power source, which is typically not fast in terms of electronic circuits.

An aspect of some embodiments of the invention relates to reducing or eliminating power dissipated by a bleeder resistor. A bleeder resistor is a technique which discharges capacitors when electrical appliances are disconnected from power lines. The bleeder resistor is typically connected between the power lines or in parallel to a capacitor that needs to be discharged when an electric appliance is disconnected from power, yet consumes power and increases power waste when an electrical appliance is connected to power and the bleeding is not needed.

In some embodiments the AC to DC converter bleeds, for example via a resistor when disconnected power supply or power socket.

In some embodiments the AC to DC converter disconnects the bleeder resistor when connected to the power line and connects the bleeder resistor when the power line is disconnected.

An aspect of some embodiments of the invention relates to Switching on a bleeder resistor using only two terminals.

An aspect of some embodiments of the invention relates to an active switch apparatus.

In some embodiments, the active switch is in disconnection mode, when the active switch detects an AC voltage across its terminals.

In some embodiments, the active switch is in conduction mode, when the active switch when it does not detect an AC voltage across its terminals.

In some embodiments the active switch apparatus enables discharging a capacitor, for example in a power supply such as an AC to DC converter, when the power supply disconnected from power lines, while eliminating power waste during steady state operation. When the active switch does not detect an AC voltage across its terminals, the active switch can optionally discharge charge stored in the AC to DC converter when the AC to DC converter is disconnected from power lines.

Optionally, the input impedance of a power supply according to some embodiments of the invention has a capacitance characteristic. When using such a power supply as a power supply it can eliminate a need for EMC filtration.

Optionally, design of some embodiments of the invention includes an inherent current limit and/or short protection feature. During the current limit mode or the short protection mode the efficiency of the AC to DC converter remains high without additional power dissipation. Such a feature can be used in many design applications.

By way of a non-limiting example, when driving a relay, the output voltage of the power supply can be configured to the pick-up voltage of the relay and the current limit characteristic of the power supply can be configured to the hold current of the relay. Such a design is potentially inexpensive and can reduce the power consumption of the relay by more than 100 times.

By way of another non limiting example, when driving a low power load with short pulses of power consumption, such as an Internet of Things (IoT) device. An IoT device is often characterized by low standby power consumption in a range of milliWatts, and during time of connection with the Internet a peak power consumption which can rise to a range of Watts for short periods. Since most of the time the IoT device is in standby mode, a ratio between the time in standby mode to the time of the Internet connection mode is typically in the range of 1:300 to 1:10,000,000.

Some embodiments of the invention exploit the characteristic power consumption of an IoT device by storing energy required for the peak power during the standby mode. The AC to DC power requirements of some embodiments of the invention can be much lower compared to a traditional AC to DC converter. For example, a 1 Watt prior art AC to DC converter is required to operate an IoT device with 1 watt peak power with a duty cycle ratio of 1:1,000, while some embodiments of the invention can operate the same IoT device with AC to DC requirements in the range of milliWatts. Some embodiments of the invention can be constructed with a reduction in size, weight and cost of the AC to DC converter.

Some embodiments of the invention optionally include a solution to a problem of a bleeder resistor. A bleeder resistor is used to discharge capacitors when electrical appliances are disconnected from the power lines. The bleeder resistor is typically connected between the power lines or in parallel to a capacitor that needs to be discharged. However, when the electrical appliance is connected to the power lines, the bleeder capacitor consumes power and can increases power waste.

In some embodiments of the invention disconnects the bleeder resistor when connected to the power line and enables the bleeder resistor when the power line is disconnected.

There is thus provided in accordance with some embodiments of the present invention a Rectifier-Controller for stabilizing one or more outputs which are driven by a rectifier by controlling a Shunt-Switch that can short the AC inputs of that rectifier, including:

A Feedback-System that samples one or more of the outputs and provides a binary decision according to the sampled signals; and A controller which controls the Shunt-Switch according to zero crossing events of the AC inputs of the rectifier and the output of the Feedback-System.

In some embodiments the Feedback-System indicates a true signal at its output, when each of the absolute values of the sampled signals is higher than a predetermined value associated with the sampled signal thereof, otherwise the Feedback-System output indicates a false signal.

In some embodiments the Feedback-System includes:

A Positive-Feedback-System that samples one or more of the absolute value of the outputs which are driven by the positive output voltage of the rectifier, and indicates a true signal at its output, when each of the sampled signals is higher than a predetermined value associated with the sampled output thereof, otherwise the output of the Positive-Feedback-System indicates a false signal; and A Negative-Feedback-System that samples one or more of the absolute value of the outputs which are driven by the negative output voltage of the rectifier, and indicates a true signal at its output, when each of the sampled signals is higher than a predetermined value associated with the sampled output thereof, otherwise the output of the negative-Feedback-System indicates a false signal; and during the positive cycles of the voltage across the AC inputs of the rectifier, the output of the Feedback-System tracks the output of the Positive-Feedback-System, and during the negative cycles of the voltage across the AC inputs of the rectifier, the output of the Feedback-System tracks the output of the Negative-Feedback-System.

In some embodiments the controller flips ON the Shunt-Switch on a zero crossing events of the AC inputs of the rectifier while the output of the Feedback-System indicates true signal, and flips OFF the Shunt-Switch when the output of the Feedback-System indicates false signal.

In some embodiments the controller flips ON or OFF the Shunt-Switch on zero crossing events of the AC inputs of the rectifier while the output of the Feedback-System indicates true or false signal, respectively.

In some embodiments, further including one or more Series-Apparatuses, which its input is driven by the positive or the negative voltage outputs of the rectifier and its output generates another output;

the Series-Apparatus conducts between its input and its output when the absolute value of its input voltage is higher by a predetermined value than the absolute value of its output, while the absolute value of its output is lower than another predetermined value, otherwise the Series-Apparatus disconnects its input from its output.

In some embodiments, at least one of the predetermined values is varying according to a function of at least one of the following: time, the electrical parameters of the outputs which are driven by the rectifier, the electrical parameters of a load which is driven by the outputs.

In some embodiments, further comprising a capacitor connected between the AC inputs of the rectifier.

In some embodiments, further comprising a capacitor connected in series to the Shunt-Switch. Preferably, further comprising a capacitor connected in series to the Shunt-Switch.

There is also provided in accordance with some embodiments of the invention an apparatus of a full wave bridge rectifier including at least two Controlled-Switches that can short the AC input of the bridge rectifier and which drive the positive or the negative DC outputs of the bridge rectifier, and a controller, wherein the controller turns ON both Controlled-Switches simultaneously or independently in order to stabilize one or more outputs which are driven by that DC output of the bridge rectifier and the voltage drop across each of the Controlled-Switches during ON condition is less than 0.3V.

In some embodiments the voltage drop across each of the Controlled-Switches during ON condition is less than 0.2V.

In some embodiments the voltage drop across each of the Controlled-Switches during ON condition is less than 0.1V.

In some embodiments, further comprising a capacitor connected between the AC inputs of the rectifier.

In some embodiments, the controlled switches are MOSFETs.

There is thus provided in accordance with some embodiments of the invention an apparatus, comprising a controlled switch and a detector; the controlled switch is turned OFF or ON according to the detector detection of absence or presence of AC signals, respectively.

In some embodiments the controlled switch is controlled AC current sink. Alternatively to the controlled switch is combined with series resistor. Preferably the apparatus has only two terminals.

There is thus provided in accordance with some embodiments of the invention an apparatus that converts an AC input to one or more DC outputs wherein the power consumption through the AC input of the apparatus raises as a result of a current pulse at one or more of the DC outputs, according to the average of the power supplied, where the average is calculated for a time period which is not less than one hundred times of the width time of the current pulse; comprising: a capacitor connected in series with a controlled switch which are connected to the AC input of the apparatus.

In some embodiments the average is calculated for a time which is not less than one thousand times of the width time of the current pulse.

In some embodiments the average is calculated for a time which is not less than ten thousand times of the width time of the current pulse.

There is thus provided in accordance with some embodiments of the invention an AC to DC converter that has at least two DC outputs which feed a single DC output through regulators that stabilizes the DC level of that single output wherein at least one of the regulators is enabled upon a request from a load which is fed by that single output; comprising at least one input line for high power request by the load which enables at least one of the regulators.

In some embodiments at least one of the regulators is a linear regulator.

In some embodiments at least one of the regulators is a switch mode power supply.

Figure 1A:
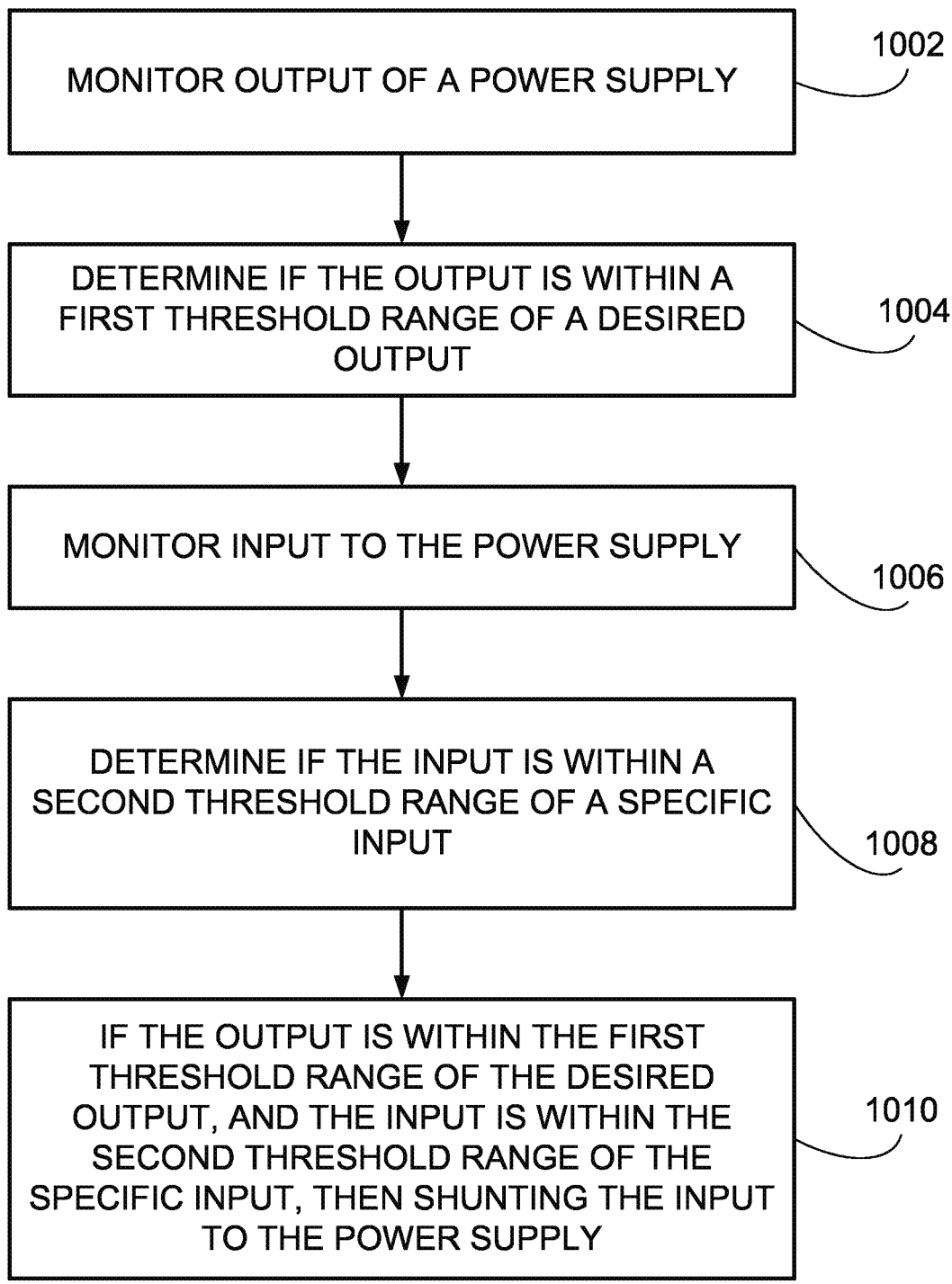
FIG. 1A is a simplified flow chart illustration of a method of shunting input power to a power supply according to an example embodiment of the invention.

Reference is now made to FIG. 1A, which is a simplified flow chart illustration of a method of shunting input power to a power supply according to an example embodiment of the invention.

The method of FIG. 1A includes:
monitoring output of a power supply (1002);
determining if the output is within a first threshold range of a desired output (1004);
monitoring input to the power supply (1006);
determining if the input is within a second threshold range of a specific input (1008); and
if the output is within the first threshold range of the desired output, and the input is within the second threshold range of the specific input, then shunting the input to the power supply (1010).

In some embodiments, the specific input is optionally zero, and the second threshold range is selected as an input close to zero.

In some embodiments, the determining if the input is within a second threshold range of a specific input includes determining if a difference or an absolute difference of the input from zero voltage is less than a second threshold value In some embodiments, the second threshold range of the specific input is optionally selected as a percentage of a maximum value of the input.

In some embodiments, where voltage is monitored, the input may be input voltage of 50V-1000V and above, to any voltage supported by an input capacitor, and the second threshold of is optionally less than 10V, 1V, 0.1V, 0.01 or 0.001 Volt.

In some embodiments the second threshold voltage is selected based upon the following considerations:

Energy waste during 1 second due to not shunting during a zero crossing event is:

$$W_{waste(1sec)} = \underbrace{(\text{line frequency} \times 2)}_{\text{No of zero crrosing events}} \times \left[ \underbrace{\frac{1}{2} C \cdot (V_{Cmax})^2}_{\text{energy before switching}} - \underbrace{\frac{1}{2} C \cdot (V_{Cmax} - V_{zr})^2}_{\text{energy after switching}} \right]$$

When dividing the energy waste by time (for example 1 second) we get an average wasted power which is:

$$P_{waste} = \frac{W_{waste(1sec)}}{t(1sec)} = \underbrace{(\text{line frequency} \times 2)}_{\text{No of zero crrosing events}} \times \frac{1}{2} C \cdot [2V_{Cmax} \cdot V_{zr} - V_{zr}^2]$$

Where:
$V_{Cmax}$—the peak voltage of the input
$V_{zr}$—the voltage close to and before an instant when the switch will close
C—Capacitance For example:
Assuming 230 VAC at the input and a capacitor of 1 uF (typical value) and assuming the switch is operating at a maximum speed at 100 HZ (line frequency×2) the waste (dissipation or radiation) will be as follows:

$$P_{waste}[\text{watt}] = (\text{line frequency} \times 2) \times \frac{1}{2} C \cdot [2V_{Cmax} \cdot V_{zr} - V_{zr}^2] =$$

-continued $$2 \times 50 \times \frac{1}{2} 10^{-6} \cdot [2 \cdot \sqrt{2} \cdot 230 \cdot V_{zr} - V_{zr}^2] \underset{V_{zr} < 1 volt}{\sim} 0.0325 \times V_{zr}$$

For $V_{zr}$=0.1v typical wasted power is 3.2 milliWatt.

According to the new energy efficiency label standard for standby power waste, a zero standby mode is considered as less than 5 milliWatts.

In some embodiments the second threshold voltage is less than 0.1V or even less than 0.01V. Selecting a lower second threshold voltage is especially useful in cases of a high input voltage, such as 530 VAC at 60 Hz.

Figure 1B:
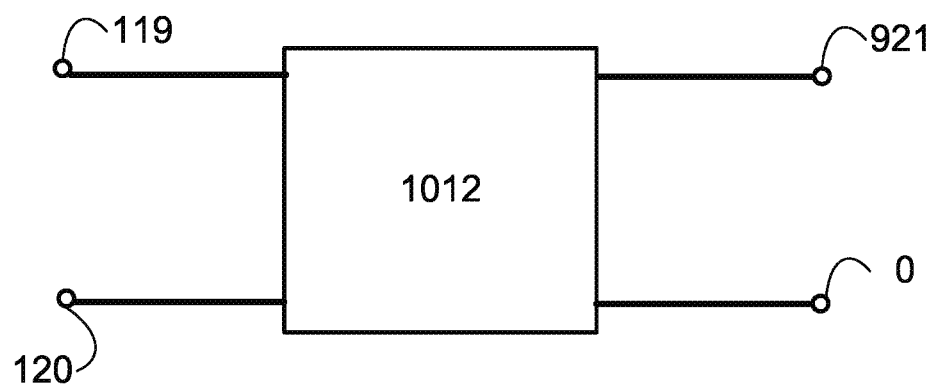
FIG. 1B is a simplified block diagram illustration of apparatus for reducing electric power waste according to an example embodiment of the invention.

Reference is now made to FIG. 1B, which is a simplified block diagram illustration of apparatus for reducing electric power waste according to an example embodiment of the invention.

The apparatus of FIG. 1B includes input between terminals 119 120, a power supply 1012 and output between terminals 0 921.

In some embodiments the power supply 1012 is configured to monitor output of the power supply 1012, to determine if the output is within a first threshold range of a desired output, and to monitor input to the power supply 1012 to determine if the input is within a second threshold range of a desired input, and if the output is within the first threshold range of the desired output, and the input is within the second threshold range of the desired input, then to shunt the input to the power supply 1012.

In some embodiments, determining if the input is within a second threshold range of a desired includes determining if a difference or an absolute difference of the input from zero voltage is less than the second threshold value.

In some embodiments, the input is an AC input, and the output is a DC output.

In some embodiments, the shunting is through a shunting element (not shown) configured to reduce power waste and/or electromagnetic interference.

Figure 1C:
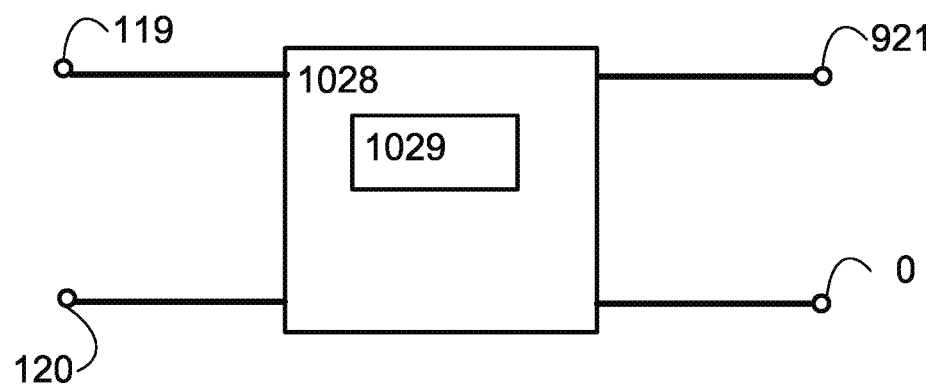
FIG. 1C is a simplified block diagram illustration of apparatus for reducing electric power waste according to an example embodiment of the invention.

Reference is now made to FIG. 1C, which is a simplified block diagram illustration of apparatus for reducing electric power waste according to an example embodiment of the invention.

The apparatus of FIG. 1C includes input between terminals 119 120, a power supply 1028, a controller 1029 and output between terminals 0 921.

In some embodiments the controller 1029 is configured to monitor output of the power supply 1028, to determine if the output is within a first threshold range of a desired output, and to monitor input to the power supply 1028 to determine if the input is within a second threshold range of a specific input, and if the output is within the first threshold range of the desired output, and the input is within the second threshold range of the specific input, then to control shunting the input to the power supply 1028.

In some embodiments, the input is an AC input, and the output is a DC output.

In some embodiments, the shunting is through a shunting element (not shown) configured to reduce power waste and/or electromagnetic interference.

Figure 1D:
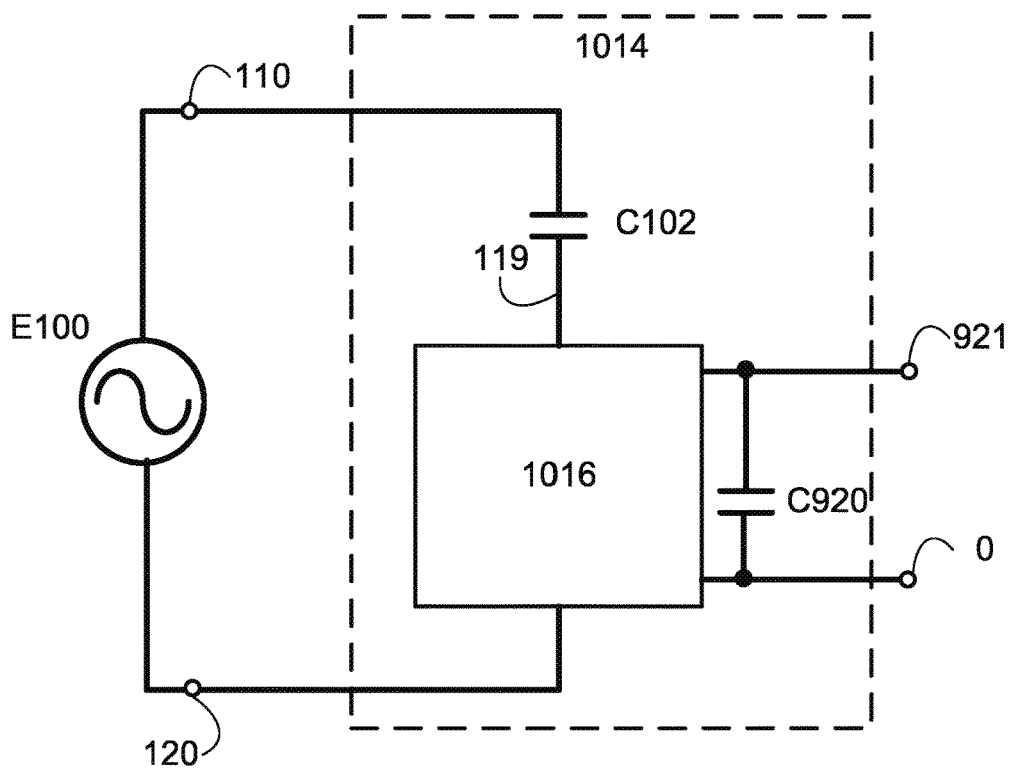
FIG. 1D is a simplified block diagram illustration of apparatus for reducing electric power waste according to an example embodiment of the invention.

Reference is now made to FIG. 1D, which is a simplified block diagram illustration of apparatus for reducing electric power waste according to an example embodiment of the invention.

The apparatus of FIG. 1D includes AC input E100 between terminals 110 120, a power supply 1014 and DC output between terminals 0 921.

In some embodiments the output includes a capacitor C920 which stabilizes the DC output across the terminals 0 921.

In some embodiments the input includes a capacitor C102 which drops the input voltage without power dissipation.

In some embodiments an AC to DC converter 1016 is configured to determine if the capacitor C920 charge is within a first threshold range of a desired charge, and to monitor input voltage across the capacitor C102 to determine if the absolute value of input voltage across the terminals 119 120 is within a second threshold range from zero voltage, and if the capacitor C920 charge is within the first threshold range of the desired charge, and the input voltage across the terminals 119 120 is within the second threshold range from zero voltage, then to shunt the input to the power supply 1012.

In such an embodiment, shunting terminals 119 120 results in little or no power expenditure.

Figure 1E:
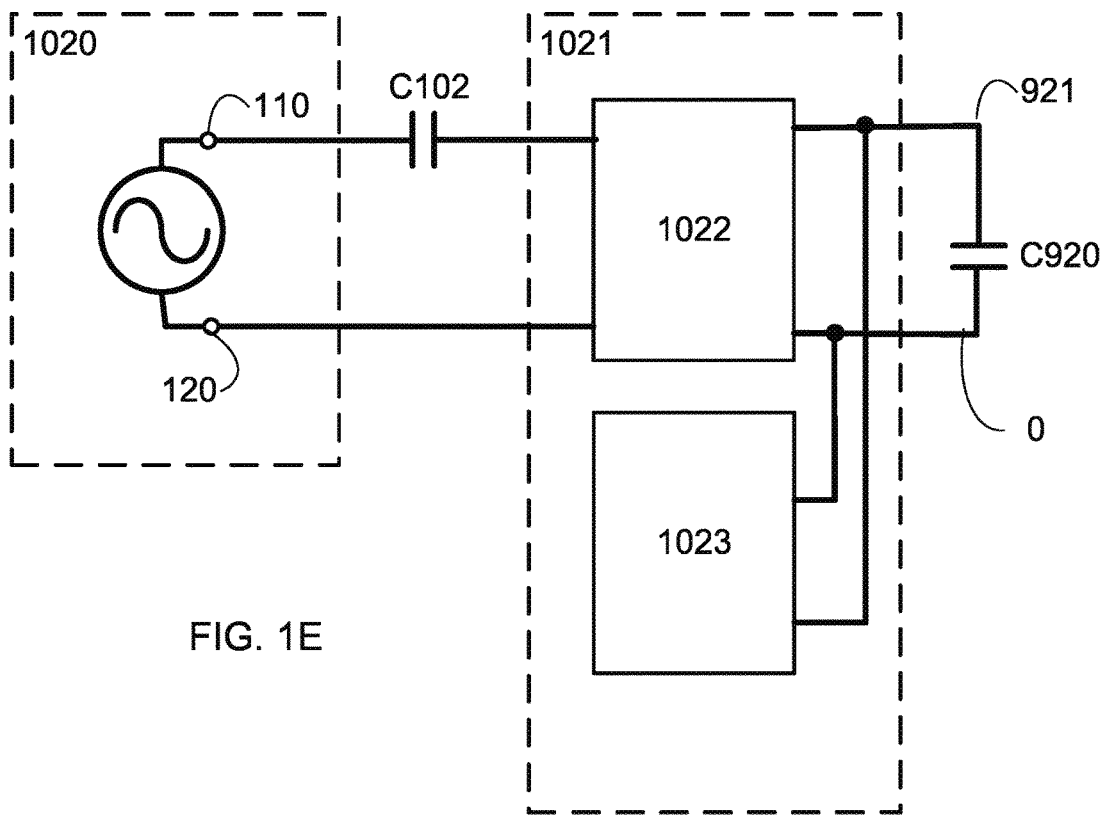
FIG. 1E is a simplified block diagram illustration of a power supply for reducing electric power waste implemented on an electronic chip according to an example embodiment of the invention.

Reference is now made to FIG. 1E, which is a simplified block diagram illustration of a power supply for reducing electric power waste implemented on an electronic chip according to an example embodiment of the invention.

FIG. 1E shows a power line AC input 1020, providing AC power between terminals 110 120. In some embodiments the AC power is optionally a power socket or a wall socket providing 110V, 220V, 240V, 85V-240V, and/or other AC voltage standards.

FIG. 1E also shows an electronic chip 1021, which includes a power supply 1022 providing DC output between terminals 0 921. The power supply 1022 of FIG. 1E is implemented on an electronic chip, for example on a Silicon chip.

FIG. 1E also shows an electronic circuit 1023, such as a System On Chip (SOC) or Internet Of Things (IoT) device receiving DC input between terminals 0 921. The electronic circuit 1023 of FIG. 1E is optionally implemented on a same electronic chip as the power supply 1022.

In some embodiments the output includes a capacitor C920 which stabilizes the DC output across the terminals 0 921.

In some embodiments the input includes a capacitor 0102 which drops the input voltage without power dissipation. In some embodiments the input capacitor C102 acts as a reactive component which drops voltage from the AC input, for example wall socket voltage, to values suitable for a circuit on an electronic chip, for example 5V, 3.3V, 3V, and other values in a range suitable for a circuit on an electronic chip.

In some embodiments the power supply 1022 is configured to determine if the capacitor C920 charge is within a first threshold range of a desired charge, and to monitor input voltage across the capacitor C102 to determine if the absolute value of input voltage is across the terminals 119 120 is within a second threshold range from zero voltage, and if the capacitor C920 charge is within the first threshold range of the desired charge, and the input voltage across the terminals 119 120 is within the second threshold range from zero voltage, then to shunt the input to the power supply 1022.

In some embodiments the power supply 1022 implements a timing method for switching at a low rate, no more than twice the frequency of the AC frequency of the power source 1020 which minimizes, electromagnetic noise, so that the electronic circuit 1023 may optionally include circuits such as sensitive receiver or radio circuits and/or sensitive electronic circuits, and the electronic circuit 1023 does not suffer from electromagnetic interference from proximity of the power supply 1022 even if they are implemented on one silicon chip.

In some embodiments, the power supply 1022 is placed on a same chip as an electronic circuit 1023 which is sensitive to better than −100 dBm, and the power supply 1022 does not significantly interfere with the electronic circuit 1023 when shunting input power to the power supply 1022.

Figure 1F:
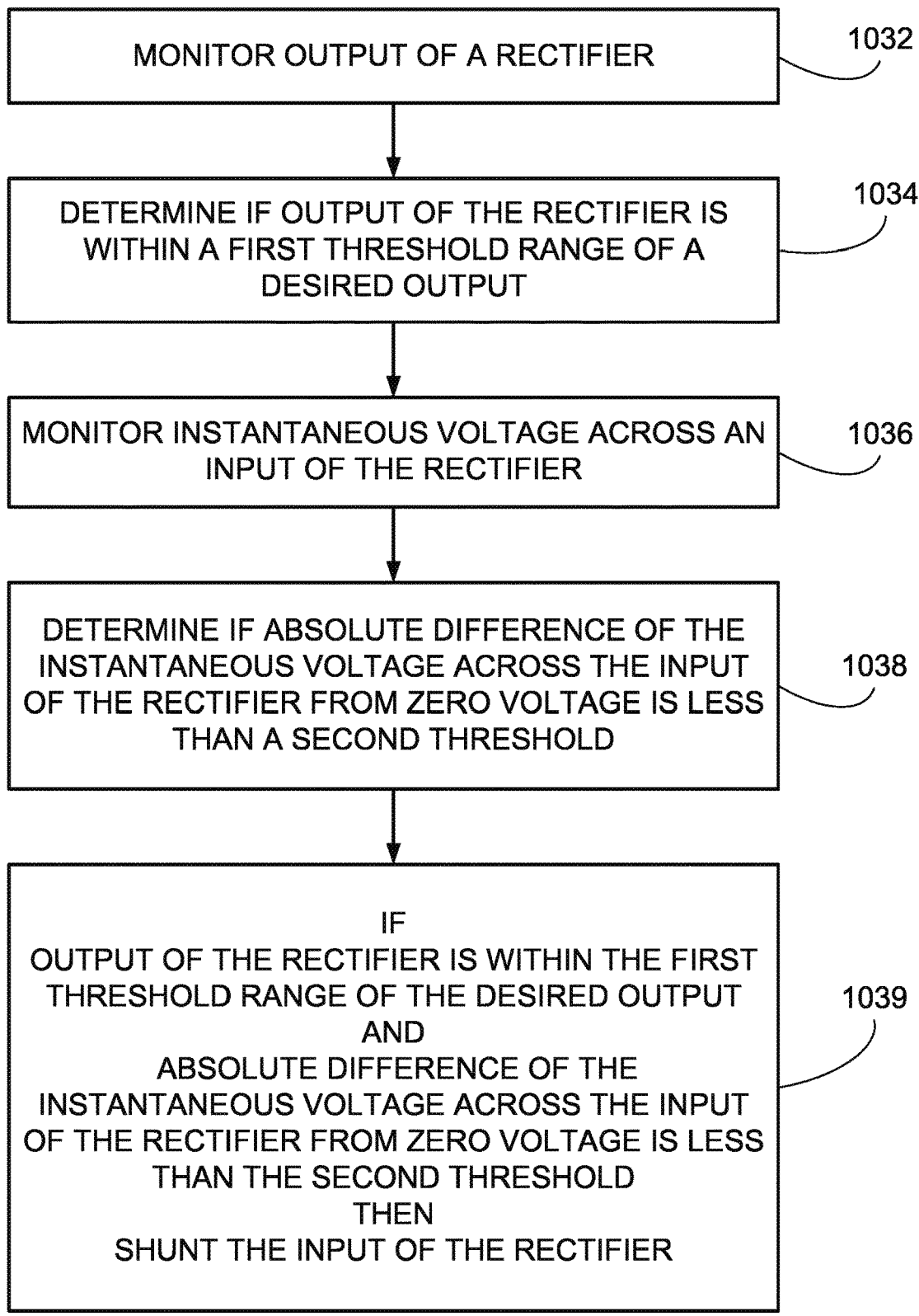
FIG. 1F is a simplified flow chart illustration of a method for reducing electric power waste according to an example embodiment of the invention.

Reference is now made to FIG. 1F, which is a simplified flow chart illustration of a method for reducing electric power waste according to an example embodiment of the invention.

The method of FIG. 1F includes:
monitoring output of a rectifier (1032);
determining if output of the rectifier is within a first threshold range of a desired output (1034);
monitoring instantaneous voltage across an input of the rectifier (1036);
determining if an absolute difference of the instantaneous voltage across the input of the rectifier from zero voltage is less than a second threshold (1038); and
if the output of the rectifier is within the first threshold range of the desired output, and the absolute difference of the instantaneous voltage across the input of the rectifier from zero voltage is less than the second threshold, then shunting the input of the rectifier (1039).

Figure 1G:
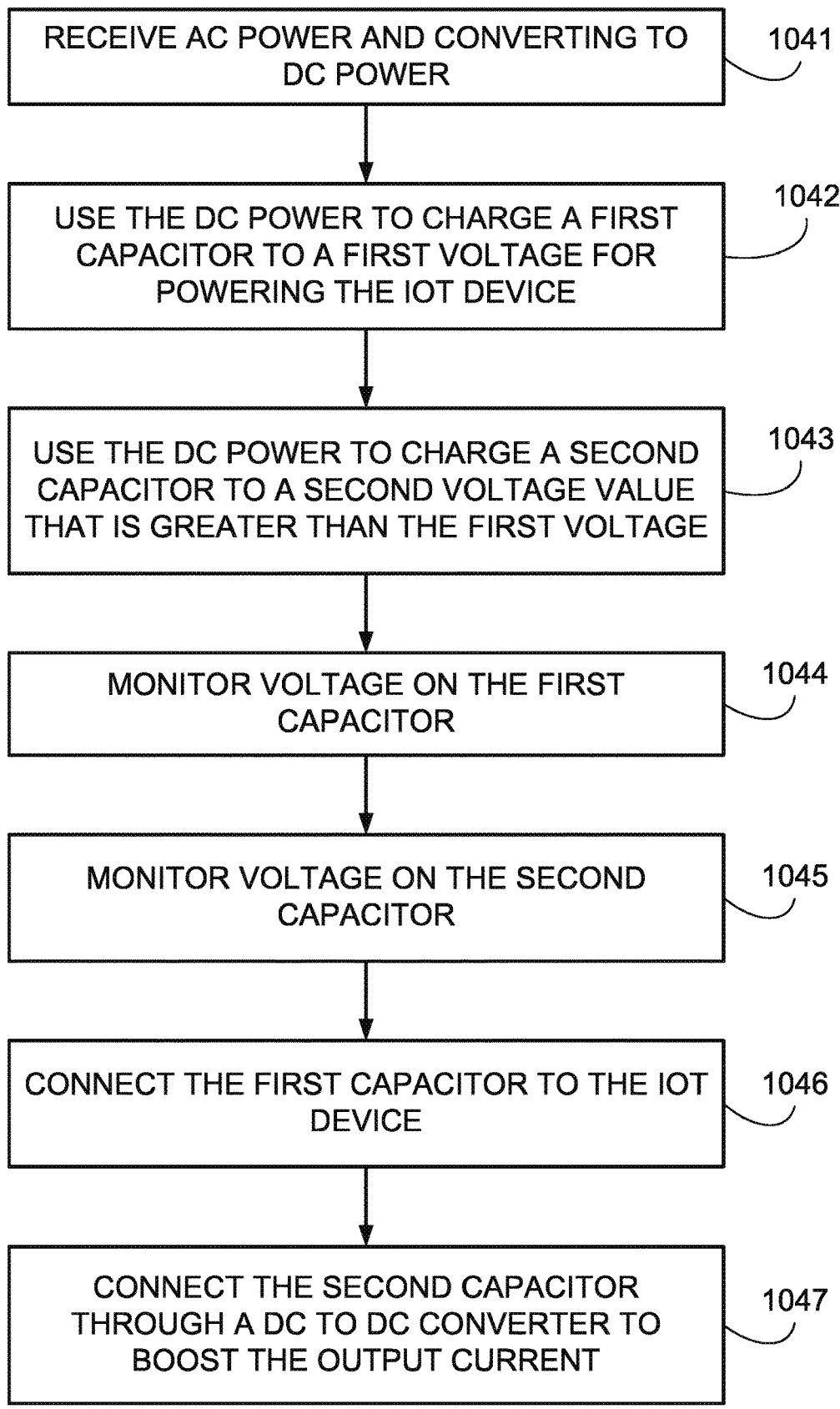
FIG. 1G is a simplified flow chart illustration of a method for providing power for an IoT device according to an example embodiment of the invention.

Reference is now made to FIG. 1G, which is a simplified flow chart illustration of a method for boosting power for an IoT device according to an example embodiment of the invention.

The method of FIG. 1G includes:
receiving AC power and converting to DC power (1041);
using the DC power to charge a first capacitor to a first voltage for powering the IoT device (1042);
using the DC power to charge a second capacitor to a second voltage value that is greater than the first voltage (1043);
monitoring voltage on the first capacitor (1044);
monitoring voltage on the second capacitor (1045);
connecting the first capacitor to the IoT device (1046); and connecting the second capacitor through a DC to DC converter to boost the output current to the IoT device (1047).

Figure 1H:
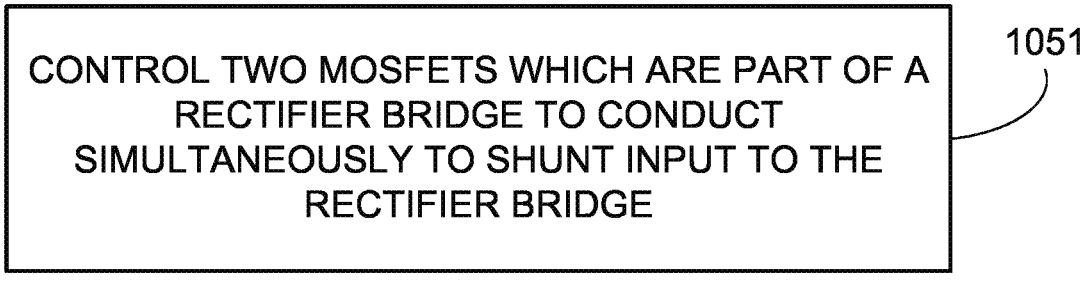
FIG. 1H is a simplified flow chart illustration of a method for shunting input to an AC to DC rectifier according to an example embodiment of the invention.

Reference is now made to FIG. 1H, which is a simplified flow chart illustration of a method for shunting input to an AC to DC rectifier according to an example embodiment of the invention.

The method of FIG. 1H includes:
controlling two MOSFETs which are part of a rectifier bridge to conduct simultaneously to shunt input to the rectifier bridge (1051).

Figure 1I:
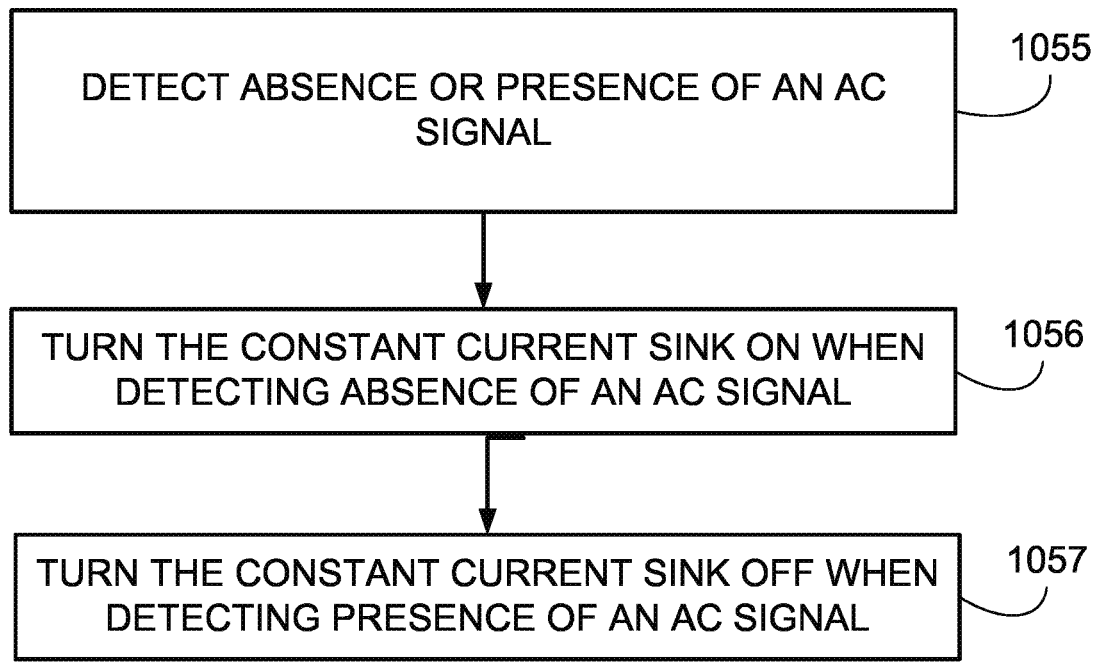
FIG. 1I is a simplified flow chart illustration of a method for controlling an AC current sink according to an example embodiment of the invention.

Reference is now made to FIG. 1I, which is a simplified flow chart illustration of a method for controlling an AC current sink according to an example embodiment of the invention.

The method of FIG. 1I includes:
detecting absence or presence of an AC signal (1055);
turning the constant current sink ON when detecting absence of an AC signal (1056); and
turning the constant current sink OFF when detecting presence of an AC signal (1057). For purposes of better understanding some embodiments of the present invention, reference is made to FIG. 1J, which is a simplified diagram of a prior art AC to DC converter.

Figure 1J:
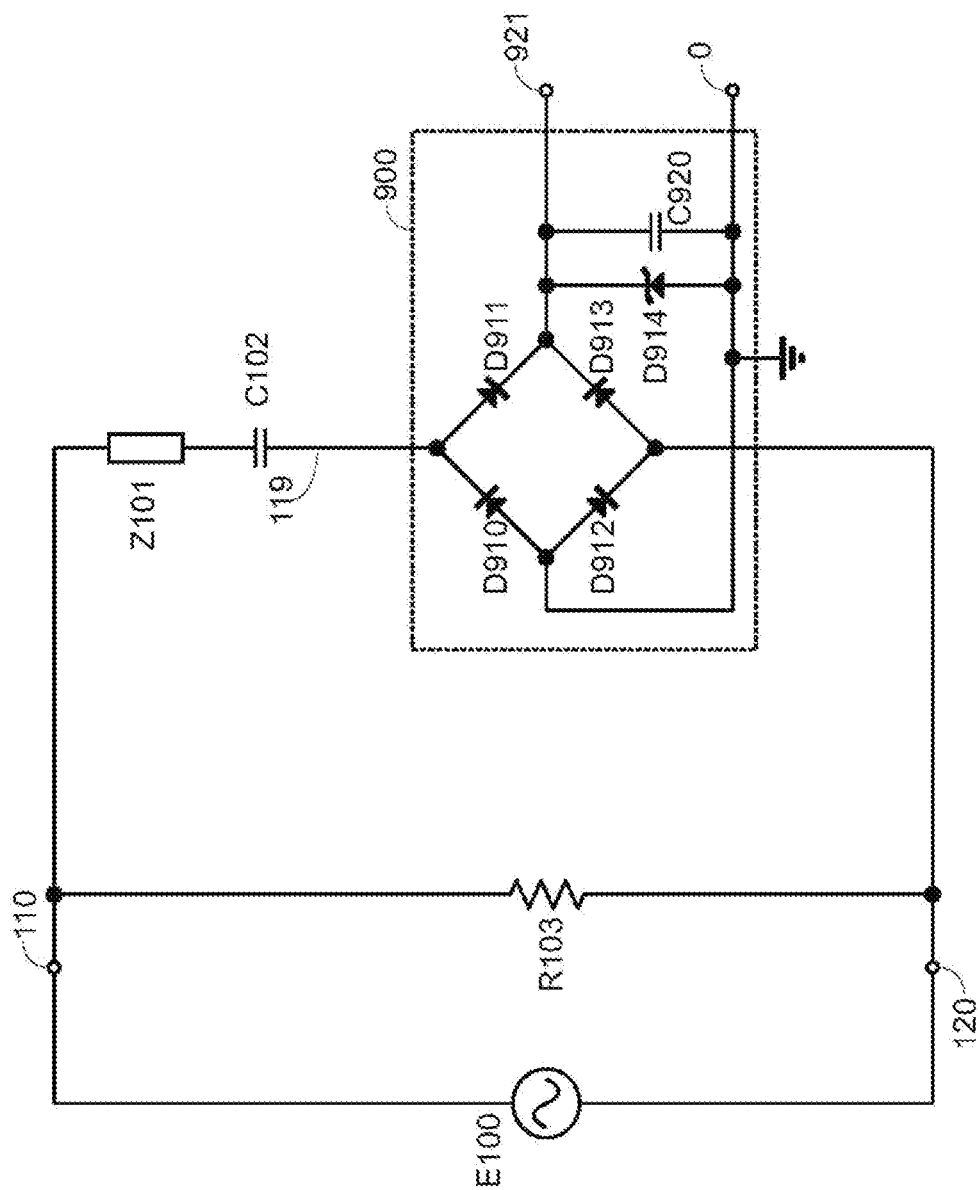
FIG. 1J is a simplified diagram of a prior art AC to DC converter.

FIG. 1J shows an AC power source E100 connected through terminals 110 and 120 to an AC to DC converter. The AC to DC converter includes: a resistor or a thermistor Z101, which limits inrush current during start-up, a capacitor C102 that drops the AC voltage without any heat dissipation, four diodes D 910 D911 D912 D913, which are connected in a full wave rectifier (bridge rectifier) configuration, an output capacitor C920 that filters the DC, and a Zener diode D914 that stabilizes the DC output voltage between rectified DC 921 and ground 0. In addition the circuit consists of a "bleeder" resistor R103 that discharges capacitor 102 when terminal 110 and 120 are disconnected from power source E100. This is a simple AC to DC converter. One drawback of this converter is its standby power consumption. Due to the voltage stabilization of the Zener diode D914, the power consumption is constant regardless of the power consumed by the load connected to the output terminals. Under a no load condition, the Zener diode converts all the output power capabilities into heat dissipation. When considering a variation of power line voltage which is usually ±10%, power dissipation over the Zener diode can increase by 40% compared to a fixed AC input. In addition when a wide input voltage range is required such as 85 to 265 VAC, the power dissipation over the Zener diode can increase by ten times compared to a fixed AC input.

Figure 2A:
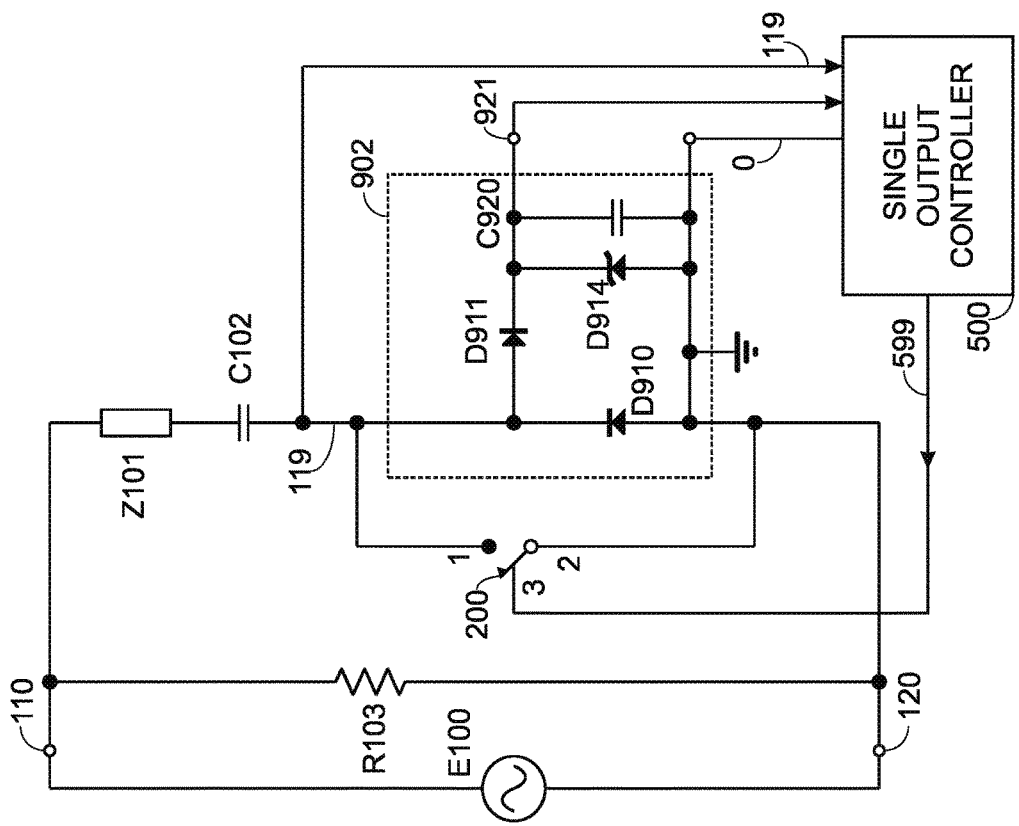
FIG. 2A is a simplified illustration of an AC to DC converter according to an example embodiment of the invention.

Reference is now made to FIG. 2A, which is a simplified illustration of an AC to DC converter according to an example embodiment of the invention.

FIG. 2A shows a switch 200 optionally connected between the AC input of the full wave rectifier, between rectifier AC inputs 119 and 120, and a Single-Output-Controller 500 that controls the switch 200.

The inputs of Single-Output-Controller 500 include rectified DC 921, rectifier AC inputs 119, 120, and ground 0. Such a configuration enables stabilizing the output voltage by controlling the switch 200. When the switch 200 is open, most of the input power is delivered to the load, which is not shown the load is connected between rectified DC 921 and ground 0. When the switch 200 is closed the current through the input terminals 110 and 120 is increased, however, the RMS power is decreased since the voltage and the current are in quadrature. Practically, the RMS power when the switch 200 is closed is the accumulative power dissipated by Z101 (the inrush current protector) and by resistor R103 (the "bleeder" resistor).

Figure 2B:
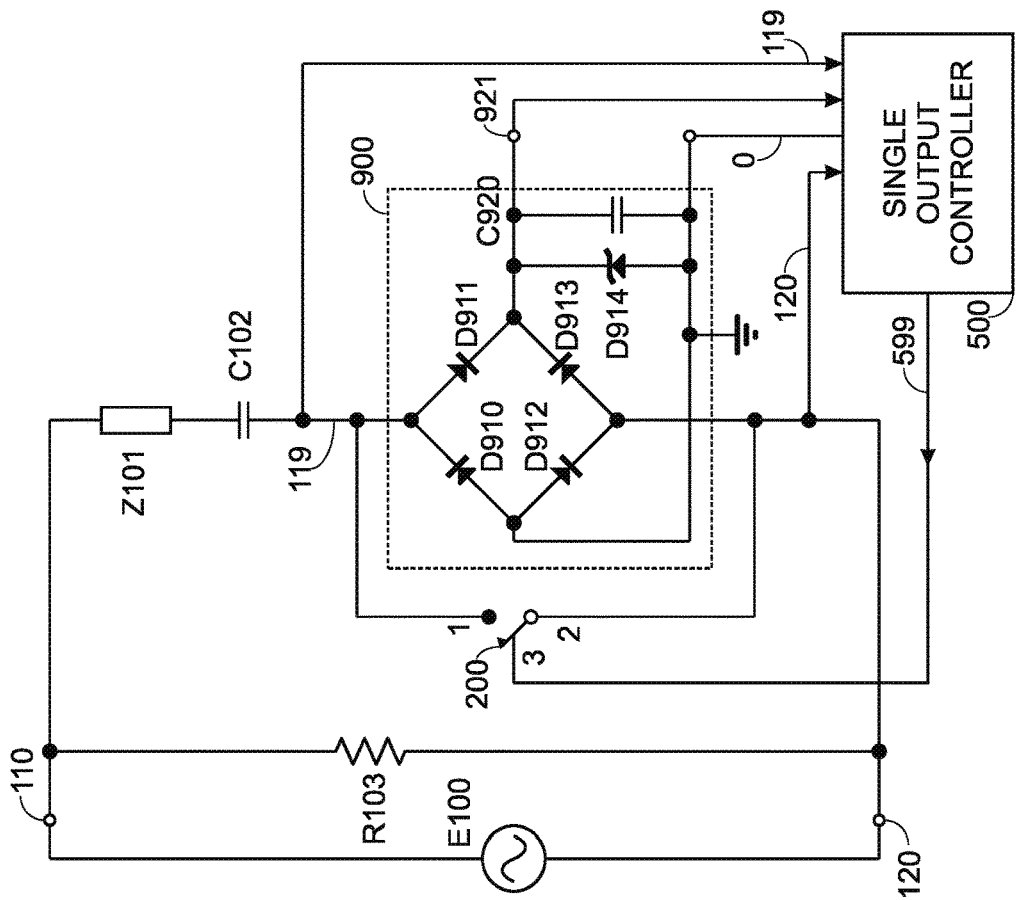
FIG. 2B is a simplified illustration of an AC to DC converter according to an example embodiment of the invention.

Reference is now made to FIG. 2B, which is a simplified illustration of an AC to DC converter according to an example embodiment of the invention.

FIG. 2B shows the full wave rectifier was replaced with a half wave rectifier including diodes D911 and D910.

Reference is now made to FIG. 3A, which is a simplified illustration of a switching element of an AC to DC converter according to an example embodiment of the invention.

In some embodiments, the switching element of FIG. 3A serves as a switching element in the example embodiment AC to DC converters of FIGS. 2A and 2B.

FIG. 3A shows rectifiers 900 in FIGS. 2A and 2B replaced with an equivalent impedance Z188 omitting the "bleeder" resistor R103 of FIG. 2A and FIG. 2B.

Reference is now made to FIG. 3B, which is a simplified timing diagram corresponding showing timing of electric signals in an example embodiment of the invention.

FIG. 3B shows a timing diagram which describes a problem caused by incorrect timing of a switching event. Timing diagram (ii) demonstrates the conditions of S200 in FIG. 3A. Timing diagram (i) demonstrates the input voltage of terminal 110 (referred to ground 120) and timing diagram (iii) demonstrates the voltage between rectifier AC inputs 119 and 120 (across impedance Z188). At time $t_0$, when S200 is closed, the voltage across S200 falls immediately to zero, which forces an immediate change of the voltage across capacitor 102 combined with impedance Z101. This immediate change is demonstrated in timing diagram (iv) by a negative current impulse at time t0. During this current impulse, Z101 dissipates energy (Z101 has is resistive). Energy losses caused by this impulse can be calculated according to the energy difference of capacitor C102 before and after the impulse event.

$$\Delta E = \underbrace{\frac{1}{2} C_{102} \cdot (V_{110}(t_0) - V_{119}(t_0^-))^2}_{\text{the energy before the transient}} - \underbrace{\frac{1}{2} C_{102} \cdot \left( V_{110}(t_0) - \underbrace{V_{119}(t_0^+)}_{=0} \right)^2}_{\text{the energy after the transient}}$$

$$\Delta E = \frac{1}{2} C_{102} \cdot V_{119}(t_0^-) \cdot (V_{119}(t_0^-) - 2 \cdot V_{110}(t_0))$$

Reference is now made to FIG. 3C, which is a simplified timing diagram corresponding showing timing of electric signals in an example embodiment of the invention.

FIG. 3C shows a timing diagram which describes a circuit corresponding to the embodiment shown in FIG. 3A. The timing diagram describes a correction of the problem presented by FIG. 3B. The timing diagrams of FIG. 3C correspond to the timing diagrams of FIG. 3B, respectively. Switch S200 is closed at time $t_1$ when rectifier AC input voltage 119 crosses zero. The energy difference during this transient is zero ($V_{119}(t_0^-)=0 \rightarrow \Delta E=0$). There is no energy loss during this transient.

Figure 4B:
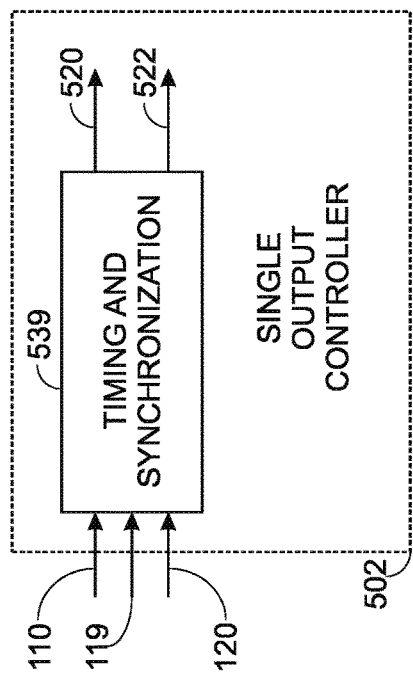
FIG. 4B is a more detailed illustration of a single output controller according to an example embodiment of the invention.
Figure 4C:
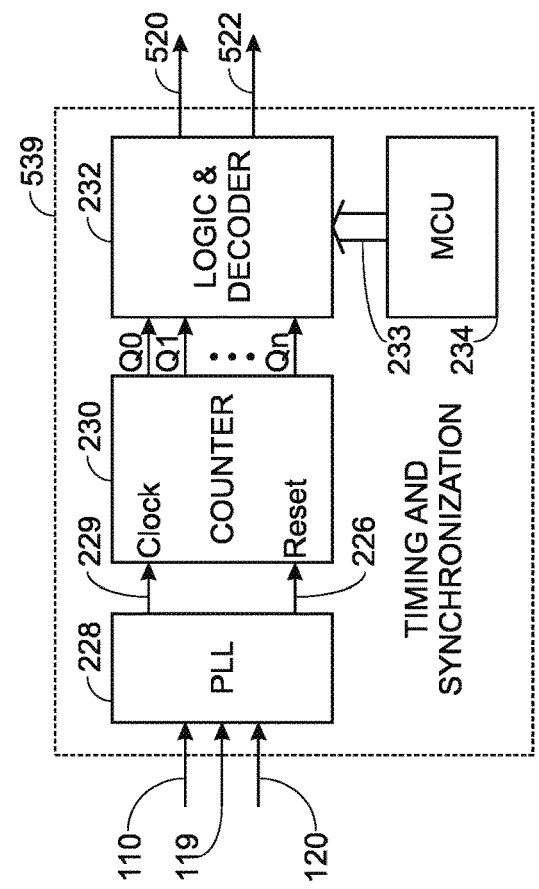
FIG. 4C is a more detailed illustration of a Timing-and-Synchronization component according to an example embodiment of the invention.
Figure 4A:
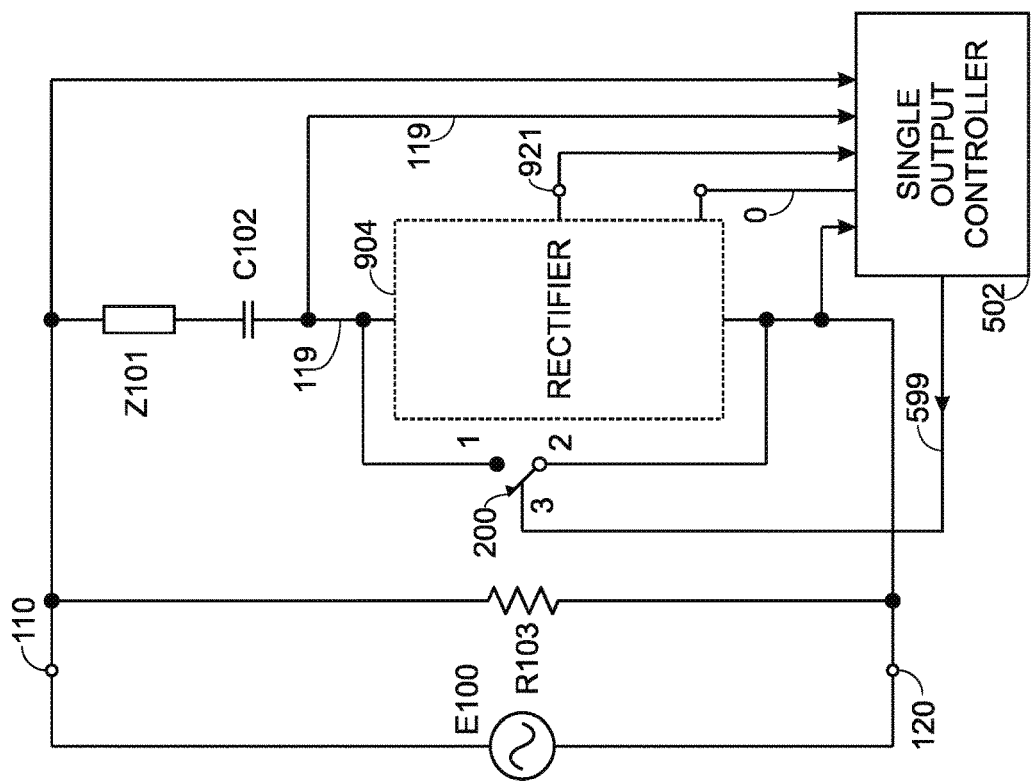
FIG. 4A is a more general illustration of a single output AC to DC converter according to an example embodiment of the invention.

In some embodiments the Single-Output-Controller 500 of FIG. 2A and FIG. 2B to optionally controls switch S200 on the zero crossing events across the rectifier AC inputs (119 of FIG. 4A or 119 to 120 of FIG. 2A or FIG. 2B).

Reference is now made to FIG. 4A, which is a more general illustration of a single output AC to DC converter according to an example embodiment of the invention.

FIG. 4A is suitable for embodiments such as, by way of some non-limiting examples, FIG. 2A, FIG. 2B.

FIG. 4A shows an example embodiment similar to the embodiments shown in FIG. 2A and FIG. 2B, where rectifiers 900, 902 and single output controller 500 (of FIG. 2A and FIG. 2B) are optionally replaced with a generic rectifier 904 and single output controller 502. The rectifier 904 demonstrates a generic type of rectification topology. Its AC inputs are 119 and 120 and its DC output is 921 in respect to 0. The output voltage of 921 can be either positive or negative. The single output controller 502 comprises additional input 110.

Reference is now made to FIG. 4B, which is a more detailed illustration of a single output controller according to an example embodiment of the invention.

FIG. 4B shows an example embodiment corresponding to FIG. 4A. The operation of the single output controller 502 is to stabilize rectified DC 921 by controlling switch 200 through its control line 599. Closing (or opening—in some modes of operation) of switch 200 occurs at a specific Time $t_1$ according to the description of FIG. 3C ($t_1$ is the time when the voltage between inputs 119 and 120 crosses the zero), Timing-and-Synchronization 539 is a digital apparatus which optionally provides timing of the zero crossing events 520, and/or optionally calculates a pre-detection of the zero crossing events 522. Output 522 enables to close (or open) the switch 200 simultaneously with the zero crossing between the AC input of the rectifier 119 and 120, and in some embodiments taking into account a propagation delay of the switch 200 and its driving circuitry.

Reference is now additionally made to FIG. 4C, which is a more detailed illustration of a Timing-and-Synchronization component according to an example embodiment of the invention.

FIG. 4C describes an internal structure of a Timing-and-Synchronization component such as, by way of a non-limiting example, the Timing-and-Synchronization 539 of FIG. 4B.

FIG. 4C shows inputs 110, 119 or 120 fed into a PLL (Phase Lock Loop) circuit 228 which generates two outputs:
- A high frequency clock 229 synchronized to the power line frequency, and
- A line frequency signal 226 that indicates the starting of each cycle of the power line voltage.

These two output signals are optionally fed to a counter 230. Outputs Q0, Q1, ..., Qn are the counter outputs. After signal 226 resets counter 230, counter 230 starts to count the number of the clock cycles 229. Outputs Q0, Q1, ... Qn correspond to a binary word which presents time passed from the reset events of 226, in units of the period time of the clock 229.

Logic & decoder 232 optionally detects zero crossing 520 and/or calculates pre-detection of the zero crossing 522 according to the binary outputs Q0, Q1, ... Qn and data 233. Data 233 is provided by MCU 234 according to stored predetermined values.

Although the circuits described in FIG. 4B and FIG. 4C may appear more complicated compared to a direct approach of sensing zero crossing across a rectifier and switching using very fast components, the circuit described in FIG. 4B and FIG. 4C provides some potential advantages. Very fast electronic components such as comparators (for sensing the zero crossing across the input of the rectifier) typically consume high power. In addition very fast switching of a shunt switch consumes additional power. A result of the direct approach may result in a condition where the energy waste due to power consumption of the fast electronic components is higher than the energy waste due to switching the shunt switch not at the exact time of the zero crossing events.

Typical peak to peak amplitude of an AC input can be in a range of hundreds of volts. Typical frequencies are in a range of 50 Hz to 400 Hz. A slew-rate of the AC input can be in a range of 0.1V/uSec. Using a threshold value of plus or minus 0.1V around the zero voltage can provide a low standby power. A typical time precision for 0.1V is approximately less than 1 uSec.

The approach presented in FIG. 4B and FIG. 4C enables to use slower electronic components such as comparators and MOSFETs for the shunt switch, to operate the shunt switch during the zero crossing according to measurement and/or calculation of power line cycles. The complexity of the approach may appear higher, however the total energy waste is potentially lower. In addition, the cost is much lower.

Figure 5:
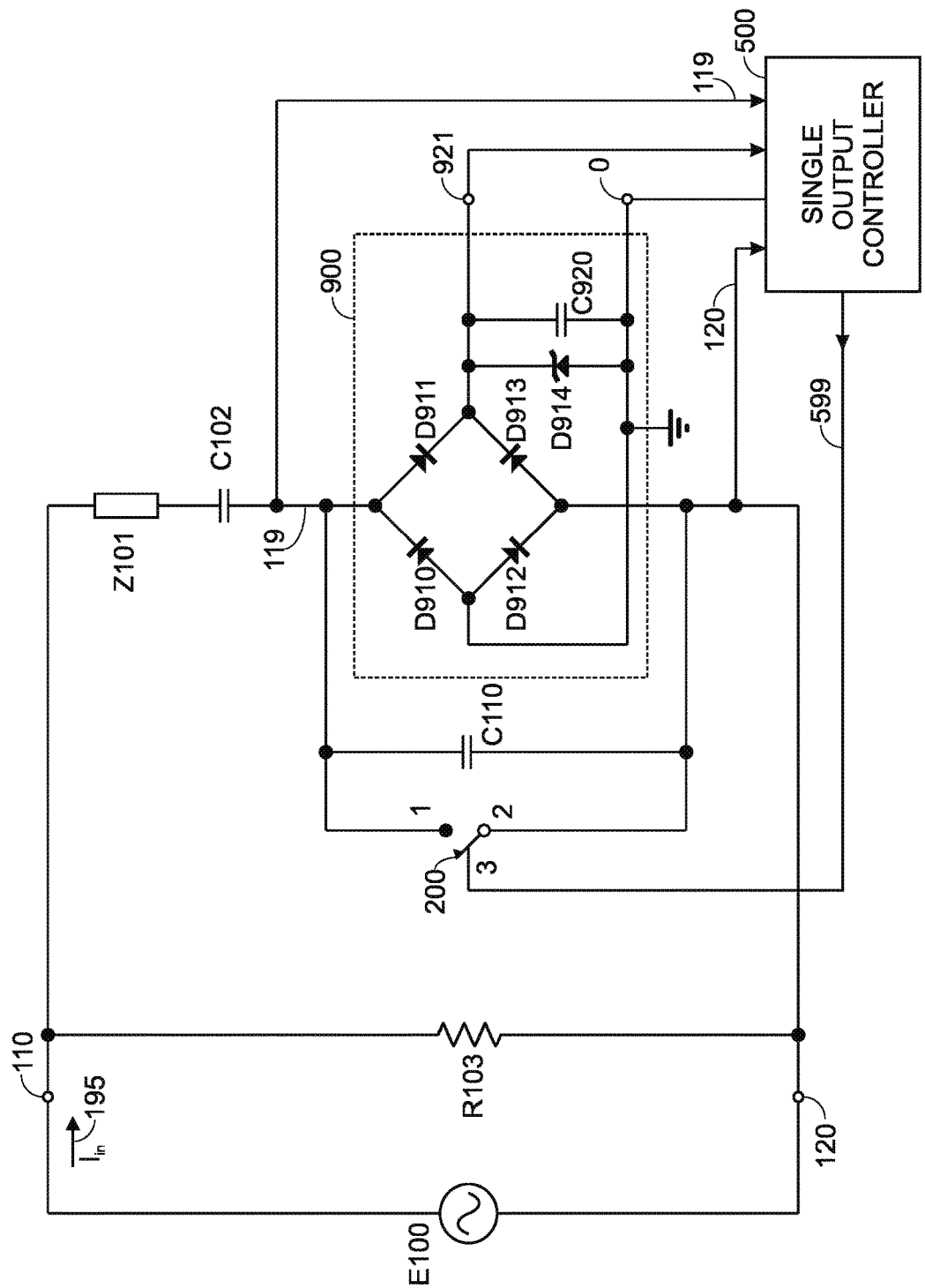
FIG. 5 is a simplified illustration of an example embodiment of the invention.

Reference is now made to FIG. 5, which is a simplified illustration of an example embodiment of the invention.

FIG. 5 shows a diagram suitable for implementing, by way of a non-limiting example, the example embodiment shown in FIG. 2A.

FIG. 5 shows wherein an additional capacitor C110 connected across rectifier AC inputs 119 and 120. Since the switching to ON of switch S200 is optionally made on a zero crossing event (for example according to the description of FIG. 3C) the capacitor C110 can be added without causing of energy loss. The capacitor C110 improves the sinusoidal shape of current $I_{in}$ 195 and potentially improves EMC performance (there is pure capacitance impedance between terminals 110 and 120).

Figure 6:
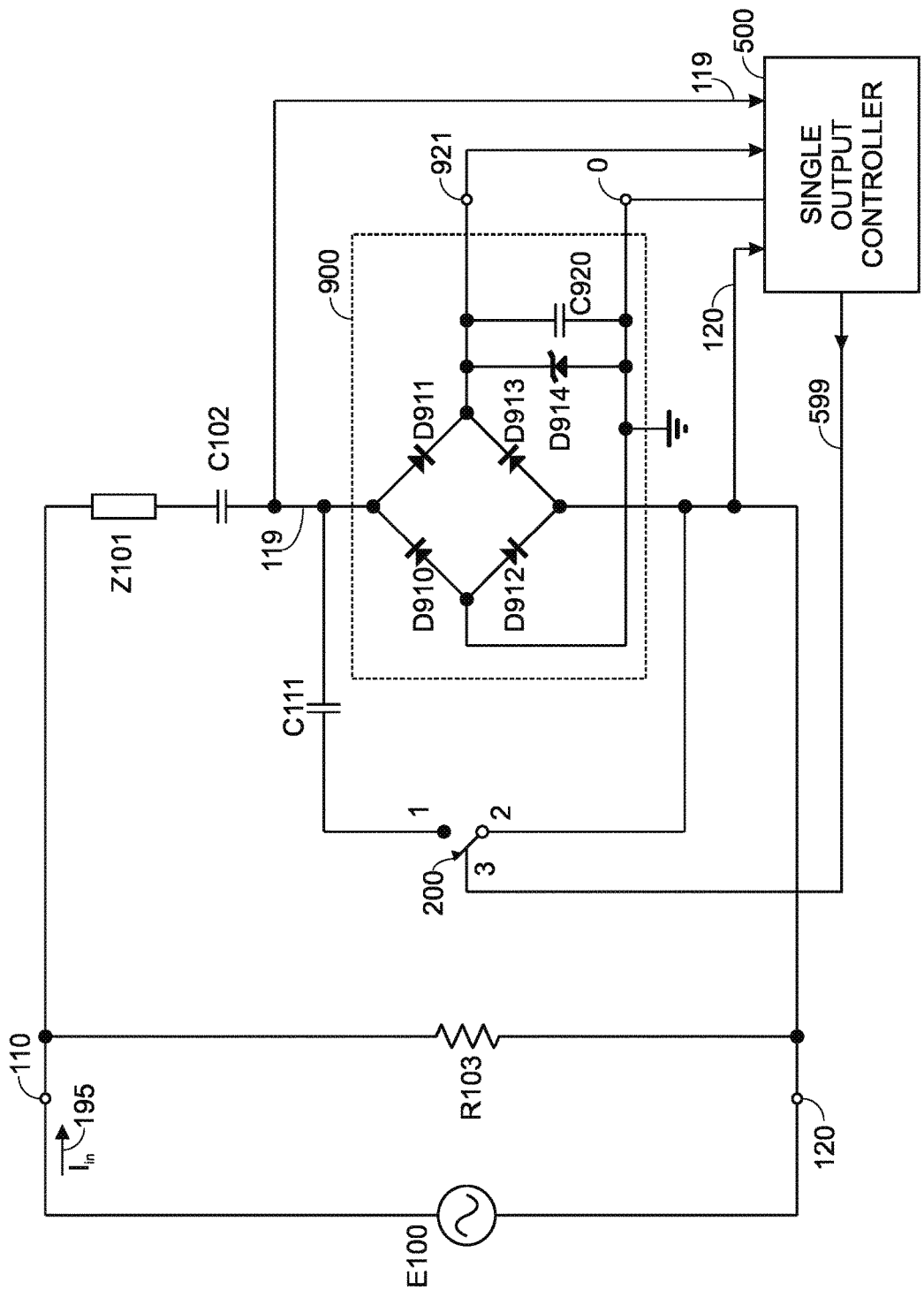
FIG. 6 is a simplified illustration of an example embodiment of the invention.

Reference is now made to FIG. 6, which is a simplified illustration of an example embodiment of the invention.

FIG. 6 shows a diagram suitable for implementing, by way of a non-limiting example, the example embodiment shown in FIG. 2A.

FIG. 6 shows an additional capacitor C111 installed in series to the switch S200. The capacitor C111 enables to detect (without power dissipation) the zero crossing events during the time when switch S200 is closed.

Figure 7:
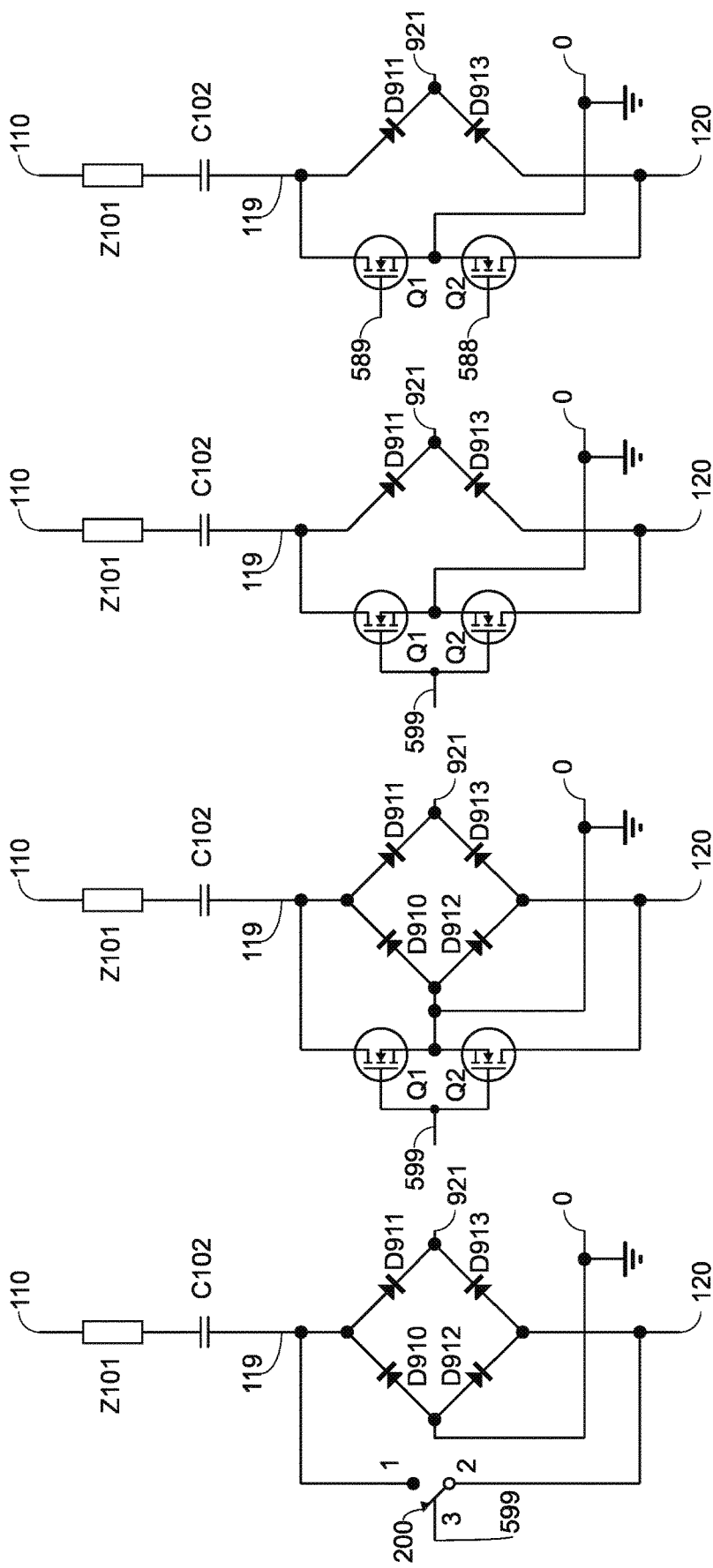
FIG. 7A is a simplified illustration of an example embodiment of the invention including an example embodiment of a Shunt-Switch.
FIG. 7B is a simplified illustration of an example embodiment of the invention including an example embodiment of a Shunt-Switch.
FIG. 7C is a simplified illustration of an example embodiment of the invention.
FIG. 7D is a simplified illustration of an example embodiment of the invention.

Reference is now made to FIG. 7A, which is a simplified illustration of an example embodiment of the invention including an example embodiment of a Shunt-Switch.

FIG. 7A shows a diagram suitable for implementing, by way of a non-limiting example, the example embodiment shown in FIG. 2A.

Switch 200 enables shunting a bridge rectifier (comprising D910÷D913) similarly to the description of shunting provided with reference to FIG. 2A.

Reference is now made to FIG. 7B, which is a simplified illustration of an example embodiment of the invention including an example embodiment of a Shunt-Switch.

FIG. 7B shows MOSFETs Q1 and Q2 connected in a configuration of an AC switch, enabling operation as a switch such as, by way of a non-limiting example, Switch 200 of FIG. 7A.

Reference is now made to FIG. 7C, which is a simplified illustration of an example embodiment of the invention.

FIG. 7C a rectifier bridge with diodes D910 and D912, which uses internal diodes of MOSFETs Q1 and Q2 to provide function of the two other diodes of the rectifier bridge.

Reference is now made to FIG. 7D, which is a simplified illustration of an example embodiment of the invention.

FIG. 7D shows control of the gates of MOSFETs Q1 and Q2 separated, using two control lines 588 and 589. Such a configuration enables the MOSFETs Q1 and Q2 to operate as:
- a Shunt-Switch, when both control lines 588 and 589 are at logic level "1";
- a diode D912 of FIG. 7B (forward bias), when control line 588 is at logic level "1" and control line 589 is at logic level "0";
- a diode D910 of FIG. 7B (forward bias), when control line 588 is at logic level "0" and control line 589 is at logic level "1".

Since the ON resistance of MOSFETs ($R_{dson}$) Q1 and Q2 can be very low, the voltage drop across the MOSFETs is low compared to a forward voltage drop across the diodes. Such a configuration potentially reduces power dissipation and improves the total efficiency of the circuit.

Figure 8:
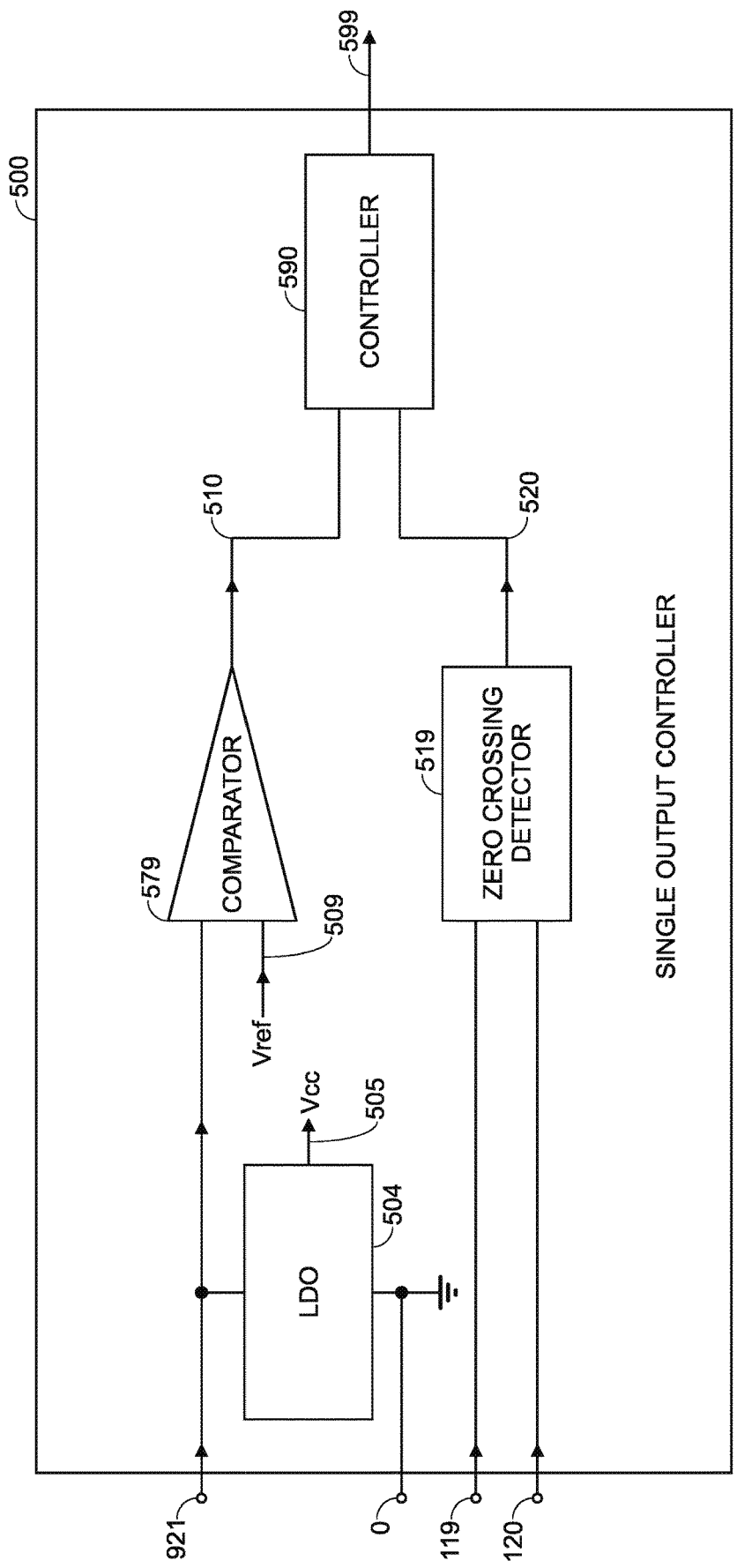
FIG. 8 is a simplified illustration of a controller according to an example embodiment of the invention.

Reference is now made to FIG. 8, which is a simplified illustration of a controller according to an example embodiment of the invention.

FIG. 8 shows an example embodiment of a controller which is suitable for use, by way of a non-limiting example, in the circuits shown in FIG. 2A, FIG. 2B, FIG. 5 and FIG. 6.

FIG. 8 shows a Single-Output-Controller 500 including:
- A comparator 579, which provides an indication when the rectified DC 921 of the AC to DC converter is higher than reference voltage 509;

A Zero-Crossing-Detector 519 which sends a signal to output 520 when it detects a zero crossing of rectifier AC inputs 119 and 120 voltage;

A controller 590, which synchronizes output 510 of comparator 579 to the zero crossing events 520;

A LDO (Low DropOut Voltage regulator) 505, which provides power for the operation of Single-Output-Controller 500.

Figure 9A:
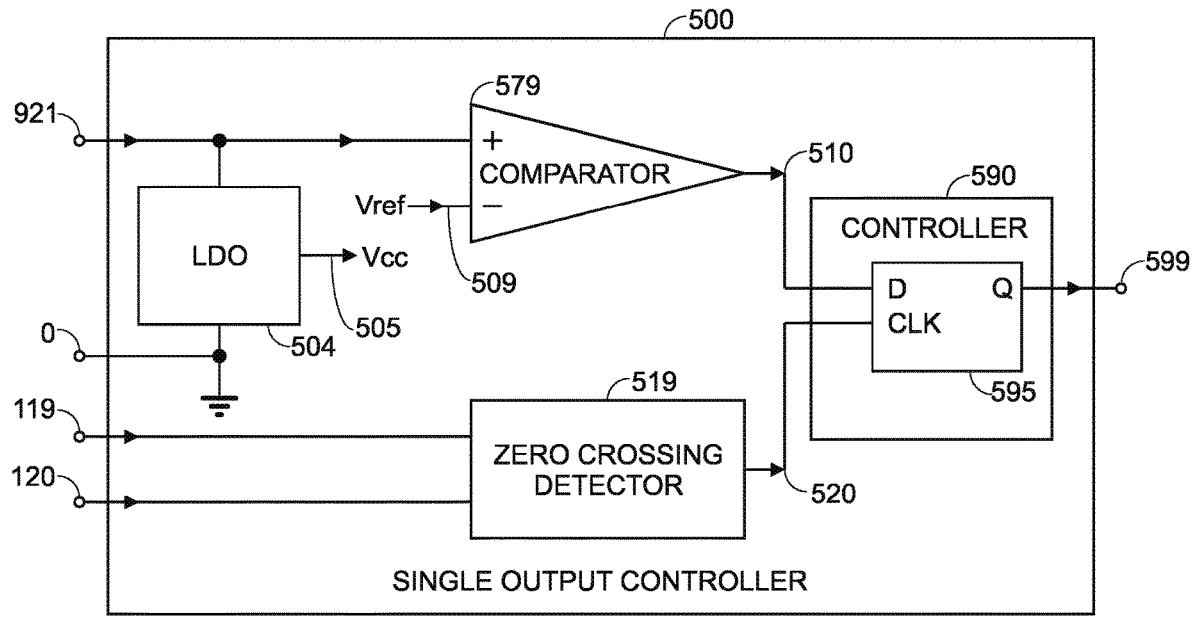
FIG. 9A is a simplified illustration of a controller according to an example embodiment of the invention.

Reference is now made to FIG. 9A, which is a simplified illustration of a controller according to an example embodiment of the invention.

FIG. 9A shows an example embodiment of a controller which is suitable for use, by way of a non-limiting example, in the circuits shown in FIG. 2A, FIG. 6 and FIG. 8.

FIG. 9A describes controller 590 in more detail. By way of a non-limiting example, operation of FIG. 2A is used to describe operation of the controller. Assume that switch 200 of FIG. 2A has a small ON resistance. When rectified DC 921 is below reference voltage 509, output 510 is at logic level "0". On a next zero crossing event of 520, Flip-Flop 595 changes its output 599 to logic level "0" (switch S200 of FIG. 2A or FIG. 6 is open). During such a state, rectifiers D910, D911, D912 and D913 charge capacitor C920 of FIG. 2A. The rectified DC 921 rises until it reaches the level of reference voltage 509. At this point, comparator 579 changes its output to logic level "1" and on the next zero crossing event of 520, Flip-Flop 595 changes its output 599 to logic level "1" (switch S200 of FIG. 2A or FIG. 6 are closed). When Switch 200 is closed, rectified DC 921 is held by capacitor C920 of FIG. 2A. Any load on output 920 will cause a voltage drop. When output voltage 920 falls below reference voltage 509, output 510 of comparator 579 changes to logic level "0" and the cycle starts again.

Figure 9B:
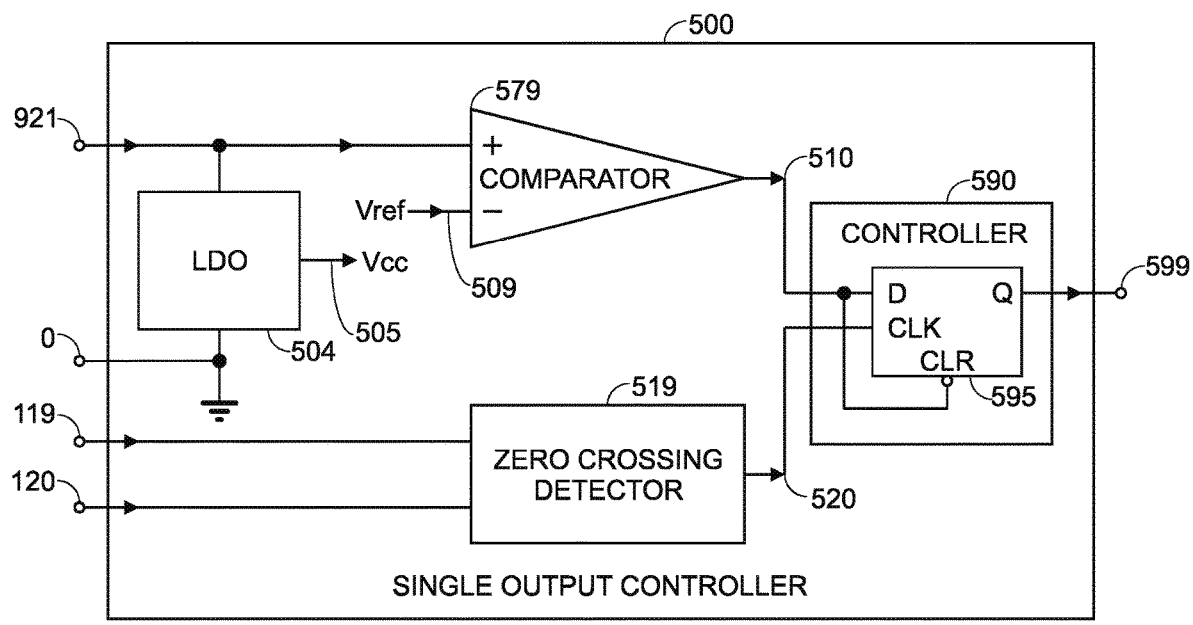
FIG. 9B is a simplified illustration of a controller according to an example embodiment of the invention.

Reference is now made to FIG. 9B, which is a simplified illustration of a controller according to an example embodiment of the invention.

FIG. 9B shows an example embodiment of a controller which is suitable for use, by way of a non-limiting example, in the circuits shown in FIG. 2A, FIG. 6 FIG. 8 and FIG. 9A.

The operation of the circuit of FIG. 9B is described similarly to the description of the operation the circuit of FIG. 9A, where the input to Flip-Flop 595 also clears its output. When rectified DC 921 is below reference voltage 509, output 510 is at logic level "0". Logic level "0" of output 510 forces output 599 of Flip-Flop 595 to logic level "0" (switch S200 of FIG. 2A is in "open" state). During such a state, the rectifier charges capacitor C920 of FIG. 2A. The rectified DC 921 rises until it reaches the level of reference voltage 509. At this point comparator 579 changes its output to logic level "1". On the next zero crossing event 520, Flip-Flop 595 changes its output 599 to logic level "1" (switch S200 of FIG. 2A is closed). When Switch 200 is closed, the voltage of rectified DC 921 is held by the capacitor C920 of FIG. 2A. Any load on output 920 will cause a voltage drop. When output voltage 920 falls below reference voltage 509, output 510 of comparator 579 changes to logic level "0". Logic level "0" at output 510 clears output 599 and the cycle starts again.

Figure 10:
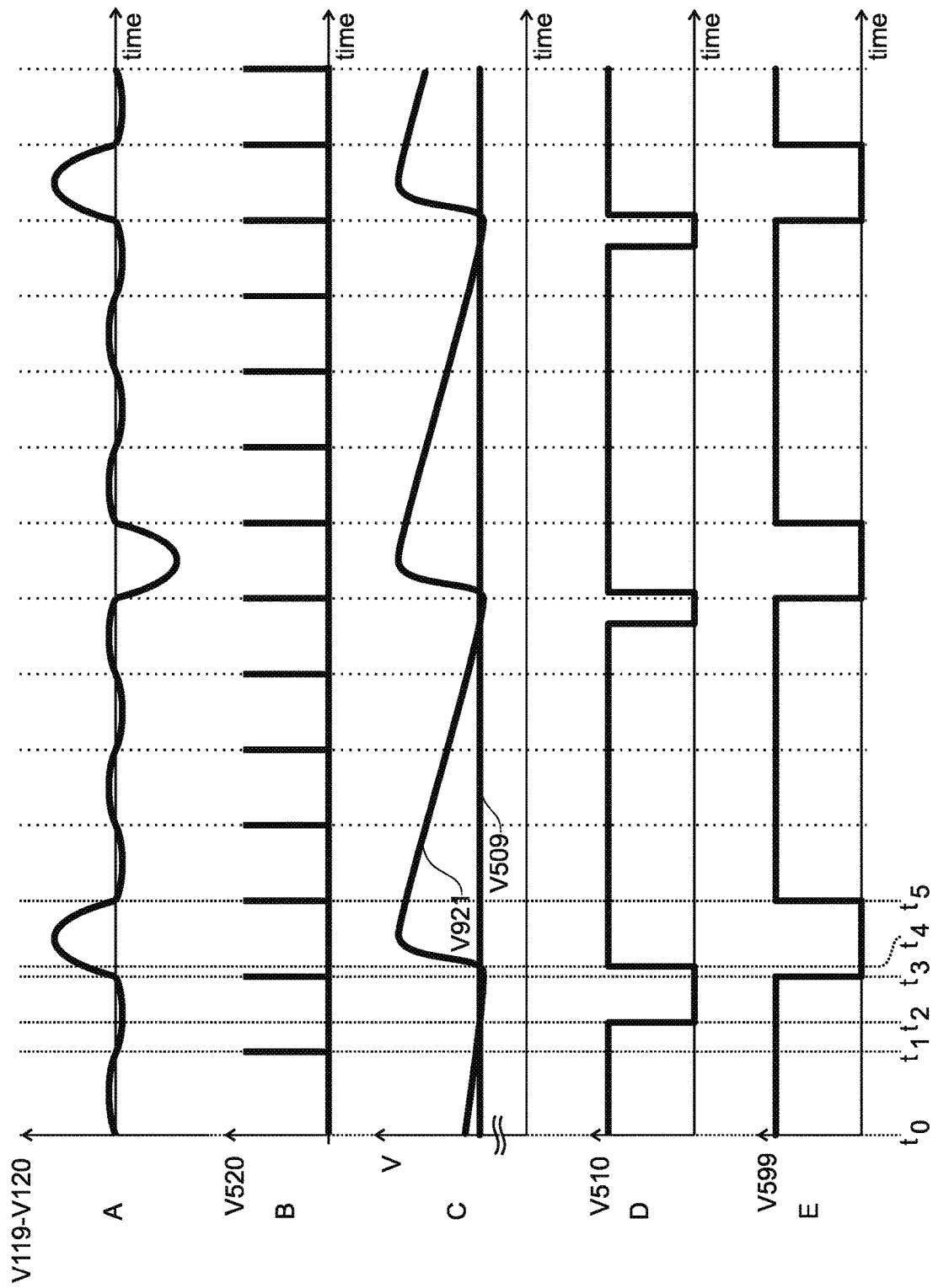
FIG. 10 shows simplified timing diagrams according to an example embodiment of the invention.

Reference is now made to FIG. 10, which shows simplified timing diagrams according to an example embodiment of the invention.

FIG. 10 shows timing diagrams describing operation of circuits such as, by way of a non-limiting example, shown in FIG. 2A and FIG. 9A.

Timing diagram A demonstrates voltage between rectifier AC inputs 119 and 120.

Timing diagram B demonstrates output 520 of Zero-Crossing-Detector 519.

Timing diagram C shows two signals: a first signal V921 shows rectified DC 921 of FIG. 2A; the second signal V509 shows reference voltage 509.

Output 510 of comparator 579 is demonstrated on timing diagram D. In time interval $t_0 \div t_2$, rectified DC 921 is higher than reference voltage 509, which causes logic level "1" at output 510 of comparator 579, In time interval $t_2 \div t_4$, rectified DC 921 is lower than reference voltage 509, which causes logic level "0" at output 510 of comparator 579.

Timing diagram E demonstrates output 599 of Flip-Flop 595. On zero crossing events of timing diagram A ($t_1$, $t_3$ and $t_5$), clock input 520 of Flip-Flop 595 transfers the D input of the Flip-Flop to its output 599. Logic level "0" of output 599 opens switch 200 of FIG. 2A and logic level "1" closes switch 200.

Figure 11:
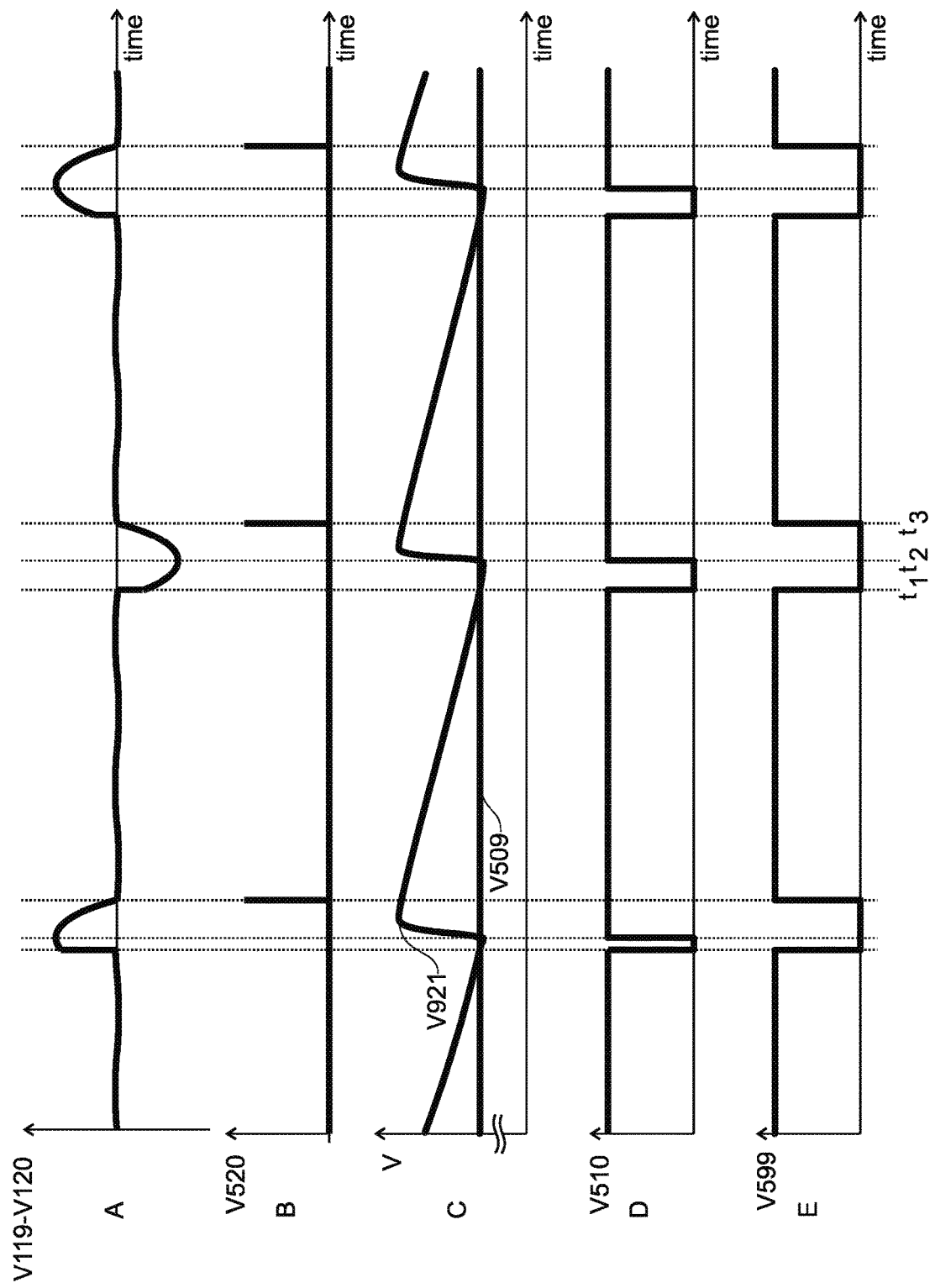
FIG. 11 shows simplified timing diagrams according to an example embodiment of the invention.

Reference is now made to FIG. 11, which shows simplified timing diagrams according to an example embodiment of the invention.

FIG. 11 shows timing diagrams describing operation of circuits such as, by way of a non-limiting example, shown in FIG. 2A and FIG. 9B.

Timing diagram A demonstrates the voltage between rectifier AC inputs 119 and 120.

Timing diagram B demonstrates output 520 of Zero-Crossing-Detector 519.

Timing diagram C demonstrates two signals: A first signal V921 shows rectified DC 921 of FIG. 2A; a second signal V509 shows reference voltage 509.

Output 510 of comparator 579 is demonstrated on timing diagram D.

Timing diagram E demonstrates output 599 of Flip-Flop 595. On time interval rectified DC 921 is lower than reference voltage V509, which cause output 510 of comparator 579 to be at logic level "0". Logic level "0" at output 510 clears Flip-Flop 595, which causes logic level "0" at output 599. At time $t_2$, rectified DC 921 starts to rise above reference voltage 509, which causes a logic level "1" at output 510 of comparator 579. The zero crossing event at $t_3$ of timing diagram A, transfers the D input (logic level "1") of Flip-Flop 595 to its output 599. Logic level "1" output 599 shunts rectifier AC inputs 119 and 120 (optionally by switch 200 of FIG. 2A).

Figure 12A:
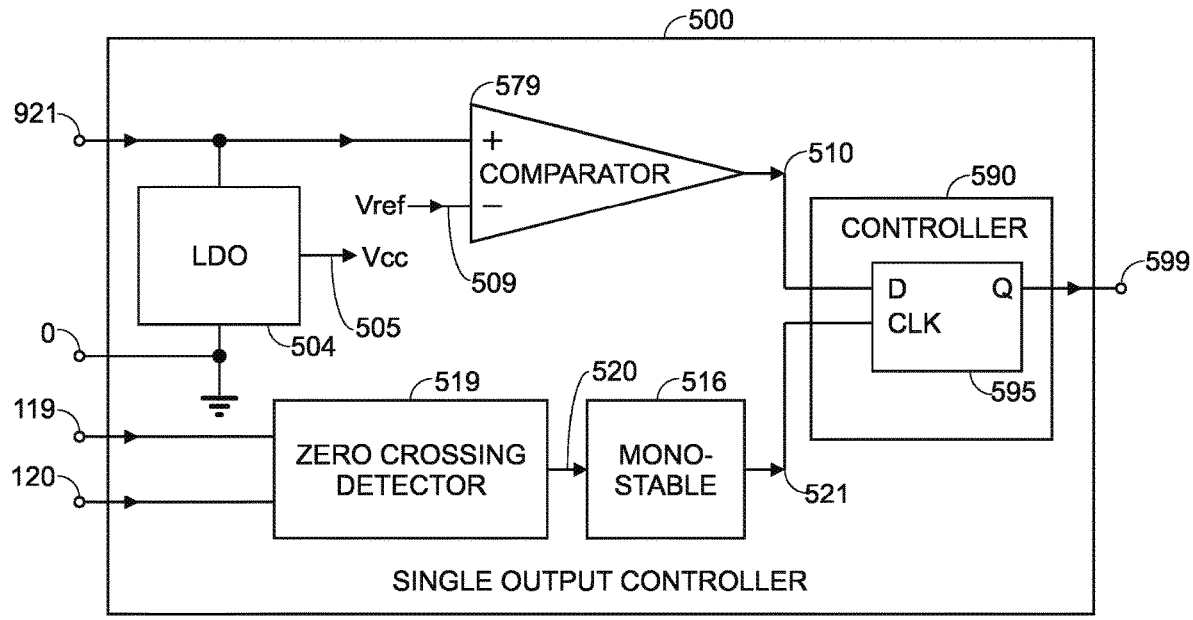
FIGS. 12A and 12B are simplified illustrations of a controller according to an example embodiment of the invention.
Figure 12B:
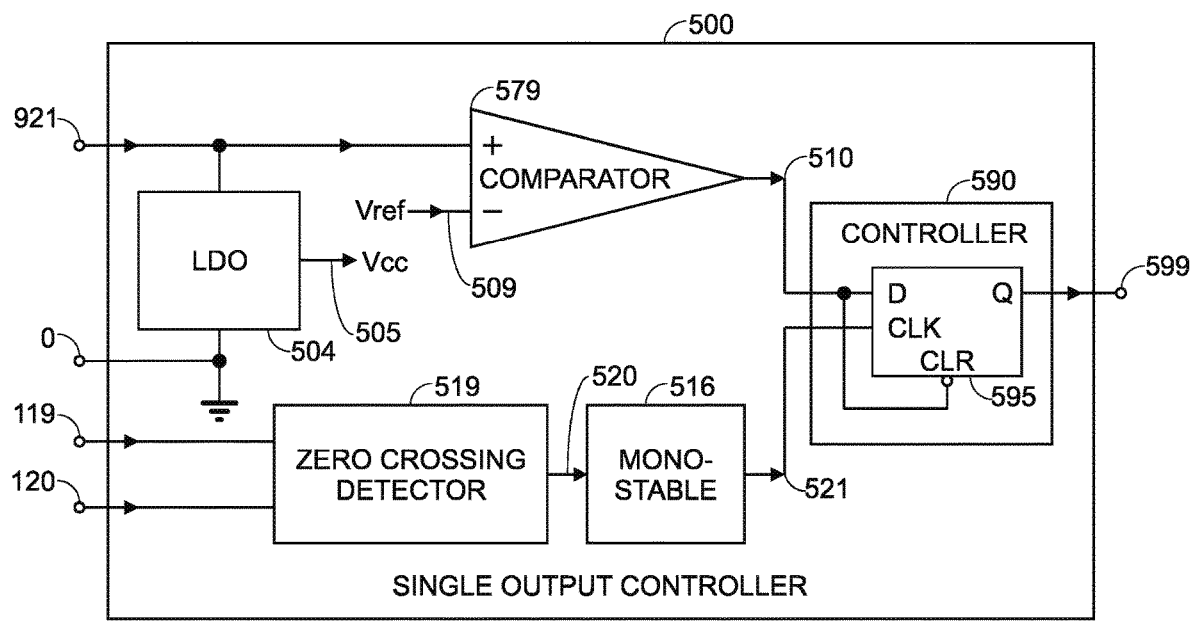

Reference is now made to FIGS. 12A and 12B, which are simplified illustrations of a controller according to an example embodiment of the invention.

Diagrams of FIG. 12A and FIG. 12B are similar to FIG. 9A and FIG. 9B, respectively, where a non-re-triggerable mono-stable 516 are added between output 520 of zero crossing 519 and clock input 521 of Flip-Flop 595. In some cases, after the switching event of S200, after-pulses might generate additional zero crossing events. The additional zero crossing events might cause the controller to shunt rectifier AC inputs 119 and 120 at a time not synchronized to the line frequency. In order to prevent such an occurrence, the mono-stable 516 filters out the additional pulses by adjusting its pulse width output to be very near, but less than half of the power line time period.

Figure 13:
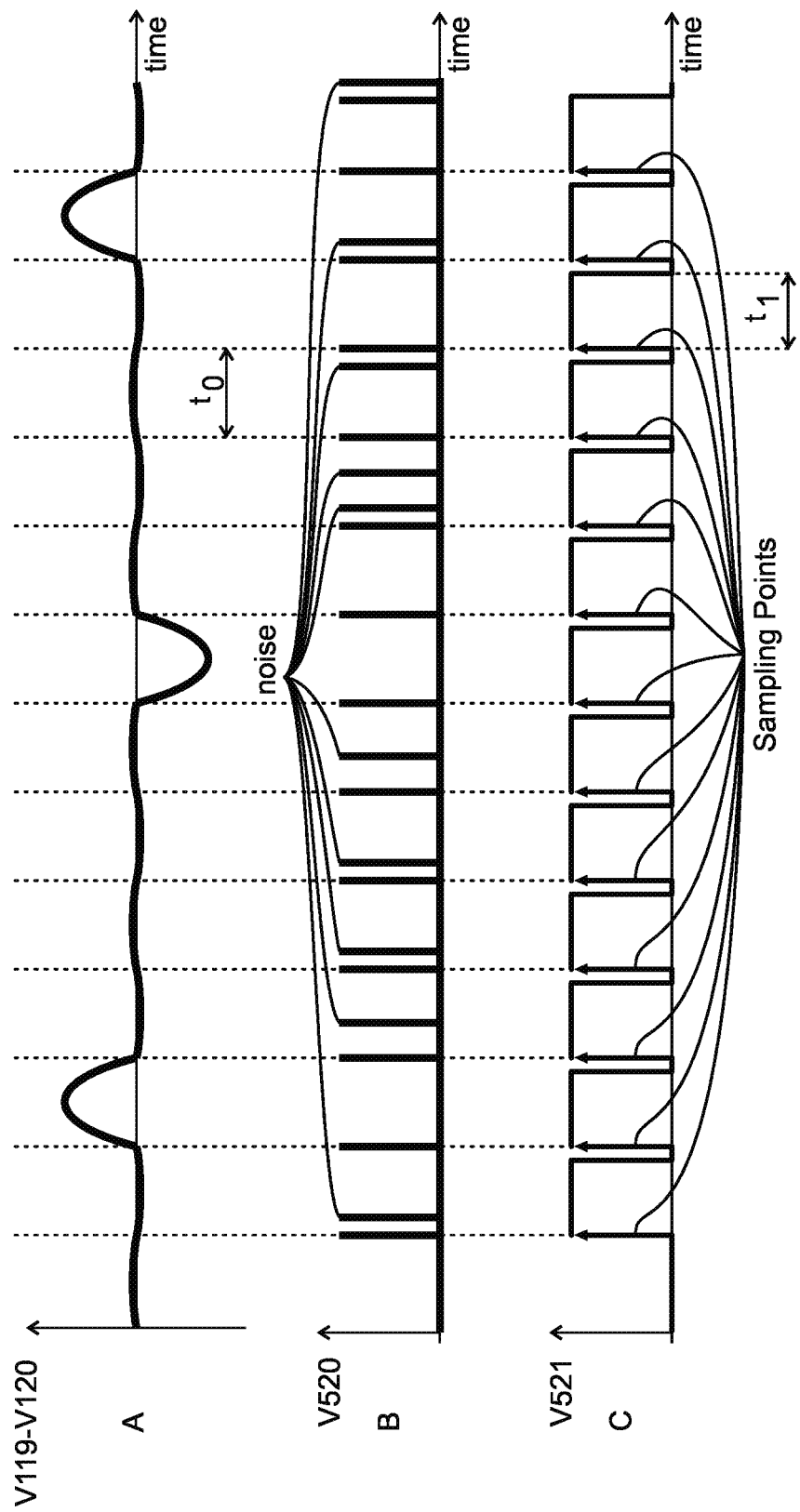
FIG. 13 shows simplified timing diagrams according to an example embodiment of the invention.

Reference is now made to FIG. 13, which shows simplified timing diagrams according to an example embodiment of the invention.

FIG. 13 shows timing diagrams describing operation of circuits such as, by way of a non-limiting example, shown in FIG. 12A and FIG. 12B.

Timing diagram A demonstrates the voltage between rectifier AC inputs 119 and 120.

Timing diagram B demonstrates output 520 of Zero-Crossing-Detector 519. It can be seen that there are additional pulses (noise) to the power line period cycles.

Timing diagram C demonstrates output 521 of mono-stable 516. The ON duration of mono-stable 516 is presented by $t_1$ and half of the power line time period is presented by to. It can be seen that when $t_1 < t_0$, the noises were cleared at output 521.

Figure 14B:
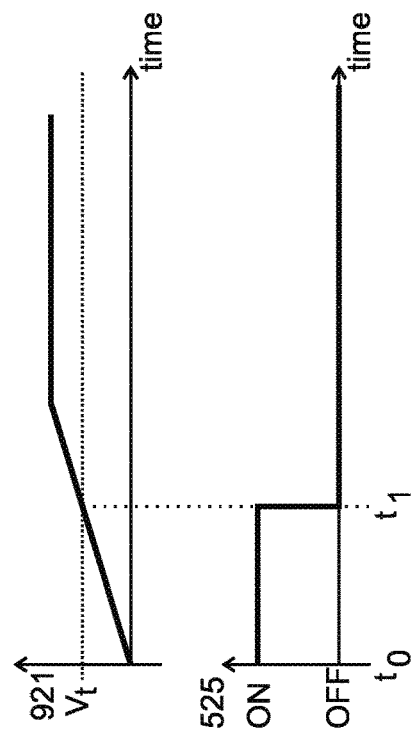
FIG. 14B shows simplified timing diagrams according to an example embodiment of the invention.
Figure 14A:
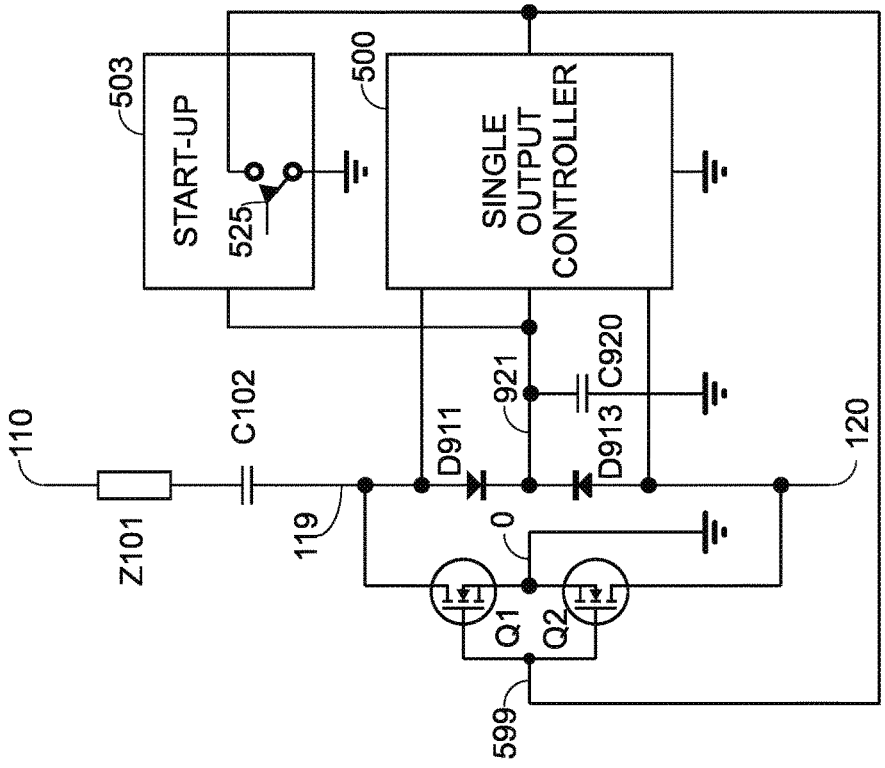
FIG. 14A is a simplified illustration of an example embodiment of the invention.

Reference is now made to FIG. 14A, which is a simplified illustration of an example embodiment of the invention.

FIG. 14A shows a conceptual block diagram of a start-up apparatus suitable for use in circuits such as, by way of some non-limiting examples, FIG. 2A, FIG. 9A, FIG. 9B, FIG. 12A, and FIG. 12B.

At start-up time, it is potentially useful to keep MOSFETs Q1 and Q2 in OFF state in order to enable capacitor C920 to charge with enough energy for operation of Single-Output-Controller 500. Without start-up apparatus 503, Single-Output-Controller 500 might lock itself for a period by shunting rectifier AC inputs 119 and 120. Apparatus 503 detects when rectified DC 921 is below a predetermined value and controls switch 525 to shunt the gates of MOSFETs Q1 and Q2.

Reference is now made to FIG. 14B, which shows simplified timing diagrams according to an example embodiment of the invention.

FIG. 14B shows timing diagrams describing operation of circuits such as, by way of a non-limiting example, shown in FIG. 14A.

Timing diagram A describes the voltage at rectified DC 921.

Timing diagram B describes the status of switch 525. At time to the power lines are connected to terminals 110 and 120. Apparatus 503 detects when the voltage at rectified DC 921 is bellow threshold voltage $V_t$ and activates switch 525, which shunts the gates of MOSFETs Q1 and Q2. The voltage at rectified DC 921 continues to rise until it reaches the level of threshold voltage Vt. Above voltage level $V_t$ apparatus 503 deactivates switch 525, which enables Single-Output-Controller 500 to control the gates of MOSFETs Q1 and Q2.

Figure 15:
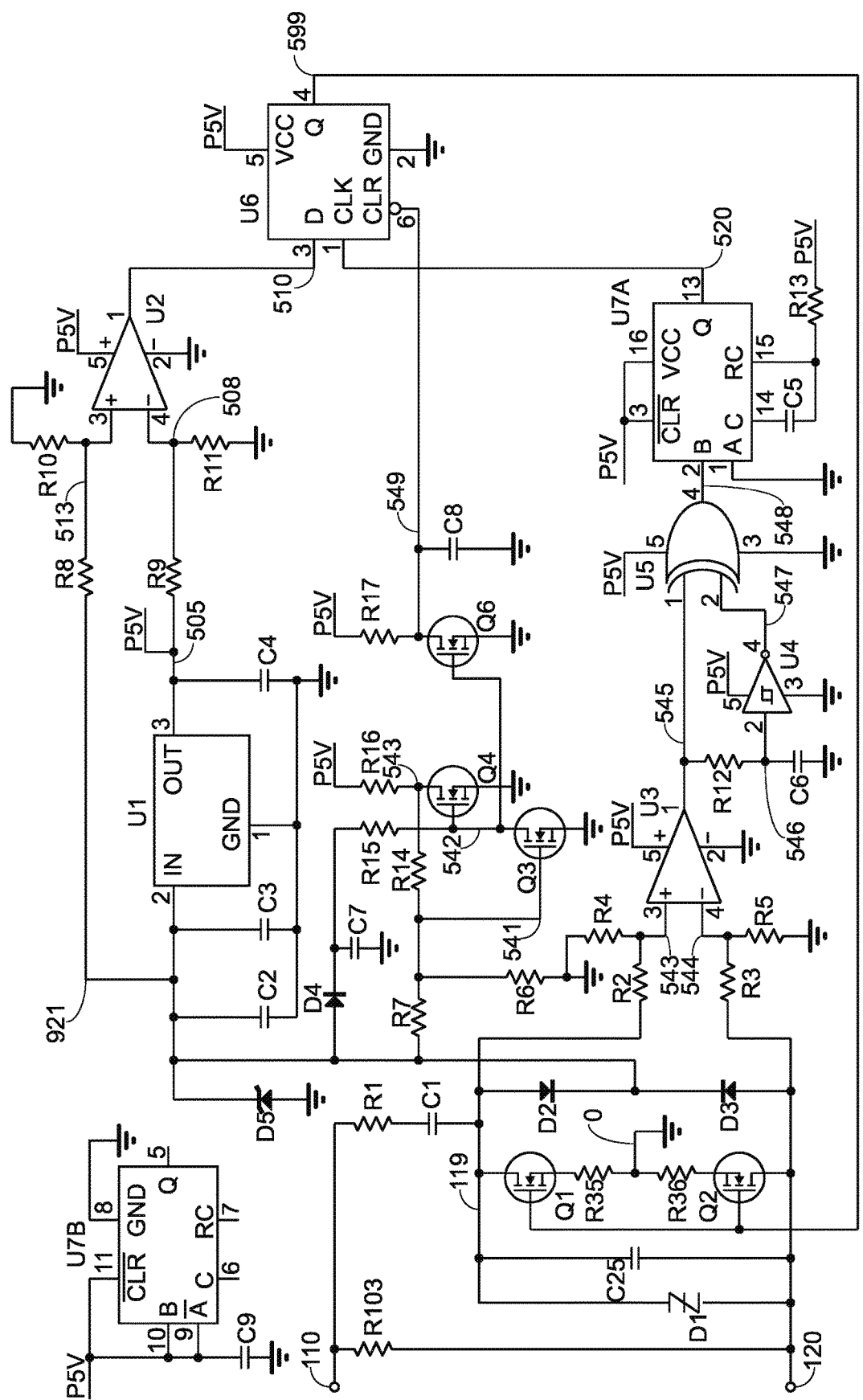
FIG. 15 is a simplified illustration of an example embodiment of the invention.

Reference is now made to FIG. 15, which is a simplified illustration of an example embodiment of the invention.

FIG. 15 shows a diagram of an AC to DC converter suitable for use in circuits such as, by way of some non-limiting examples, FIG. 2A, FIG. 7C, FIG. 12A, and FIG. 14A.

FIG. 15 shows AC power connected between terminals 110 and 120. Capacitor C1 drops the AC voltage without power dissipation toward rectifier AC input 119. R1 limits current during start-up time, and in order to reduce power loss during steady state operation its value is to optionally low. Diode D1 is a Cidactor or Varistor type and the diode D1 limits the voltage across the AC inputs of the rectifier during start-up time, Diodes D2, D3 and the internal diodes in MOSFETs Q1 and Q2 operate as a full wave rectifier in bridge configuration. MOSFETs Q1 and Q2 are connected in an AC switch configuration and operated as a Shunt-Switch to rectifier AC inputs 119 and 120.

During the ON time of Q1 and Q2, resistors R35 and R36 enable voltage measurement between rectifier AC inputs 119 and 120. Although the resistors cause power loss, their optionally small value makes this power loss potentially negligible. Capacitor C2 is an output filter of the full wave rectifier. Diode D5 protects the circuit in fault condition and during start-up time. A Low dropout voltage regulator U1 and capacitors C3 and C5 provide voltage P5V for operation of the entire circuit. A Voltage divider including resistors R9 and R11 provides a reference voltage 508. Comparator U2 compares reference voltage 508 to voltage 513. The voltage of rectified DC 921 is determined according to the following equations:

$$V_{921} \cdot \frac{R_{10}}{R_8 + R_{10}} = \underbrace{V_{513} = V_{508}}_{U2-Comparator\ input} = V_{505} \cdot \frac{R_{11}}{R_9 + R_{11}}$$

$$V_{921} = V_{505} \cdot \frac{R_{11}}{R_{10}} \cdot \frac{R_8 + R_{10}}{R_9 + R_{11}} = 5v \cdot \frac{2\ M\Omega}{604 K\Omega} \cdot \frac{1\ M\Omega + 604 K\Omega}{3\ M\Omega + 2\ M\Omega} = 5.31v$$

A voltage divider including resistors R2, R4; the voltage divider including R3, R5 and comparator U3 provide output 545. Output 545 is the sign of the voltage between rectifier AC inputs 119 and 120. The differentiator circuit comprises resistor R12, capacitor C6. Schmidt trigger inverter U4 and an Exclusive-OR gate U5. Such a circuit provides at its output 548 a short positive pulse for a logic level change at output 545. A width of the short positive pulse, optionally in time units such as seconds, is determined by the product of R12 [Ω] and C6 [F]. Output 548 is fed into the input of a non-re-triggerable mono-stable circuit comprised of U7A, R13 and C5. The mono-stable output 520 is fed into the clock input 520 of Flip-Flop U6. Mono-stable U7A operates similarly to the description of mono-stable 516 of FIG. 12A or FIG. 12B. Flip-Flop U6 operates similarly to the description of Flip-Flop 595 of FIG. 9A. Resistor R103 operates as a "bleeder" resistor and optionally discharges capacitor C1 when the AC to DC converter is disconnected from the power lines. Start-Up apparatus comprises D4, C7, C8, R6, R7, R14, R15, R16, R17, Q3, Q4, and Q6. A gate to source voltage of Q3 is the product of rectified DC 921 and the voltage divider including R6 and R7. When voltage 541 is below MOSFET Q3 threshold voltage, MOSFET Q3 is in OFF state, which turns ON MOSFETs Q4 and Q6. The ON state of Q6 clears Flip-Flop U6 to ensure logic level "0" at output 599 during the start-up time. When rectified DC 921 rises above a value which turns ON Q3, MOSFETs Q4 and Q6 turn into OFF state, which cause logic level "1" at 543 and 549. Logic level "1" at 543 "locks" Q3 (through R14) into ON state. Logic level "1" at the clear input of Flip-Flop U6 enables normal operation.

Reference is now made to FIG. 16 and FIG. 17, which show a Bill of Material (BOM) table corresponding to the example embodiment of FIG. 15.

Figure 18:
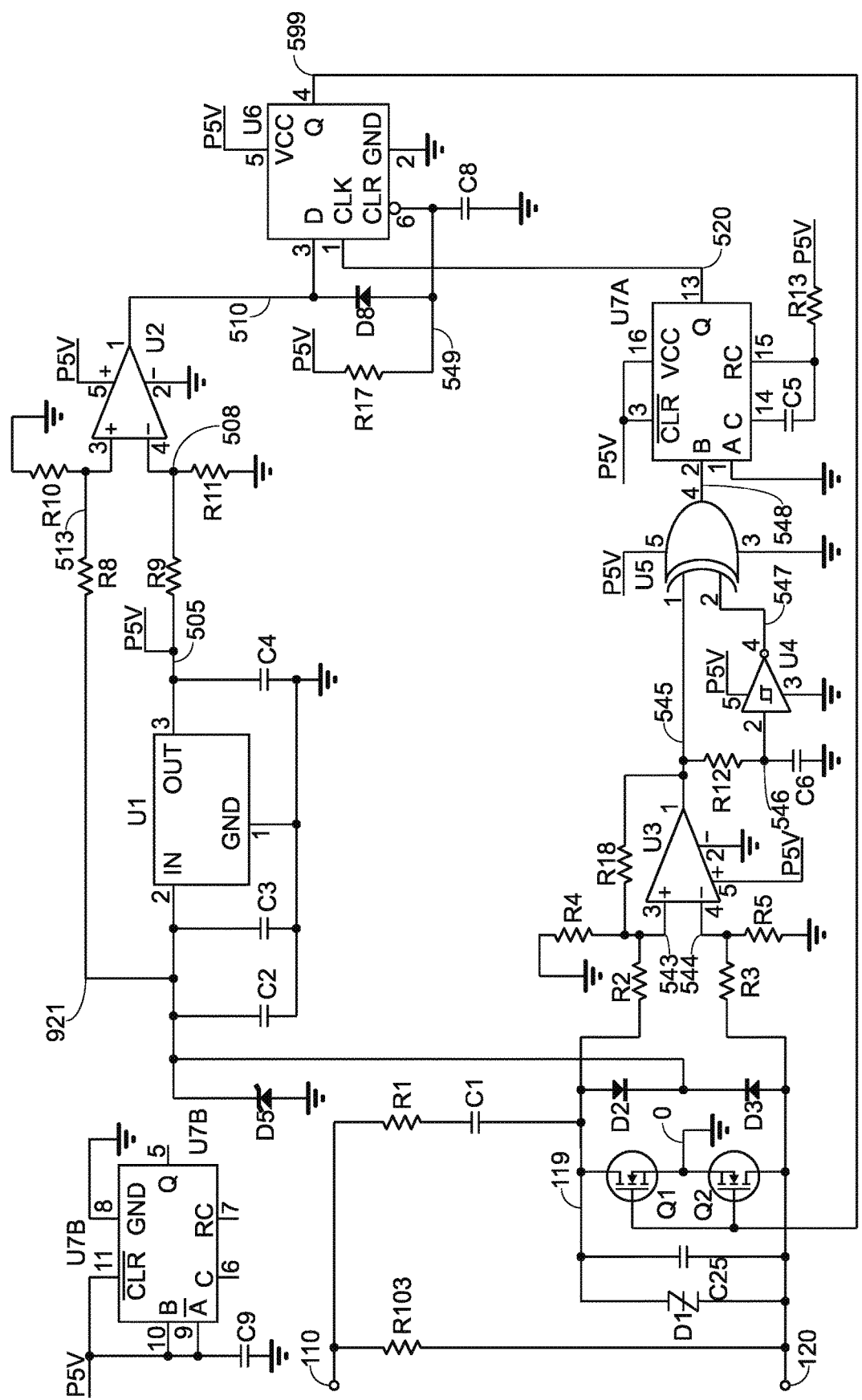
FIG. 18 is a simplified illustration of an example embodiment of the invention.

Reference is now made to FIG. 18, which is a simplified illustration of an example embodiment of the invention.

FIG. 18 shows a diagram of an AC to DC converter suitable for use in circuits such as, by way of some non-limiting examples, FIG. 2A, FIG. 7C, FIG. 12B, FIG. 14B, and FIG. 15. A description of the operation of FIG. 18 is similar to the description of operation of FIG. 15 where the following changes have been made:

Diode D8 is connected between output 510 and 549;
Resistor R18 is connected between 545 and 543;
Resistors R35, R36 were removed; and
Start-up circuit was removed.

A low level at output 510 clears Flip-Flop U6, which forces logic level "0" at output 599. When output 510 returns to logic level "1", the clear input of U6 returns to logic level "1" after a short delay [optionally in seconds or fractions of a second], which is determined by the product of R17 [Ω] and C8 [F]. The operation of Flip-Flop U6 is similar to the description of Flip-Flop 595 of FIG. 9B. Since R35 and R36 were removed (which potentially reduces power losses);

during the ON state of MOSFETs Q1 and Q2, the voltage between rectifier AC inputs 119 and 120 is very low.

In order to prevent potential influence of noise on the output of U3, a hysteresis function was optionally added. The hysteresis threshold is determined by a ratio of R18 to R2∥R4.

Reference is now made to FIG. 19, which shows a Bill of Material (BOM) table corresponding to the example embodiment of FIG. 18.

Figure 20B:
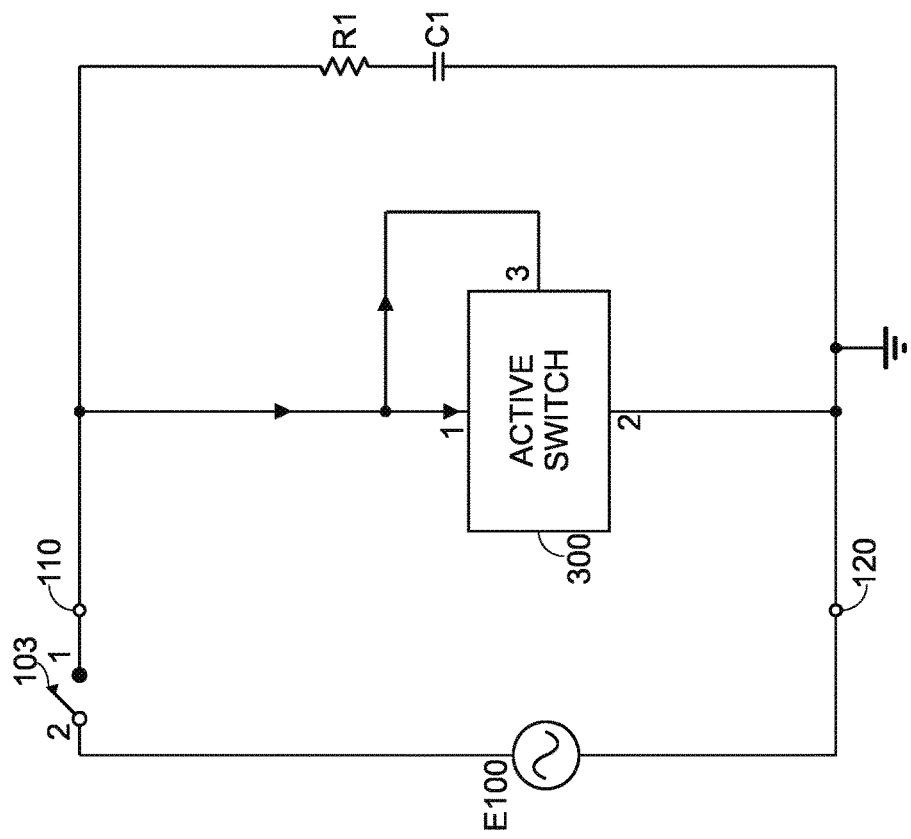
FIG. 20B is a simplified illustration of an active-switch apparatus according to an example embodiment of the invention.
Figure 20A:
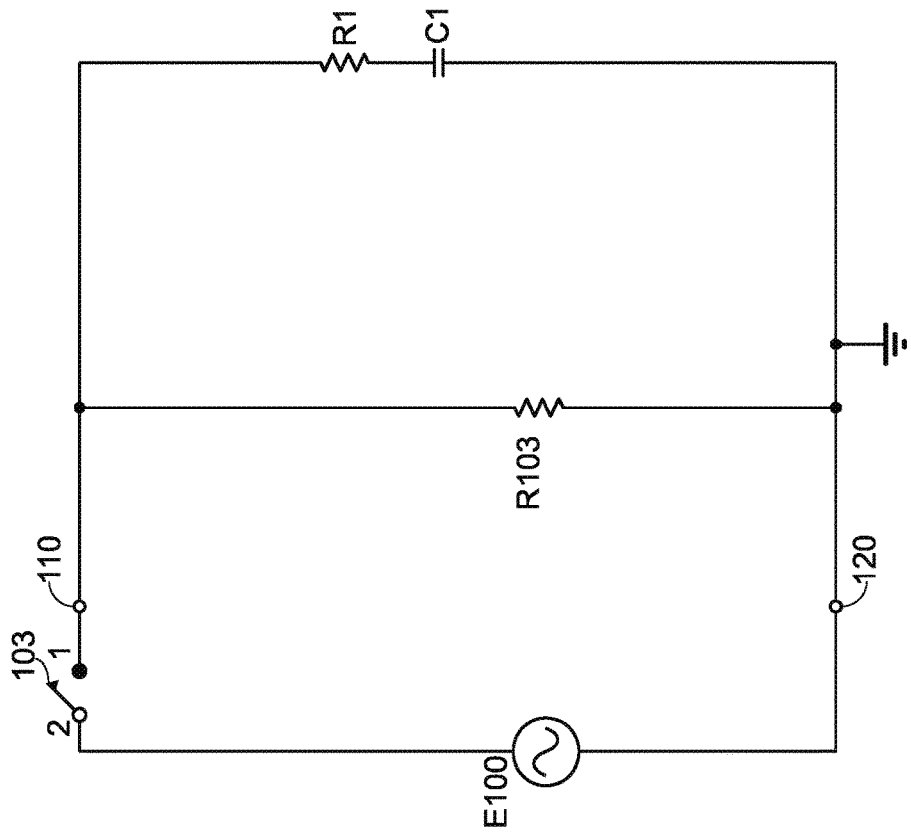
FIG. 20A is a simplified illustration of a prior art discharging circuit.

Reference is now made to FIG. 20A, which is a simplified illustration of a prior art discharging circuit.

In some cases, in order to meet safety regulations, there is need to discharge a capacitance connected to the power terminals within short time after disconnection from the power lines. A common solution uses a resistor in parallel to the power lines as described by resistor R103 of FIG. 1J ("bleeder" resistor). Most standards require a discharging time of 1 Sec. A high value of C1 requires a low value of R103, which, however, dissipates power during steady state. The power dissipation of a "bleeder" resistor can be hundreds of milliWatts. Since R103 is required only during disconnection events, during steady state operation its power dissipation is pure waste.

Reference is now made to FIG. 20B, which is a simplified illustration of an active-switch apparatus according to an example embodiment of the invention.

FIG. 20B shows an active-switch 300 in disconnection mode, when the active switch 300 detects an AC voltage across its terminals 1 and 2 (during steady state operation). The active-switch 300 is optionally in conduction mode, when it does not detect an AC voltage across its terminals 1 and 2 (after disconnection from power lines). The active-switch apparatus optionally enables discharging capacitor C1 when switch 103 is open (disconnection from power lines) while eliminating the power waste during steady state operation.

Figure 21B:
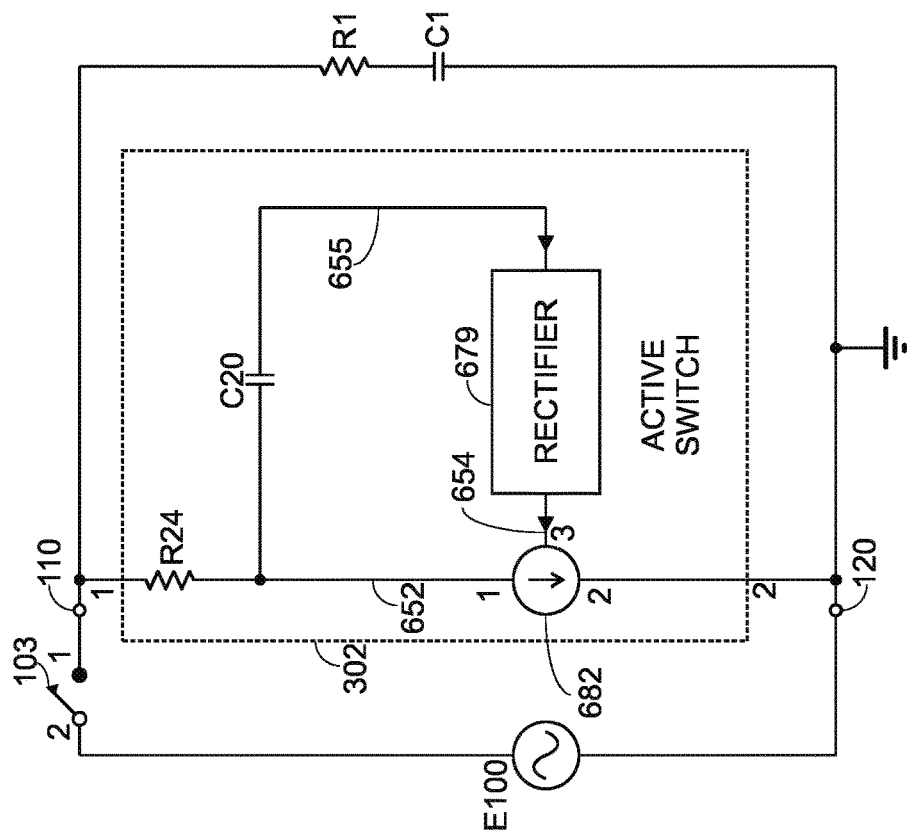
FIGS. 21A and 21B are simplified illustrations of active switch components according to example embodiments of the invention.
Figure 21A:
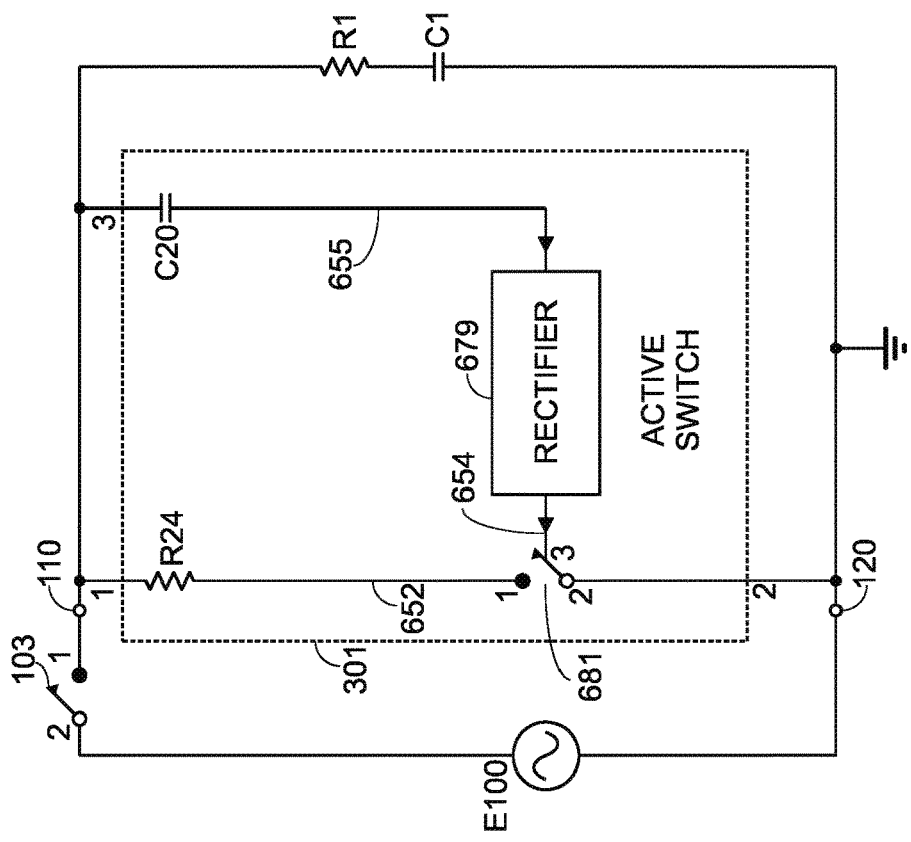

Reference is now made to FIGS. 21A and 21B, which are simplified illustrations of active switch components according to example embodiments of the invention.

The active switch components shown in FIGS. 21A and 21B may be used, by way of a non-limiting example, in the circuit shown in FIG. 20B.

The capacitor C20 operates as a DC blocker and transfers an AC signal to rectifier 679. The DC output of rectifier 679 corresponds to the controlling switch 681 of FIG. 21A or to the controlling AC current sink 682 of FIG. 21B. Since the AC current sink 682 of FIG. 21B has high impedance, detection of the AC signal through C20 can be made across the current source 652.

Figures 22A, 22B:
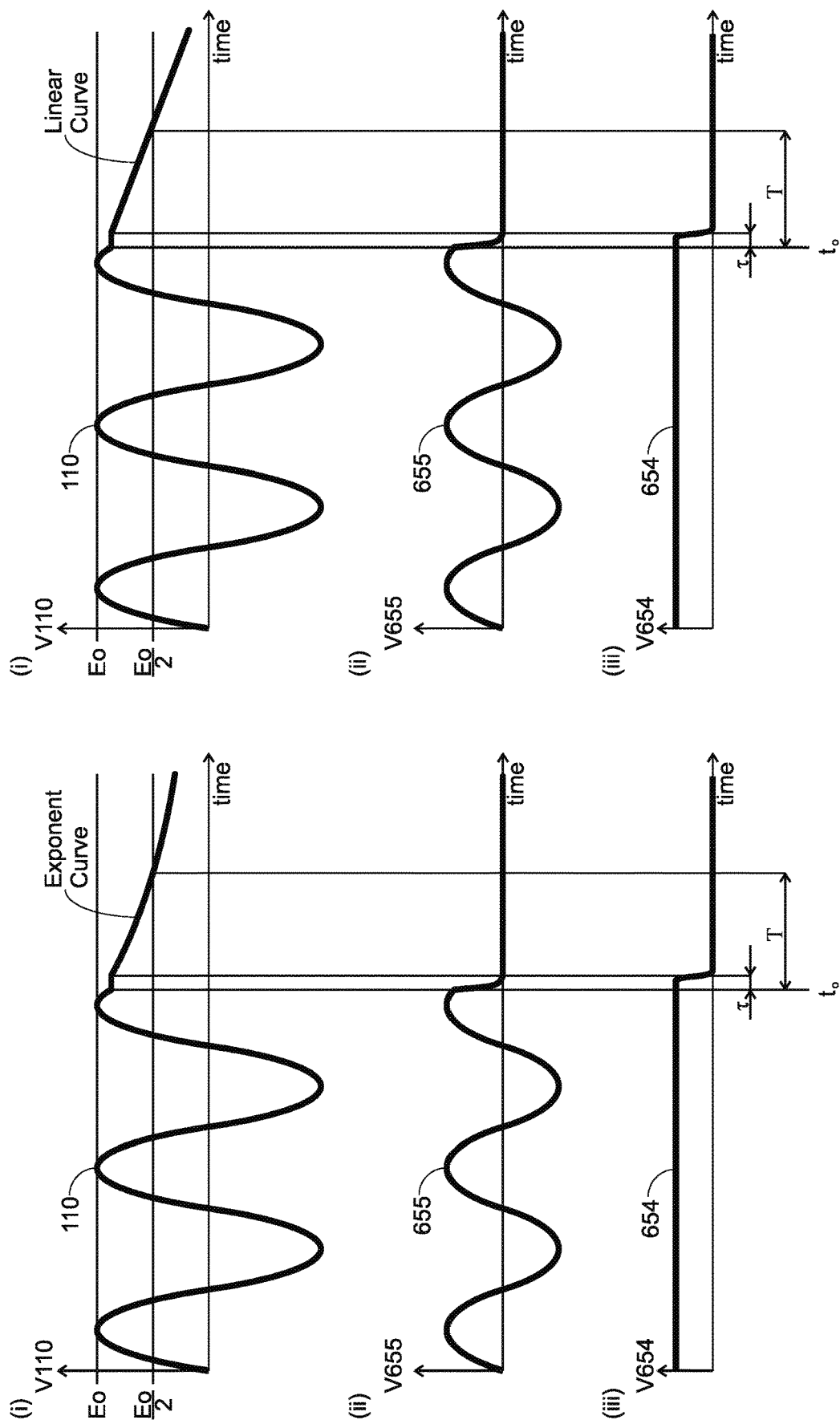
FIG. 22A and FIG. 22B show simplified timing diagrams according to example embodiments of the invention.

Reference is now made to FIG. 22A and FIG. 22B, which show simplified timing diagrams according to example embodiments of the invention.

FIG. 22A and FIG. 22B show timing diagrams describing operation of circuits such as, by way of a non-limiting example, shown in FIG. 21A and FIG. 21B, respectively. The timing diagrams start with power lines connected between terminals 110 and 120 (switch 103 is closed) and at time $t_0$ the power lines are disconnected (switch 103 is open).

Timing diagram (i) demonstrates the voltage of terminal 110. At time $t_0$, when switch 103 changes into OFF position, the voltage level across capacitor C1 (between terminals 110 and 120) optionally holds the same level as it was prior to $t_0$.

Timing diagram (ii) demonstrates the voltage at the input of rectifier 679 and it falls toward zero after $t_0$.

Timing diagram (iii) demonstrates the output voltage level of rectifier 679 and it can be seen that it takes a short time τ to detect the absence of AC input. When output voltage 645 of rectifier 679 falls to zero, it discharges capacitor C1 by turning ON a switch such as switch 681 of FIG. 21A or by activating a current sink such as the AC current sink 682 of FIG. 21B.

Timing diagram (i) demonstrates a difference between the switch and the AC current sink: FIG. 21A describes exponential discharging according to the products of R24 with C1 (assuming R1<<R24) and FIG. 21B describes linear discharging (assuming R1 and R24 are negligible).

Figure 23B:
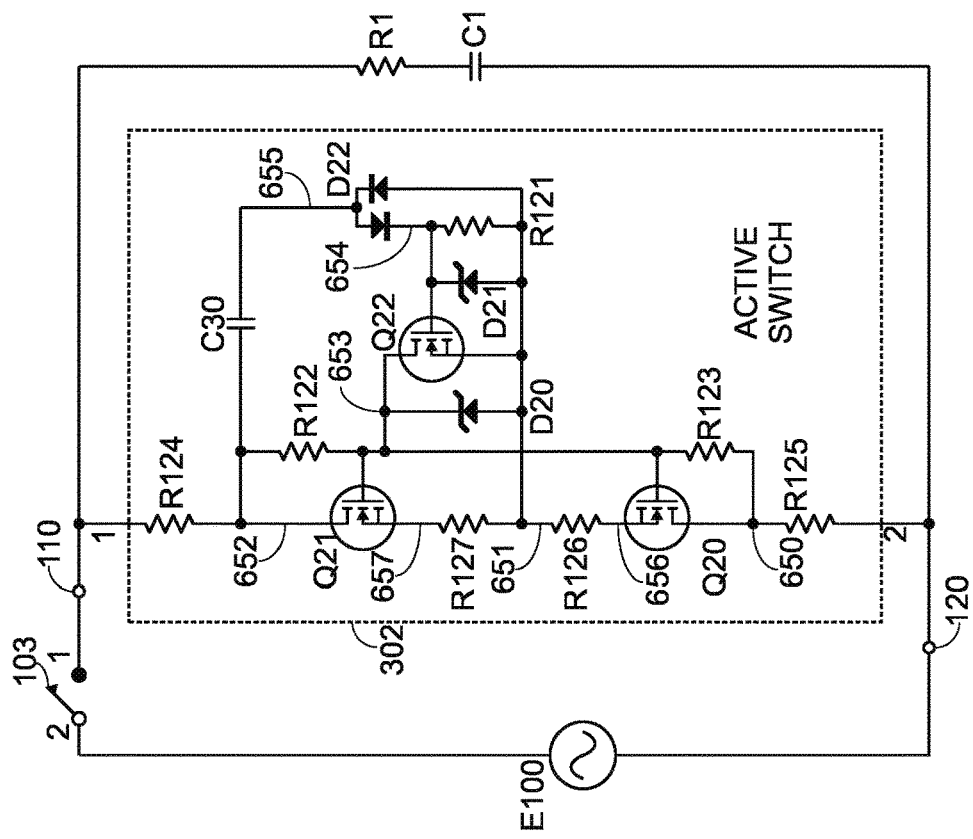
FIGS. 23A and 23B are simplified illustrations of active switch components according to example embodiments of the invention.
Figure 23A:
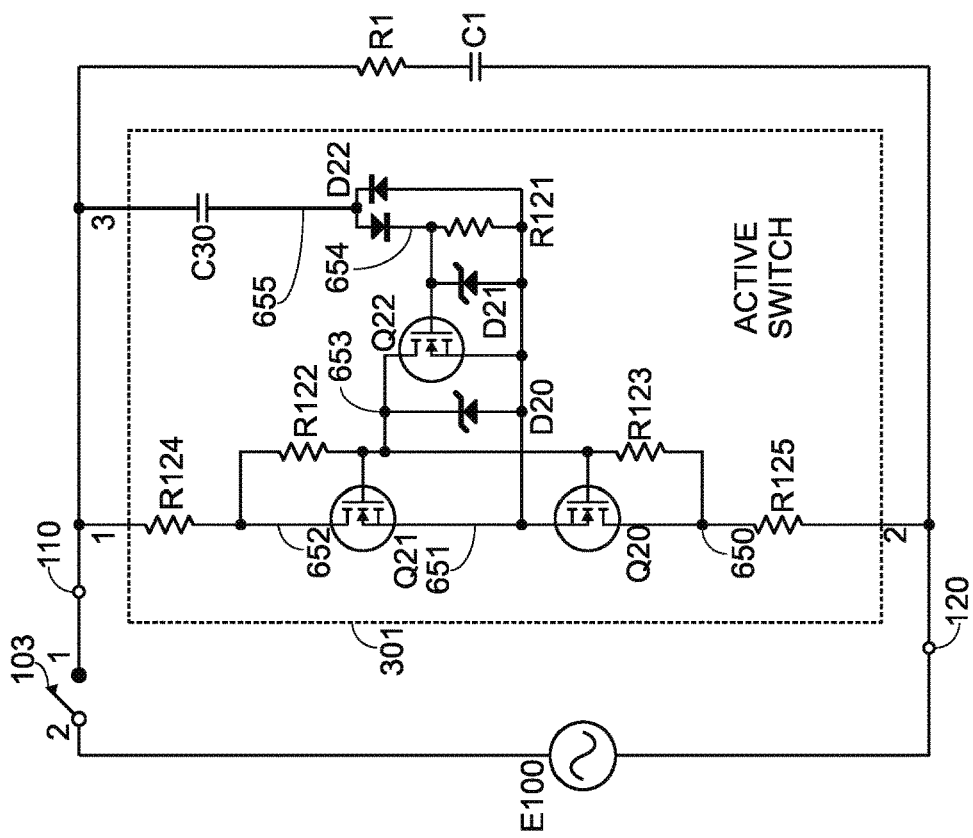

Reference is now made to FIGS. 23A and 23B, which are simplified illustrations of active switch components according to example embodiments of the invention.

The active switch components shown in FIGS. 23A and 23B may be used, by way of a non-limiting example, in the circuits shown in FIG. 21A and FIG. 21B, respectively.

FIGS. 23A and 23B show capacitor C20 operating as a DC blocker, and diodes in D22 connected as a half wave rectifier. The output of rectifier D22 feeds the input of inverter comprised of MOSFET Q22, and its input capacitance operates as a DC filter to the rectifier. Zener diode D21 protects the gate of MOSFET Q22 against over voltage. Resistor R121 discharges the gate charge of MOSFET Q22. MOSFETs Q21 and Q22 in the example embodiment of FIG. 7B are configured as an AC switch. Resistors R122 and R123 provide the bias to activate the AC switch. MOSFETs Q21, Q22 and resistors R126, R127 of FIG. 23B are configured as an AC current sink. Resistors R122 and R123 provide the bias to activate AC current sink. Diode D20 protects the gates of MOSFETs Q21, and Q22 against over voltage.

Reference is now made to FIG. 24A and FIG. 24B, which are Bill of Material tables corresponding to corresponding to the example embodiments of FIG. 23A and FIG. 23B, respectively.

Figure 25:
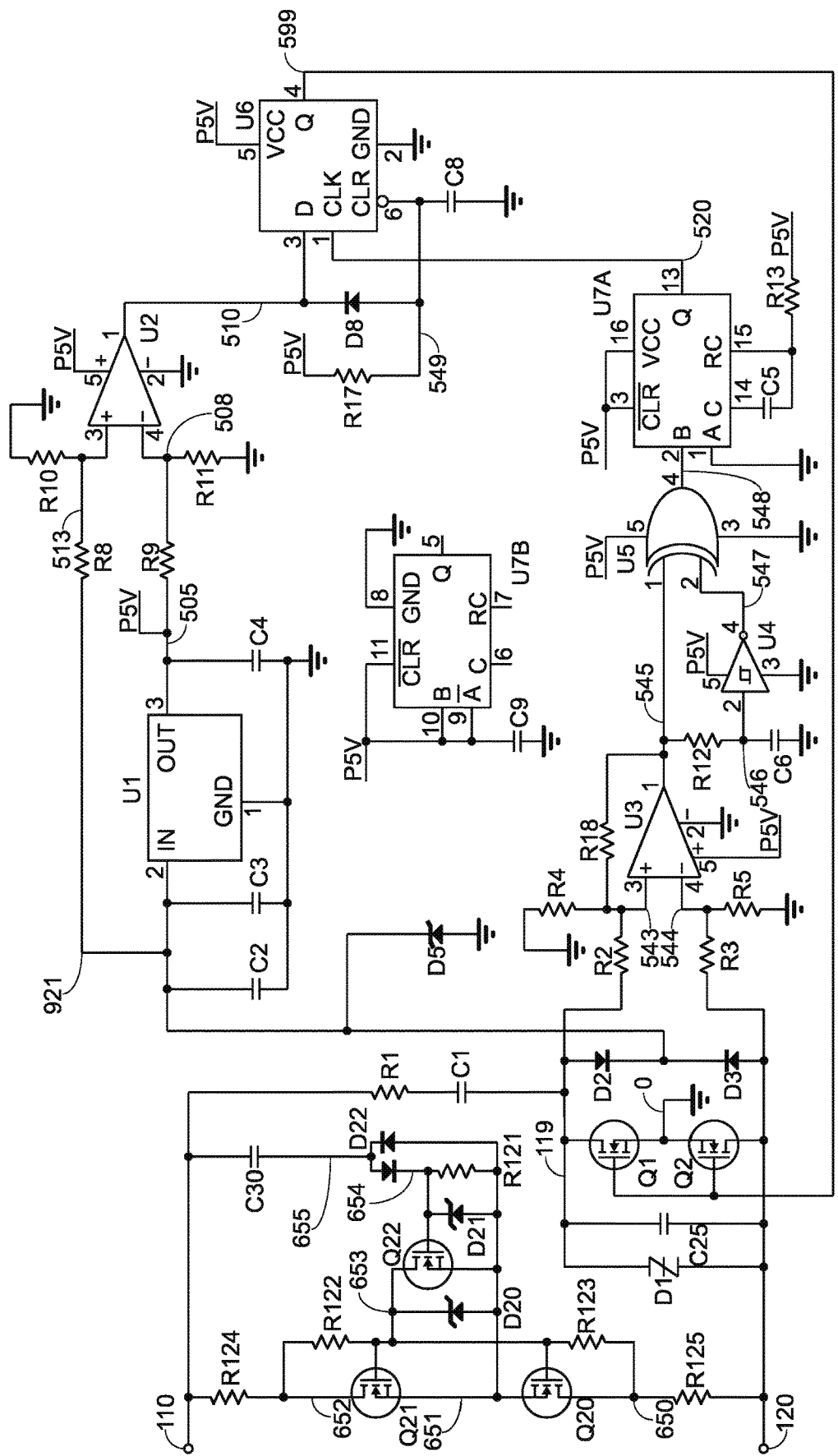
FIG. 25 is a simplified illustration of an AC to DC converter according to an example embodiment of the invention.

Reference is now made to FIG. 25, which is a simplified illustration of an AC to DC converter according to an example embodiment of the invention.

The AC to DC converter design shown in FIG. 25 may be used, by way of a non-limiting example, in the circuits shown in FIG. 18 and FIG. 23A.

The description is similar to the description of FIG. 18, where R103 is replaced with circuit 301 of FIG. 23A.

Reference is now made to FIG. 26 and FIG. 27, which show a Bill of Material (BOM) table corresponding to the example embodiment of FIG. 25.

Figure 28B:
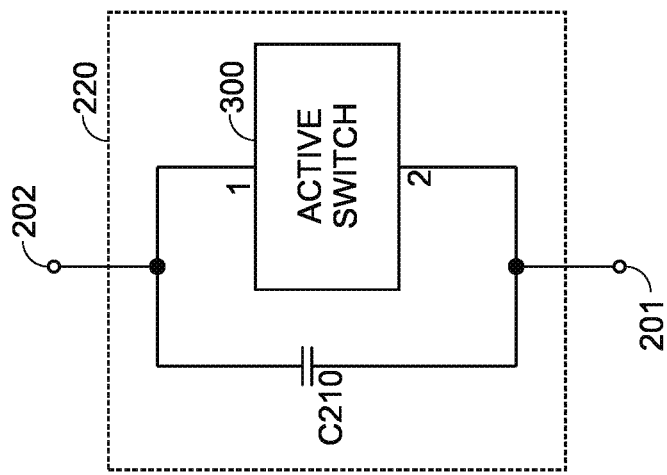
FIG. 28B is a simplified illustration of an example embodiment of the invention.
Figure 28A:
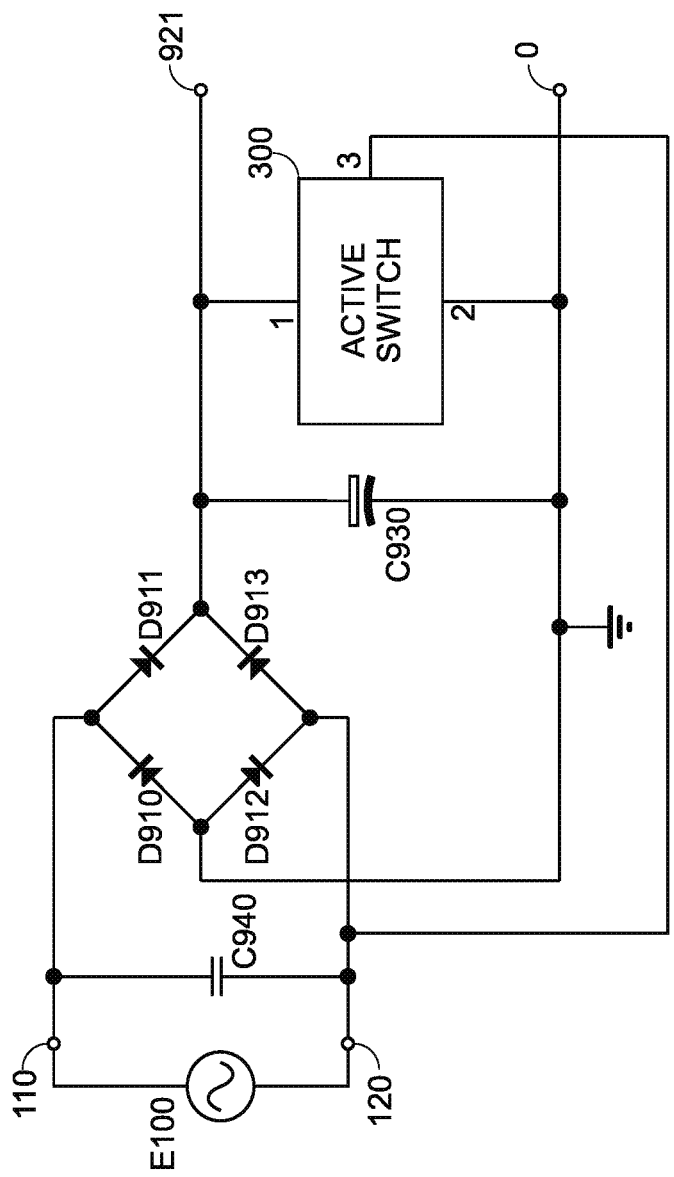
FIG. 28A is a simplified illustration of an example embodiment of the invention.

Reference is now made to FIG. 28A, which is a simplified illustration of an example embodiment of the invention.

FIG. 28A shows a conceptual block diagram of an active switch suitable for use in circuits such as, by way of some non-limiting examples, FIG. 21A and FIG. 21B.

FIG. 28A shows an AC source E100 connected to capacitor C940 and bulk capacitor C930 through full wave rectifier, including comprising diodes D911÷D914. Active-switch apparatus 300 is connected in parallel to bulk capacitor C930 wherein sensing input (3) of apparatus 300 is connected to one of the AC input terminals (in this case terminal 120). When the AC power is disconnected from the circuit, the Active-switch apparatus 300 starts to conduct and discharges both capacitors: capacitor C930, and capacitor C940 (through the full wave rectifier).

Reference is now made to FIG. 28B, which is a simplified illustration of an example embodiment of the invention.

FIG. 28B shows a conceptual block diagram of an active switch suitable for use in circuits such as, by way of some non-limiting examples, FIG. 21A and FIG. 21B.

FIG. 28B demonstrates an Active-switch apparatus 300 assembled together with a capacitor C210. Such a configuration can create a new family of AC capacitors with an internal self-discharging mechanism and without leakage.

Figure 29:
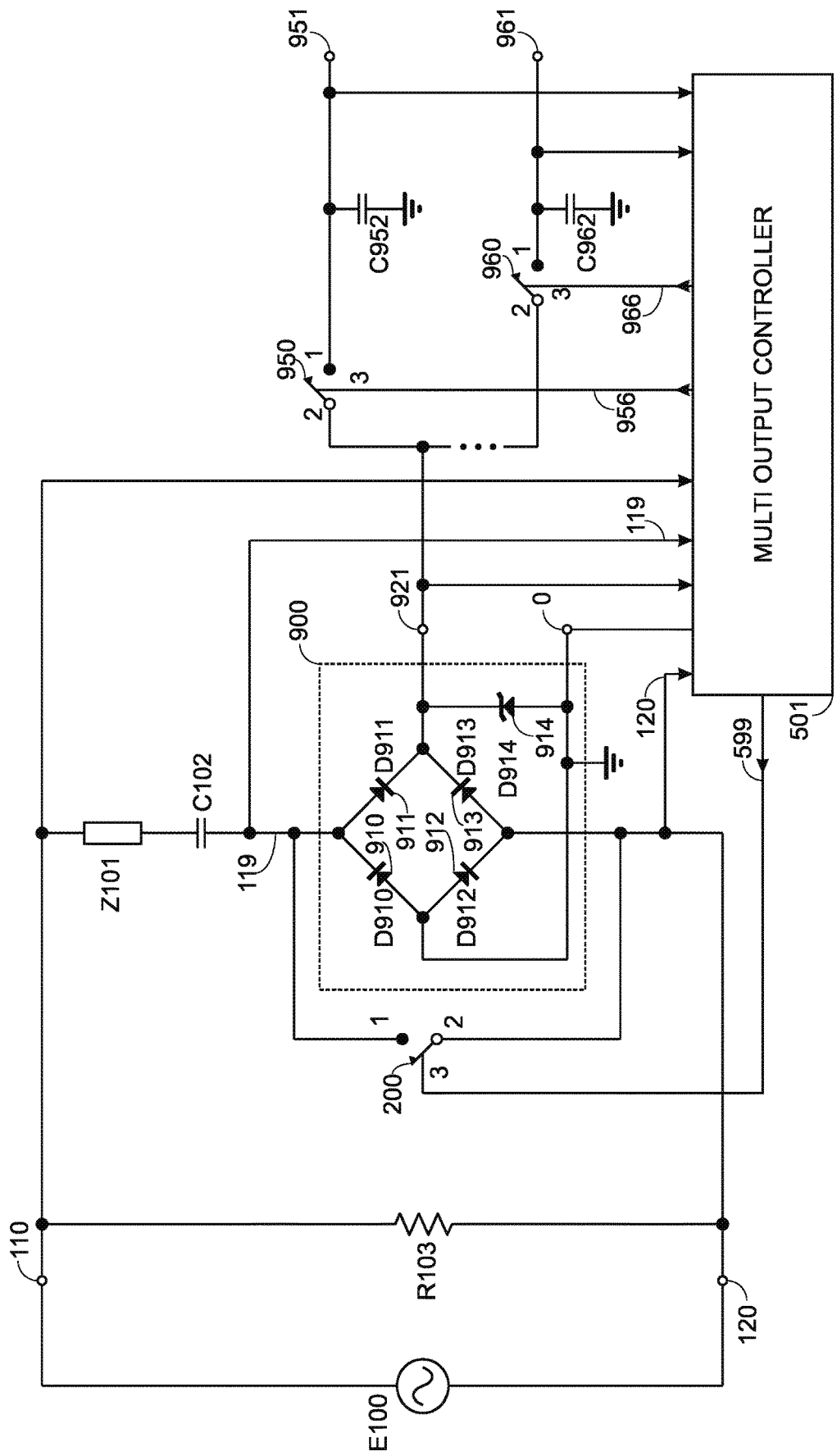
FIG. 29 is a simplified illustration of a multi-DC-output AC to DC convener according to an example embodiment of the invention.

Reference is now made to FIG. 29, which is a simplified illustration of a multi-DC-output AC to DC converter according to an example embodiment of the invention.

Description of FIG. 29 follows similarly to the description of FIG. 2A, wherein there is no DC filter at the output of the rectifier and there are series switches 950, 960 that connect rectified DC 921 of each one of DC outputs 951 or 961, respectively. Each one of the DC outputs includes capacitors 952 and 962 to store the energy. A Multi-Output-Controller 501 controls switch 200 and each one of the series switches 950 960 according to one or more of the following inputs: rectifier AC inputs 119 and 120, rectified DC 921, and DC outputs 951 or 961.

Figure 30:
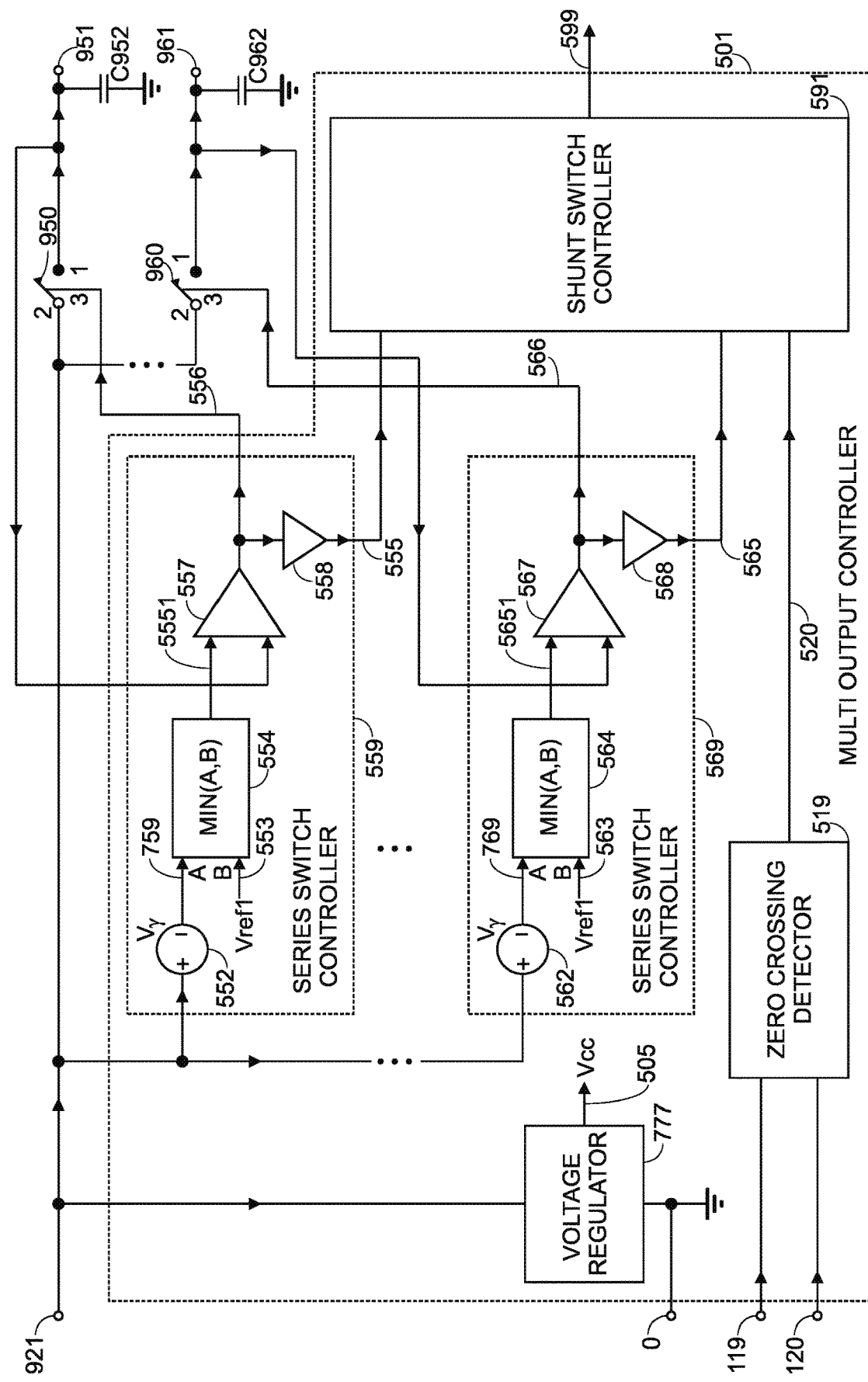
FIG. 30 is a simplified illustration of a multi-DC-output AC to DC converter according to an example embodiment of the invention.

Reference is now made to FIG. 30, which is a simplified illustration of a multi-DC-output AC to DC converter according to an example embodiment of the invention.

FIG. 30 shows a Multi-Output-Controller 501 which includes:
- series switch controllers 559 and 569;
- a Zero-Crossing-Detector 519;
- a Shunt-Switch-Controller 591; and
- a voltage regulator 777.

The voltage regulator 777 optionally supplies the electrical power for the operation of Multi-Output-Controller 501. The Zero-Crossing-Detector 519 operates similarly to the to description of FIG. 8.

The Multi-Output-Controller 501 is in a steady state mode when all the DC outputs 951 and 961 are above their nominal value (Vreff1 at 553 and Vreff2 at 563) and do not require correction. During the steady state mode, series switches 950 and 960 are optionally controlled to be open and switch 200 of FIG. 29 is optionally controlled to be closed.

When DC output 951 falls below its nominal value (Vreff1, 553), Shunt-Switch-Controller, through its output 599, opens switch 200 and rectified DC 921 starts to rise gradually according to the absolute value of the voltage between rectifier AC inputs 119 and 120 of FIG. 29. When the voltage level of rectified DC 921 is higher by Vγ than DC output 951, series switch 950 is optionally closed and starts to charge capacitor C952. This process is optionally ended when DC output 951 is higher than its nominal value or when voltage of rectified DC 921 starts to fall below DC output 951.

The control of DC output 961 is similar to the description of control DC output 951.

In some embodiments each one of the series switches 950 960 optionally operates independently, and there are some cases when both series switches are closed simultaneously, such cases typically happen during start-up time.

Such a mechanism minimizes switching losses due to Vγ being small (causes very low current during the switching time), which enables "smooth" connection (no current step during connection of series switches).

A level shift comparator 558 provides at its outputs 555 a true or false signal according to the status of series switch 950 (conduction or disconnection), respectively. Similarly, level shift comparator 568 provides at its outputs 565 a true or false signal according to the status of series switch 960 (conduction or disconnection), respectively. Outputs 555 and 565 are fed into Shunt-Switch-Controller 591. A true signal of at least one of outputs 555 or 565 causes output 599 to control opening switch 200. The switch 200 will optionally close again on the first zero crossing event 520 when all outputs 555 and 565 provide false signal.

Reference is now made to FIG. 31A, which is a simplified illustration of a series switch and a series switch controller according to an example embodiment of the invention.

FIG. 31A shows a series switch 950 and a series switch controller 559 which are suitable for use in the example embodiment of FIG. 30.

FIG. 31A shows the series switch 950 including two P-channel MOSFETs Q5A and Q5B connected in an AC switch configuration. Since the voltage of DC output 951 can be higher, equal or lower than rectified DC 921, there are polarity changes across the switch. The polarity changes use a bipolar switch (AC switch).

The series switch controller 559 includes:
- a voltage dropper 552 (described as Vγ with reference to FIG. 30);
- an apparatus 554 that detects the minimum voltage level between inputs 759 and 563;
- a comparator 557 and
- a level shifter 5581.

Voltage dropper 552 comprises a Zener diode D52, which is biased through R52C. The voltage divider comprising R52A and R52B divides the Zener diode D52 voltage. The voltage at terminal A of 552 is determined according to the following equations:

$$\underbrace{\frac{V_\gamma}{e.g.\ of\ FIG.\ 30}} = \frac{V_{HL}}{V_{Zener}} \cdot \frac{R_{52A}}{R_{52A}+R_{52B}}$$

$$V_A = V_{921} - V_{HL} \cdot \frac{\frac{R_{52A}}{R_{52A}+R_{52B}}}{V_\gamma}$$

Apparatus 554 comprises two operational amplifiers 54A and 54B and two diodes D54A and D54B. When $V_A < V_B$ output 5551 gets the value of $V_A$ (since output XB is in positive saturation and diode D54B is reversed biased). When $V_A > V_B$ output 5551 gets the value of $V_B$ (since output XA is in positive saturation and diode D54A is reversed biased). Level shifter 558 includes comparator 5581 and provides at its output 555 logic levels according to the status of switch 950.

Reference is now made to FIG. 31B, which is a simplified illustration of a series switch and a series switch controller according to an example embodiment of the invention.

FIG. 31B shows a series switch 950 and a series switch controller 559 which are suitable for use in the example embodiment of FIG. 31A.

The description of FIG. 31B is similar to the description of FIG. 31A wherein the configuration of AC switch 950 is implemented by diode D957 and MOSFET Q5B.

Reference is now made to FIG. 31C, which is a simplified illustration of a series switch according to an example embodiment of the invention.

FIG. 31C shows a diode D957 which operates as a series switch 950 such as, by way of a non-limiting example, the series switch 950 shown in FIG. 31B.

The example embodiment switch 950 in FIG. 31C is potentially suitable for optional use for the highest DC output level of multi-DC-output AC to DC according to FIG.

30, when the output voltages are positive, and suitable for optional use for the lowest DC output level when the output voltages are negative.

Reference is now made to FIG. 31D, which is a simplified illustration of a voltage regulator according to an example embodiment of the invention.

FIG. 31D shows a voltage regulator such as, by way of a non-limiting example, the voltage regulator shown in FIG. 30.

Rectified DC 921 is not typically filtered, and, in the example embodiment of FIG. 31D, diode D585 and capacitor C586 separate DC voltage 587 from rectified DC 921 and provide operating voltage 505. The description of LDO 504 of FIG. 31D can optionally be similar to the description of the LDO of FIG. 9A.

Reference is now made to FIG. 32A, which is a simplified illustration of an example embodiment of the invention.

FIG. 32A is suitable for use in circuits such as shown in FIG. 6, FIG. 9A, FIG. 29 and FIG. 30. The description of FIG. 32A is a similar description to the description of FIG. 30, and a Shunt-Switch-Controller 591 is described in more details. The Shunt-Switch-Controller 591 includes: a Flip-Flop 595, and an inverted input AND gate 594 (NOR gate).

A logic level "0" at output 599 opens a switch such as the switch 200 of FIG. 29, and logic level "1" at output 599 closes the switch. Output 597 of gate 594 is at logic level "1" only if all inputs 555 and 565 are simultaneously at logic level "0". Output 597 is at logic level "0" if at least one input is at logic level "1". Logic level "0" at 597 forces output 599 of Flip-Flop 595 to logic level "0". Flip-Flop 595 will set its output 599 to logic level "1" on a zero crossing event 520 while line 597 is at logic level "1".

Reference is now made to FIG. 32B, which is a simplified illustration of an example embodiment of the invention.

FIG. 32B is suitable for use in circuits such as shown in FIG. 6, FIG. 9B, FIG. 29, and FIG. 30. The description of FIG. 32B is a similar description to the description of FIG. 32A, wherein the "clear" input of Flip-Flop 595 in FIG. of FIG. 32A was omitted. The Flip-Flop 595 sets its output 599 to logic level "1" on a zero crossing event 520, while line 597 is at logic level "1". The Flip-Flop 595 clears its output 599 on a zero crossing event 520 while line 597 is at logic level "0".

Figure 33:
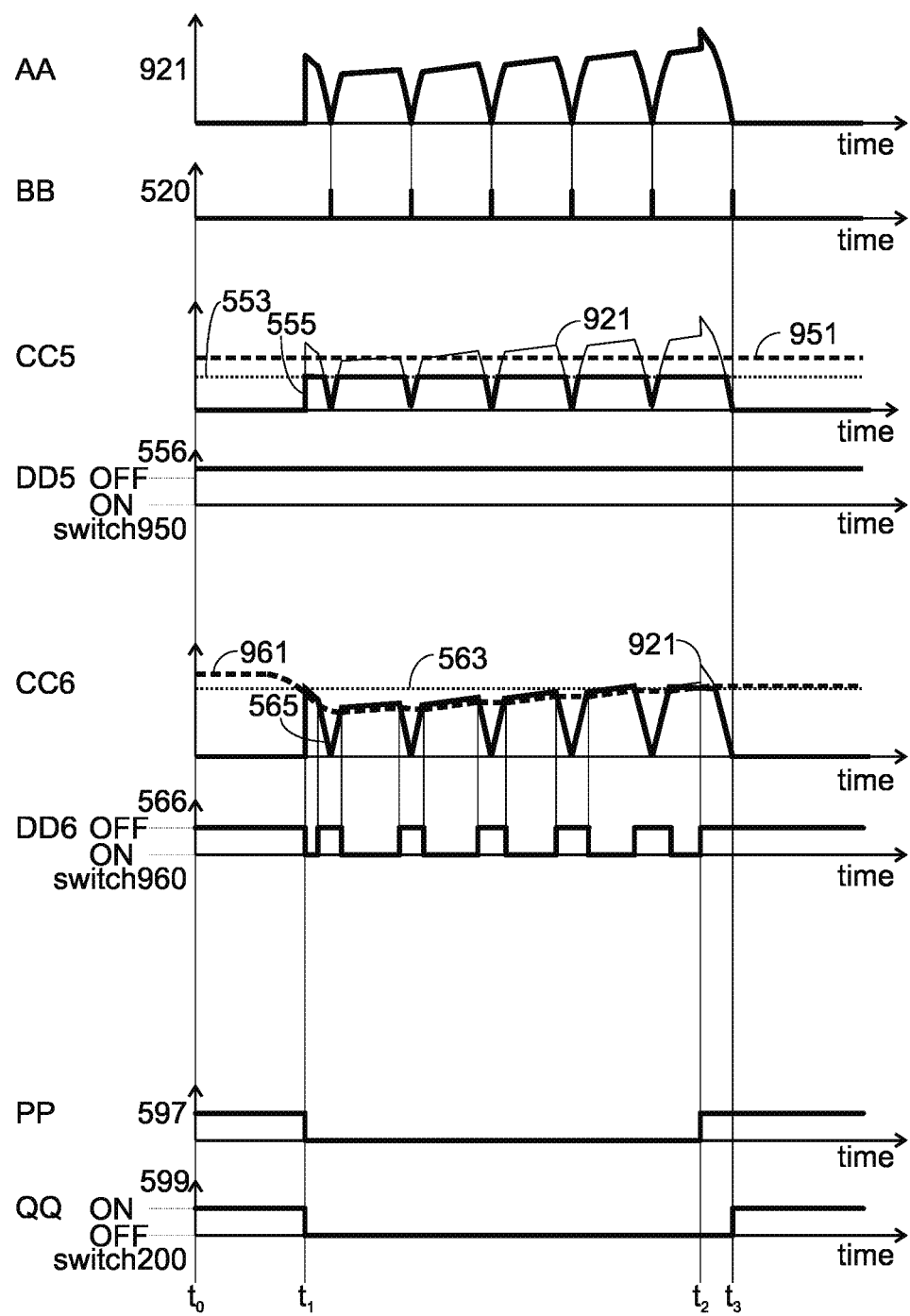
FIG. 33 shows simplified timing diagrams according to example embodiments of the invention.

Reference is now made to FIG. 33, which shows simplified timing diagrams according to example embodiments of the invention.

FIG. 33 shows timing diagrams describing operation of circuits such as, by way of a non-limiting example, shown in FIG. 29, FIG. 30, FIG. 32A and FIG. 32B.

At time t0 outputs 951 and 961 of FIG. 30 are above their nominal voltage level 553 and 563.

Timing diagram AA demonstrates the voltage of the rectified DC 921 of FIG. 29. When switch 200 of FIG. 29 is closed, the voltage of rectified DC 921 falls to zero. When switch 200 is is open, rectified DC 921 charges the capacitor of one or more of the DC outputs 951 or 961 of FIG. 21. It is noted that In this may be a reason for the clamped shape.

Timing diagram BB demonstrates output 520 of Zero-Crossing-Detector 519 of FIG. 30.

Timing diagram CC5 demonstrates DC output 951 of FIG. 30, reference voltage 553 of FIG. 30, rectified DC 921 and the output product 555 of FIG. 30.

Timing diagram DD5 demonstrates output 556 of FIG. 30, which indicates the status of switch 950 of FIG. 30.

Timing diagram CC6 demonstrates DC output 961 of FIG. 30, reference voltage 563 of FIG. 30, rectified DC 921 and the output product 565 of FIG. 30.

Timing diagram DD6 demonstrates output 556 of FIG. 30, which indicates the status of switch 960 of FIG. 30.

Timing diagram PP describes signal 597 of FIG. 32A or FIG. 32B. When any of the DC outputs requires "correction", output 597 falls to logic level "0", which forces logic level "0" at output 599 of FIG. 29. When all DC outputs 951, 961 are higher than their reference 553, 563, respectively, output 597 changes to logic level "1".

Timing diagram QQ demonstrates output 599 of Flip-Flop 595. Logic level "0" at 597 (Timing diagram PP) clears output 599 (logic level "0") and the zero crossing event (Timing diagram BB) at time t3, returns output 599 to logic level "1".

Figure 34:
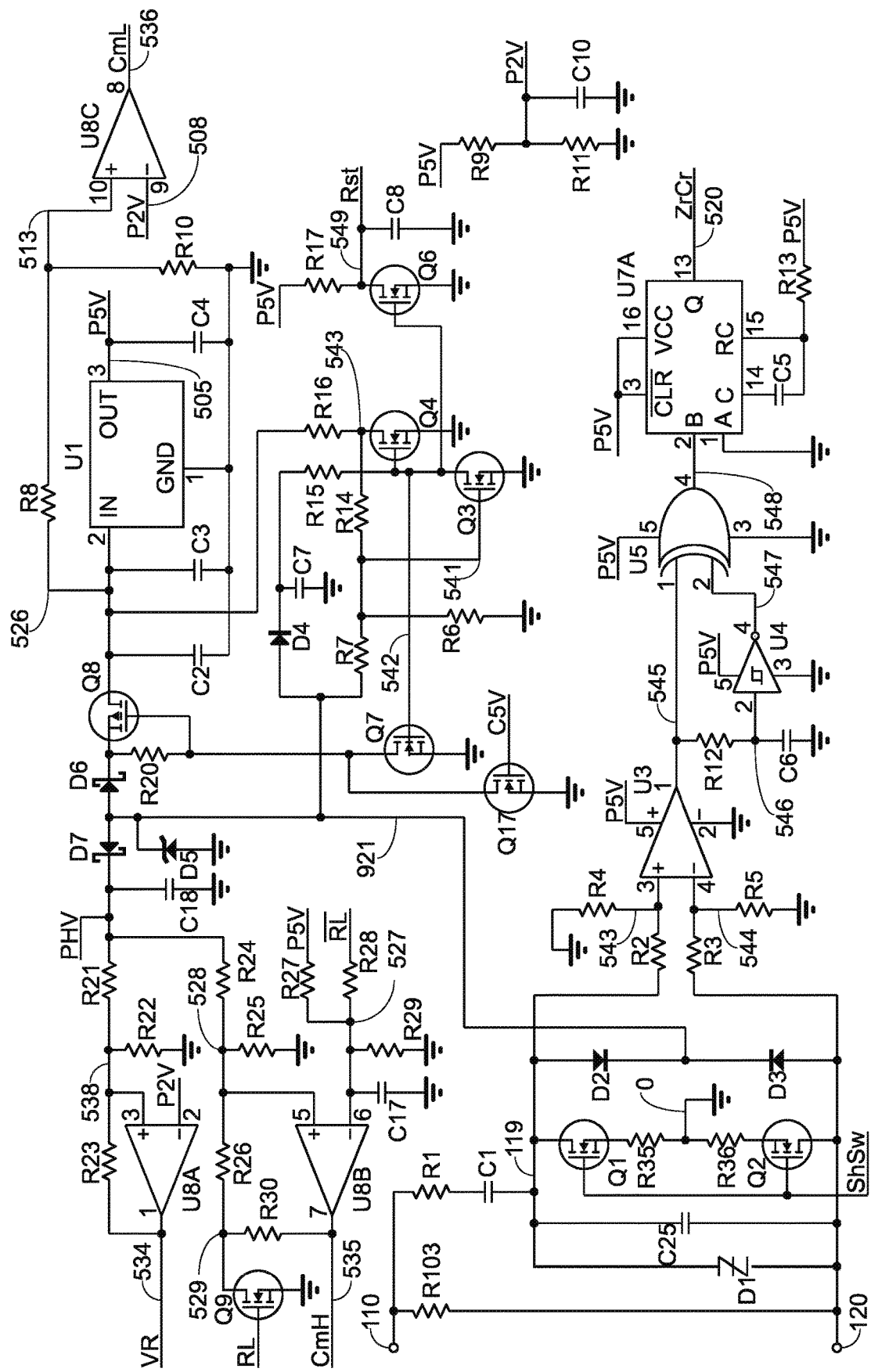
FIG. 34 and FIG. 35 are simplified illustrations of a dual output AC to DC converter according to an example embodiment of the invention.
Figure 35:
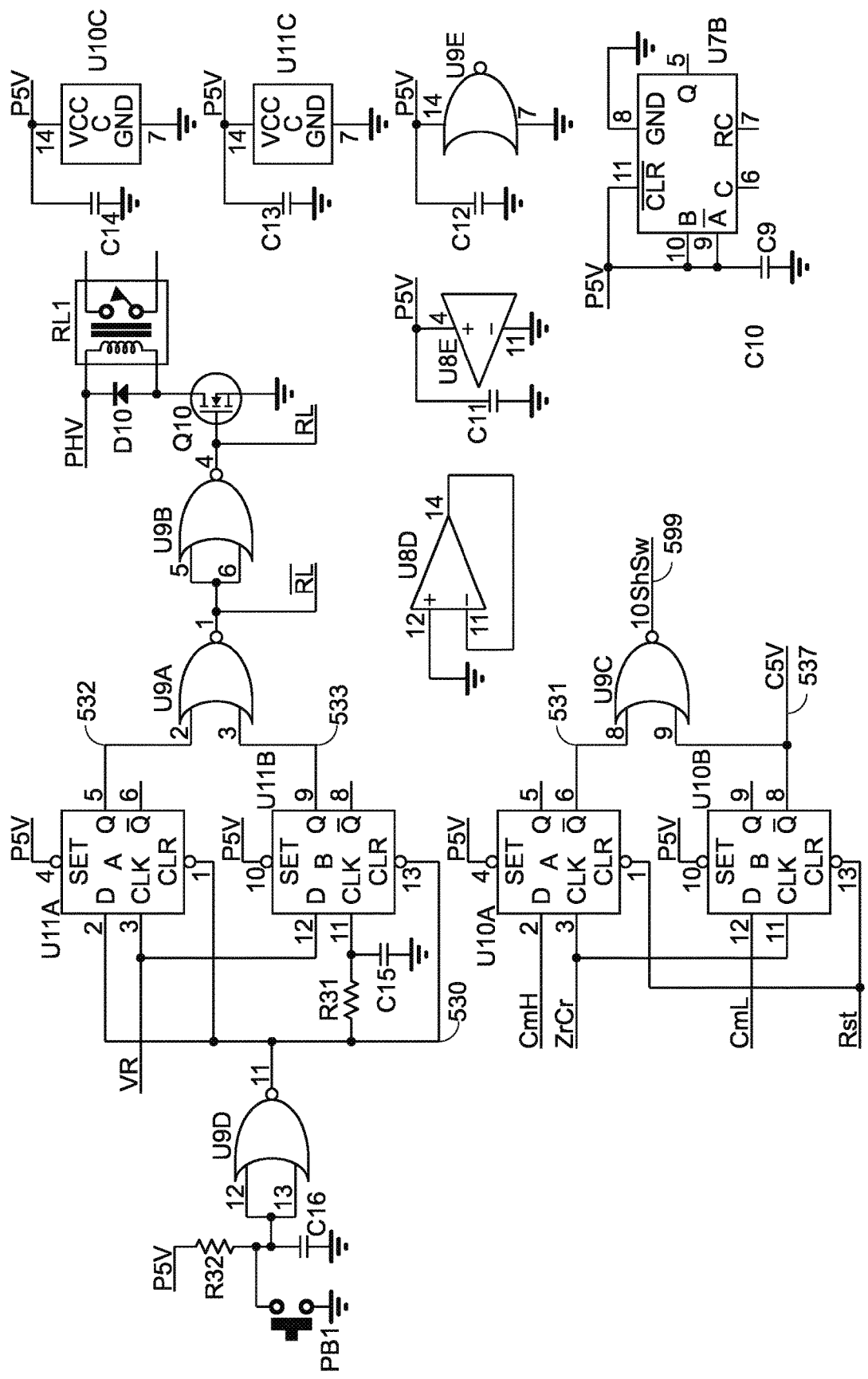

Reference is now made to FIG. 34 and FIG. 35 which are simplified illustrations of a dual output AC to DC converter according to an example embodiment of the invention.

FIG. 34 and FIG. 35 show circuits optionally suitable for driving a relay.

Description of FIG. 34 follows similarly to the description of FIG. 15, where the AC to DC converter drives, by way of a non-limiting example, two output voltages: P5V and PHV. PHV output drives relay RU. The P5V path has a series switch, for example a series switch such as shown in FIG. 31B. The series switch includes diode D6 and MOSFET Q8. The PHV path has a series switch diode D7 such as shown in FIG. 31C. A control on MOSFET Q8 is optionally made by a wired-Or gate connection including MOSFETs Q7 and Q17. MOSFET Q7 is controlled by the start-up circuit and MOSFET Q17 is controlled by Flip-Flop U10B. Each of the power paths has its own filter capacitor: C2 for the P5V path and C18 for the PHV path. There are optionally two comparators to stabilize each one of the outputs. Comparator U8C operates, by way of a non-limiting example, similarly to comparator U2 of FIG. 25. Comparator U8B stabilizes PHV output. Flip-Flops U10A and U10B synchronize output 535 and 536 to the zero crossing events 520, respectively. Outputs 531 and 537 of Flip-Flops U10A and U10B are connected to NOR gate U9C. Output 599 of NOR gate U9C controls the gates of MOSFETs Q1 and Q2.

Since PHV is loaded by a relay, it has two operating voltage levels: a trip voltage, and a hold voltage. The trip voltage is, by way of a non-limiting example, 80% (18V) of the relay rated voltage (24V). The hold voltage is, by way of a non-limiting example, 20% of its rated voltage (2.4V). In some embodiments, in order to save power, the comparator U8B has the ability to optionally control two output voltages. In the trip mode the PHV level is optionally determined by:

$$V_{527} = 5v \cdot \frac{R_{29}}{R_{29} + (R_{28} \| R_{27})} = V_{PHV}^{trip} \cdot \frac{R_{25}}{R_{25} + R_{24}} \pm V_{hysteresis}$$

$$V_{hysteresis} \approx 5v \cdot \frac{R_{25}}{R_{26} + R_{30}} \text{ for } R_{24} \gg R_{25}$$

The hysteresis voltage is optionally adjusted to the following levels: the controller starts to charge capacitor C18 at 22V and stops charging at 26V.

The hold mode voltage level (after relay RL1 was tripped) is optionally determined by:

$$V_{527} = 5v \cdot \frac{R_{29} \| R_{28}}{R_{29} \| R_{28} + R_{27}} = V_{PHV}^{hold} \cdot \frac{R_{25} \| R_{26}}{R_{25} \| R_{26} + R_{24}}$$

In such a mode hysteresis is stopped by MOSFET Q9.

In the example embodiment two conditions trip relay RL1: PHV is higher than the trip voltage of the relay and switch PB1 is activated. When switch PB1 is activated, it causes output 530 of U9D to change into logic level "1". Logic level "1" at output 534 of comparator U5A indicates that PHV is greater than the trip voltage of relay RL1.

$$V_{538} = 2v = V_{PHV}^{trip} \cdot \frac{R_{22}}{R_{22} + R_{21}} \pm V_{hysteresis}$$

$$V_{hysteresis} \approx 5v \cdot \frac{R_{22}}{R_{23}} \text{ for } R_{21} \gg R_{22}$$

When output 534 changes into logic level "1" and output 534 is at logic level "1", output 533 of Flip-Flop U11B changes to logic level "1", after a delay, which is determined by the product of R31 and C15. The OR gate including NOR gates U9A and U9B, activates relay RL1 by activating MOSFET Q10. After relay RL1 has activated, comparator U8B stabilizes PHV to its hold voltage, which causes output 534 of comparator U5A to change its logic level to "0".

When PB1 is released, it causes output 530 of U9D to change into logic level "0", which resets Flip-Flops U11A, U11B and releases RL1. After RL1 was released, comparator U8B stabilizes PHV to its trip voltage. If switch PB1 is pressed when voltage PHV has not reached the level of the trip voltage (U5A is at logic level "0"), U11B will not activate RL1. However, when voltage PHV reached the level of the trip voltage (U5A is at logic level "1"), Flip-Flop U11A will activate relay RL1.

The typical power consumption of relay RL1 at 24V is 400 milliWatt. Such a design trips relay RL1 with its nominal voltage (24V), and holds it with DC voltage of about 5V. The power dissipation to hold the relay in this example is only 18 milliWatt.

Reference is now made to FIG. 36 and FIG. 37, which show a Bill of Material (BOM) table corresponding to the example embodiments of FIG. 34 and FIG. 35.

Figure 38:
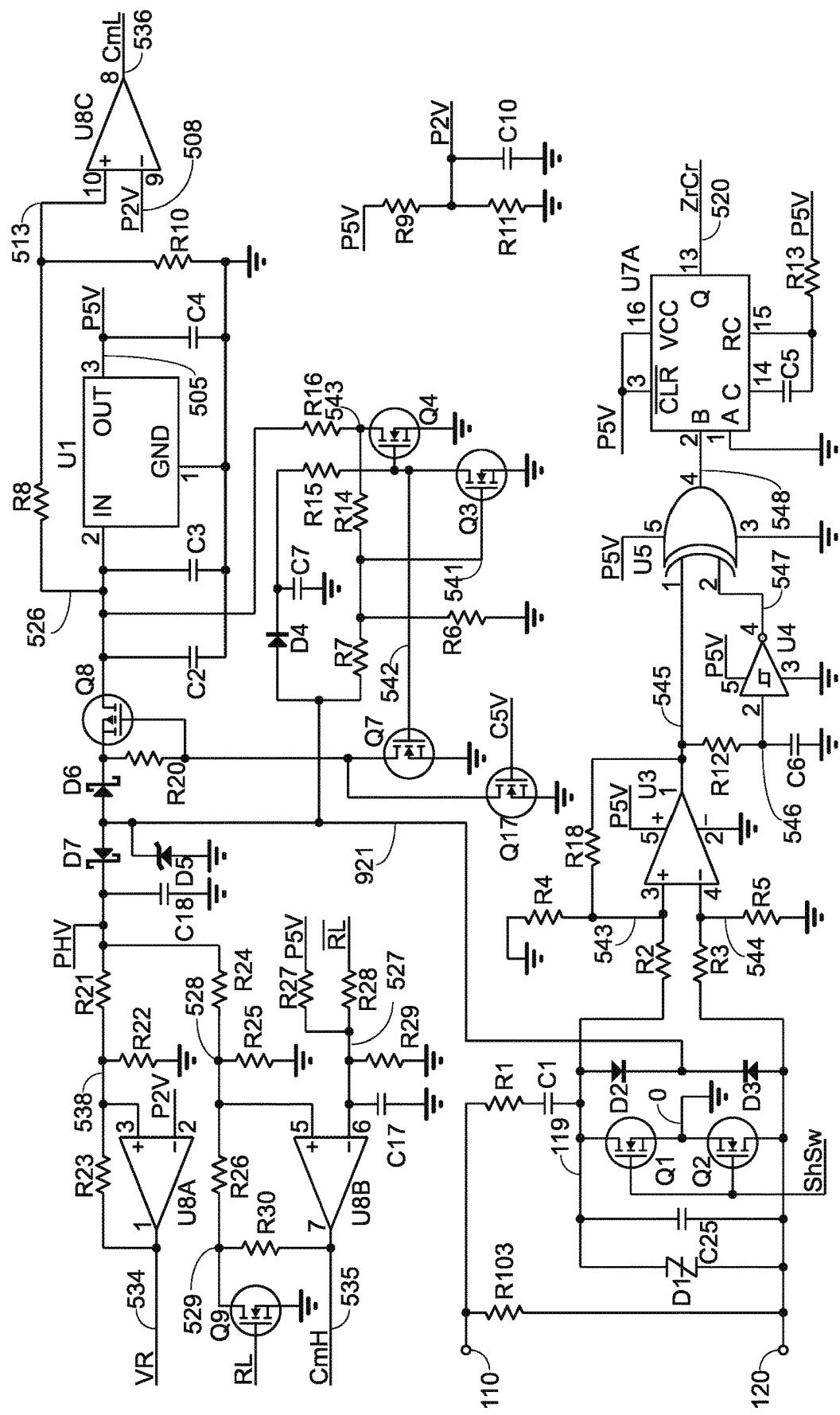
FIG. 38 and FIG. 39 are simplified illustrations of a dual output AC to DC converter according to an example embodiment of the invention.
Figure 39:
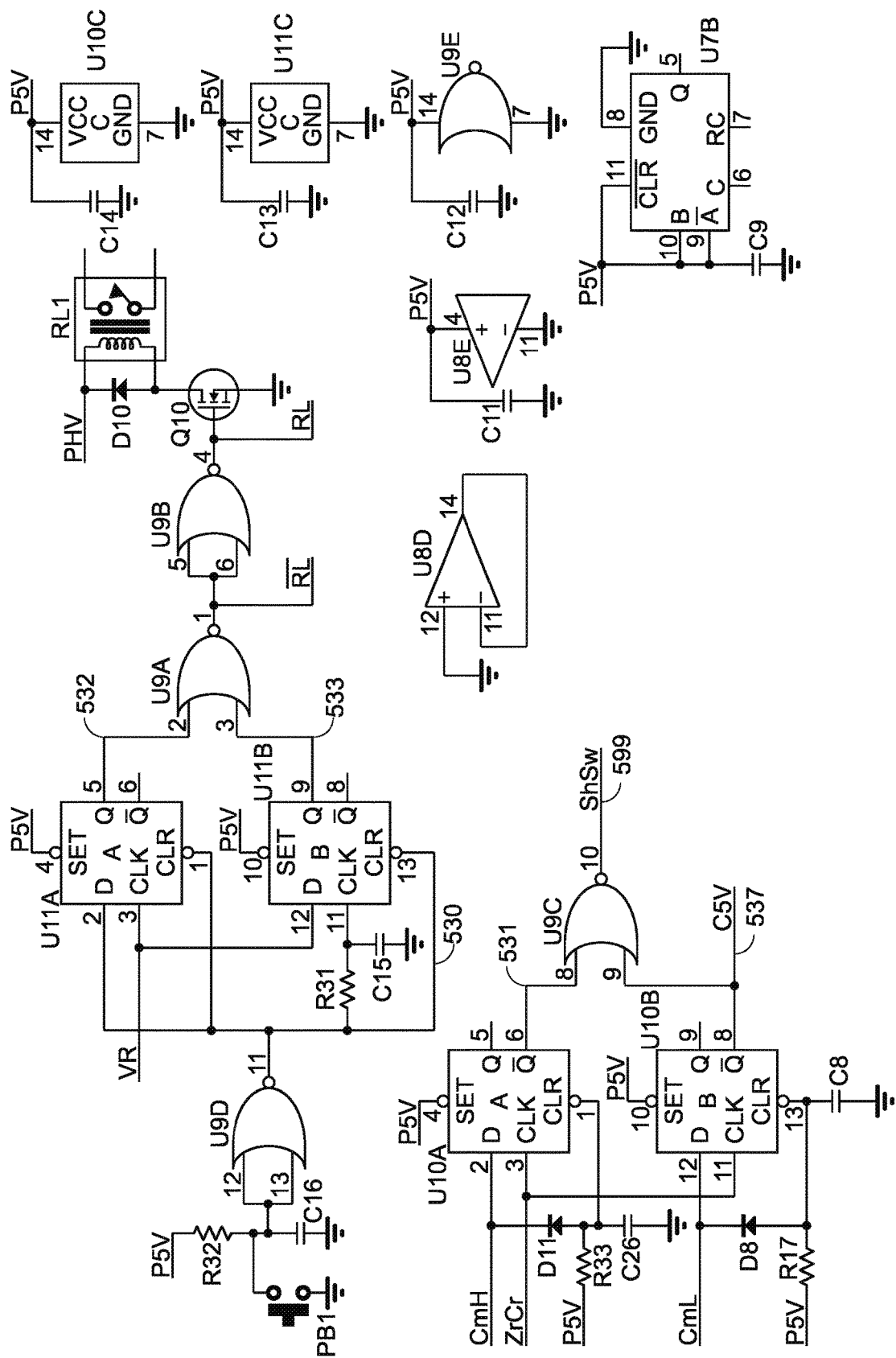

Reference is now made to FIG. 38 and FIG. 39 which are simplified illustrations of a dual output AC to DC converter according to an example embodiment of the invention.

FIG. 38 and FIG. 38 show circuits optionally suitable for driving a relay.

Description of operation of the example embodiment of FIG. 38 and FIG. 39 is similar to the description of FIG. 34 and FIG. 35, where the synchronization circuit includes U10A and U10B, a start-up circuit, and hysteresis of comparator U3 are according to the description of FIG. 18 and FIG. 12B.

Reference is now made to FIG. 40 and FIG. 41, which show a Bill of Material (BOM) table corresponding to the example embodiments of FIG. 38 and FIG. 39.

Figure 42B:
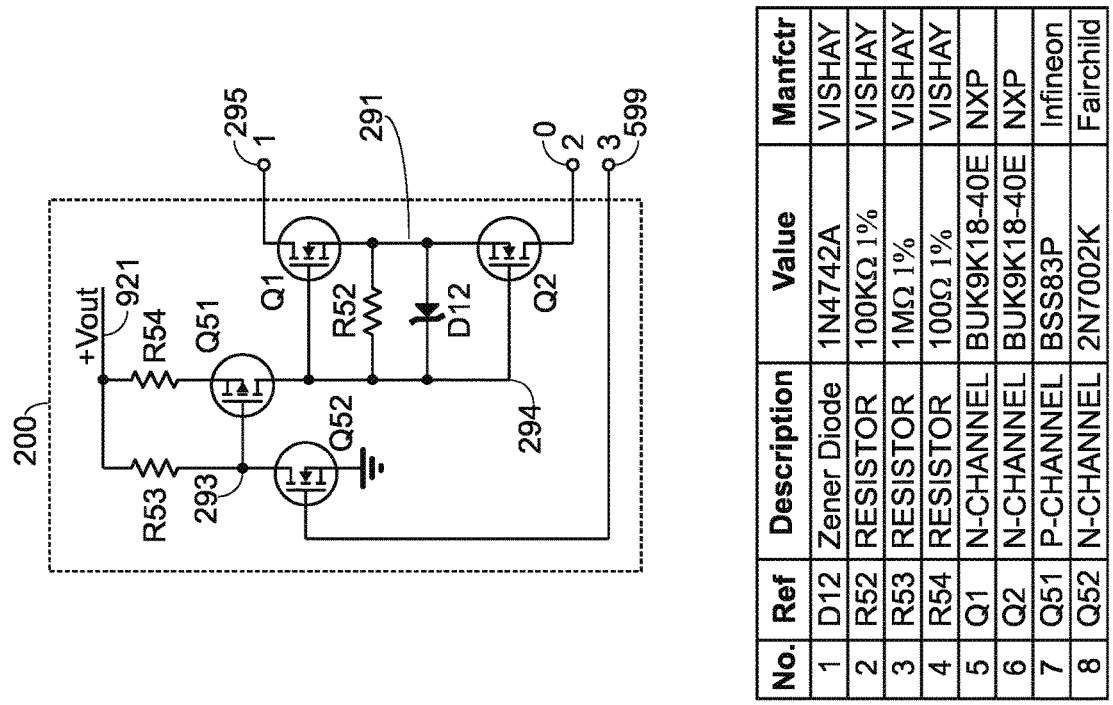
FIG. 42B is a simplified illustration of a controlled AC switch and a Bill of Materials according to an example embodiment of the invention.
Figure 42A:
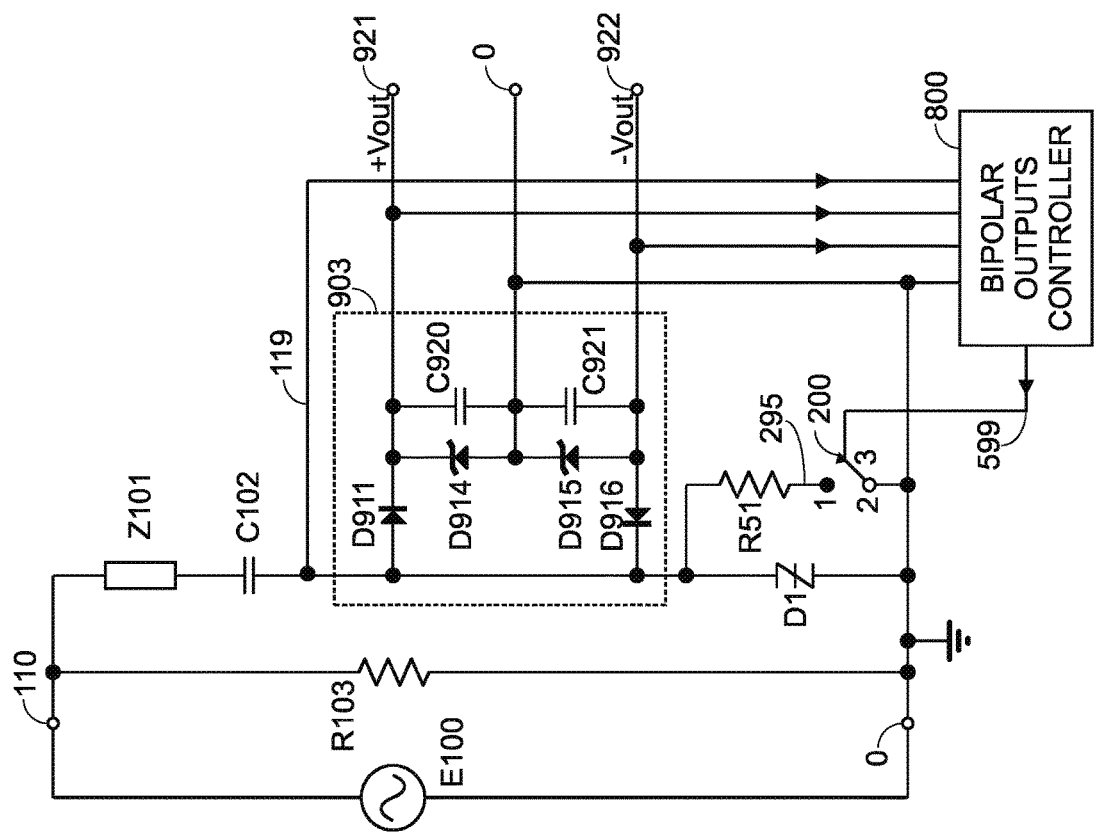
FIG. 42A is a simplified illustration of an AC to DC converter with positive and negative DC outputs according to an example embodiment of the invention.

Reference is now made to FIG. 42A, which is a simplified illustration of an AC to DC converter with positive and negative DC outputs according to an example embodiment of the invention.

FIG. 42A shows a rectifier and a filter 903 in a half wave rectifier configuration with bipolar outputs. Switch 200 can shunt the input of rectifier 903 through resistor R51. The value of R51 is optionally low or very low, which enables sensing rectifier AC input voltage 119 while switch 200 is closed.

In some embodiments, R51 is optionally replaced with an inductor, a capacitor or the internal resistance of a switch 200 (in the case of MOSFET $R_{dson}$). A Bipolar-Output-Controller 800 receives inputs from one or more of positive rectified DC 921, negative DC output 922, rectifier AC input 119 and ground 0. Output 599 of Bipolar-Outputs-Controller 800 controls switch 200, which stabilizes both bipolar outputs.

Reference is now made to FIG. 42B, which is a simplified illustration of a controlled AC switch and a Bill of Materials according to an example embodiment of the invention.

FIG. 42B shows a schematic diagram of a controlled AC switch 200 suitable for use, by way of a non-limiting example, in the circuit of FIG. 42A.

MOSFETs Q1 and Q2 are connected in an AC switch configuration. Logic level "0" at output 599 turns OFF MOSFETs Q52 and Q51. Resistor R52 discharges the gates of Q1 and Q2, so MOSFETs Q51 and Q52 are in OFF state (The Drain to Source diodes of MOSFETs Q1 and Q2 connected back to back).

Logic level "1" at output 599 turns ON MOSFETs Q52 and Q51. On the positive cycle of rectifier AC input voltage 119, MOSFET Q1 is forward biased and the internal diode of MOSFET Q2 is forward biased (MOSFET Q2 is reverse biased), a positive voltage on the gates 294 turns ON both MOSFETs Q1 and Q2. On the negative cycle of rectifier AC input voltage 119, MOSFET Q2 is forward biased and the internal diode of MOSFET Q1 is forward biased (MOSFET Q1 is reverse biased), a positive voltage on gates 294 turns ON both MOSFETs Q1 and Q2. During the ON state (in both cases—Positive and Negative cycles of rectifier AC input voltage 119, the voltage between the sources of the MOSFETs 291 will fall to zero. Diode D12 protects MOSFETs Q1 and Q2 against high gate to source voltages (especially during the negative cycle) and R54 limits the current during the time of the protection.

Figure 43:
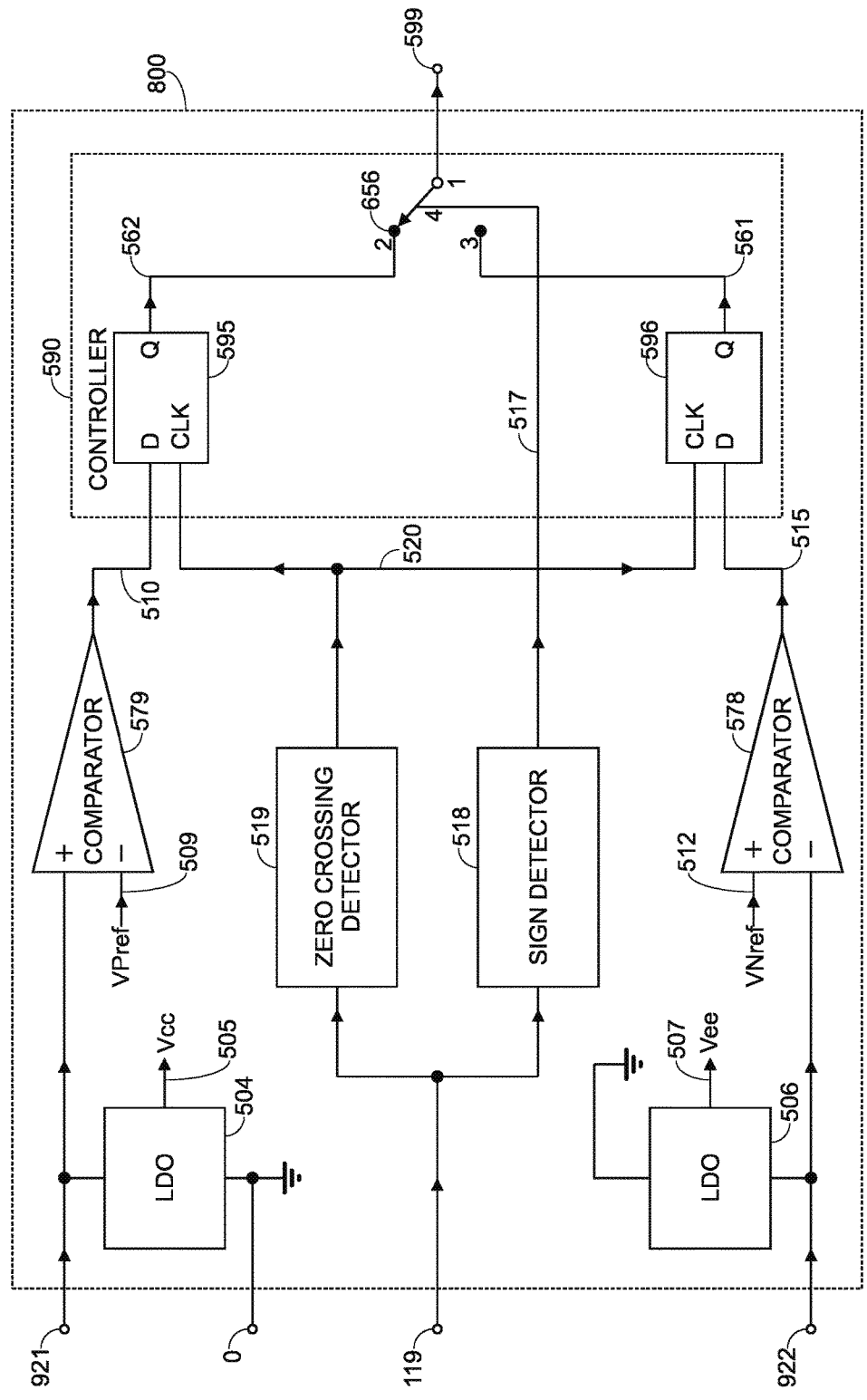
FIG. 43 is a simplified illustration of a bipolar-output controller according to an example embodiment of the invention.

Reference is now made to FIG. 43, which is a simplified illustration of a bipolar-output controller according to an example embodiment of the invention.

FIG. 43 shows a schematic diagram of a bipolar-output controller suitable for use, by way of a non-limiting example, in the circuits of FIG. 8, FIG. 9B, and FIG. 42A.

Each one of the DC outputs (921 and 922 of FIG. 42A) feeds a LDO (504 and 506 of FIG. 43) in order to supply power (505 and 507) to operation of Bipolar-Outputs-Controller 800. A sign-Detector 518 provides at its output a sign of rectifier AC input voltage 119. A Zero-Crossing-Detector 519 operates similarly to the description of FIG. 8. Output 510 of comparator 579 provides true or false signal according to the comparison between rectified DC 921 and positive reference 509. Flip-Flop 595 synchronizes output 510 to the zero crossing events of rectifier AC input 119. Similarly, output 515 of comparator 578 provides true or false signal according to the comparison between rectified. DC 922 and negative reference 509. Flip-Flop 596 synchronizes output 515 to the zero crossing events of rectifier AC input voltage 119. Switch 656, which is controlled by output 517 of Sign-Detector 518, connects terminals 2 and 1 when rectifier AC input voltage 119 is higher than zero and connects terminals 3 and 1 when rectifier AC input voltage 119 is lower than zero. It can be seen that by controlling the timing of switch 200 two output voltages can be adjusted simultaneously.

Figure 44:
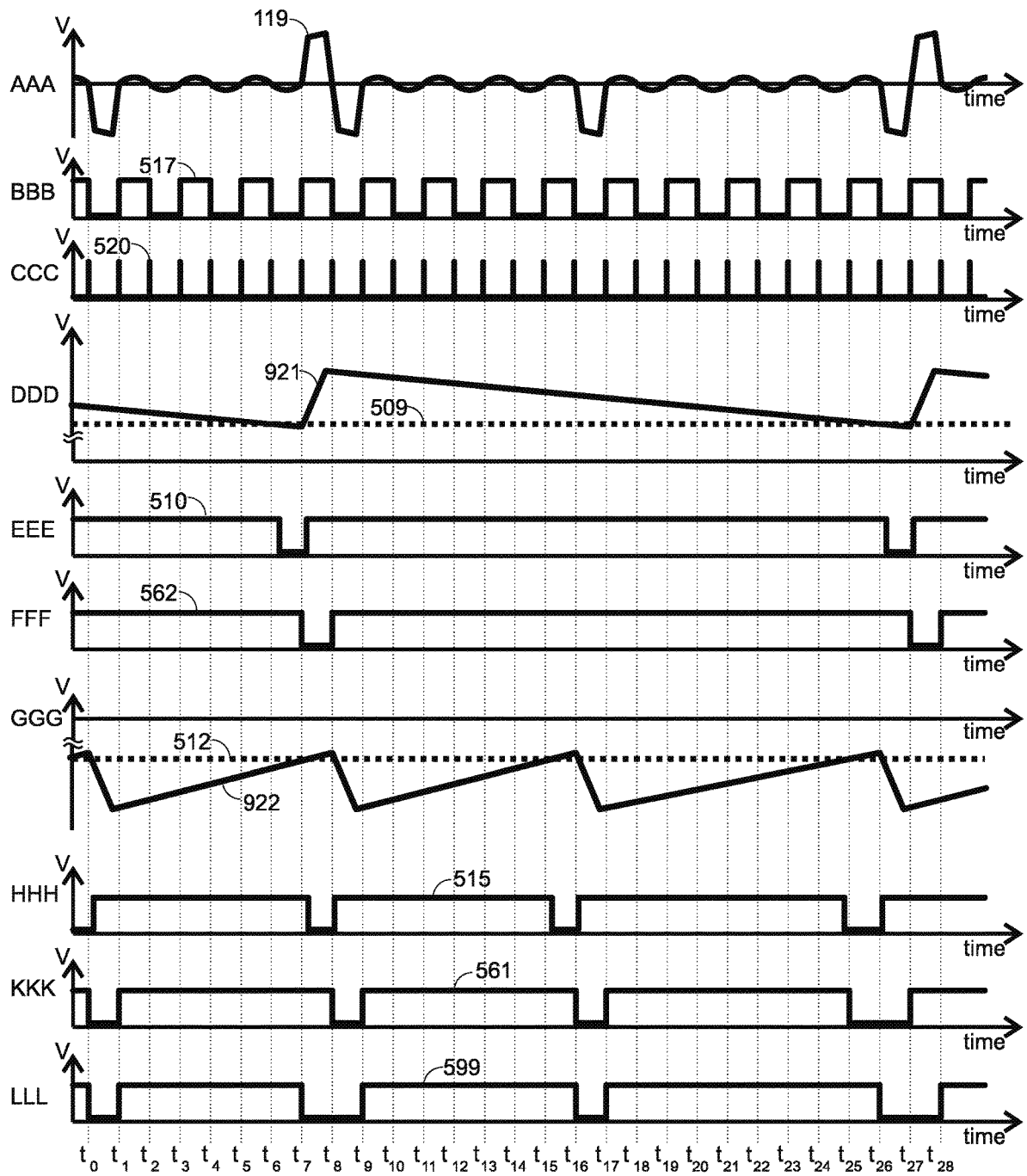
FIG. 44 shows simplified timing diagrams according to an example embodiment of the invention.

Reference is now made to FIG. 44, which shows simplified timing diagrams according to an example embodiment of the invention.

FIG. 44 shows timing diagrams describing operation of circuits such as, by way of a non-limiting example, shown in FIG. 43.

Timing diagram AAA demonstrates rectifier AC input voltage 119. The positive cycles of rectifier AC input voltage 119 charge C920 (between time intervals: $t_7 \div t_8$, $t_{27} \div t_{28}$) and the negative cycles of rectifier AC input voltage 119 charge C921 (between time interval $t_0 \div t_1$, $t_8 \div t_9$, $t_{16} \div t_{17}$, and $t_{26} \div t_{27}$). At other time intervals switch 200 is closed which causes low voltage across R51.

Timing diagram BBB demonstrates output 517, which is the sign of rectifier AC input voltage 119.

Timing diagram CCC demonstrates output 520 of Zero-Crossing-Detector 519 (an indication of the zero crossing of rectifier AC input voltage 119).

Timing diagram DDD demonstrates rectified DC 921 and positive voltage reference 509 (with the dashed line).

Timing diagram EEE demonstrates output 510 of comparator 579.

Timing diagram FFF demonstrates output 562 of Flip-Flop 595. It can be seen that this output is synchronized to the zero crossing events 520 demonstrated on time diagram CCC.

Timing diagram GGG demonstrates negative DC output 922 and negative voltage reference 512.

Timing diagram HHH demonstrates output 515 of comparator 578.

Timing diagram KKK demonstrates output 561 of Flip-Flop 596. It can be seen that this output is synchronized to the zero crossing events 520 demonstrated on time diagram CCC.

Timing diagram LLL demonstrates output 599, which drives a switch such as the switch 200 of FIG. 42A. High level presents closed switch and low level presents open switch.

Figure 45:
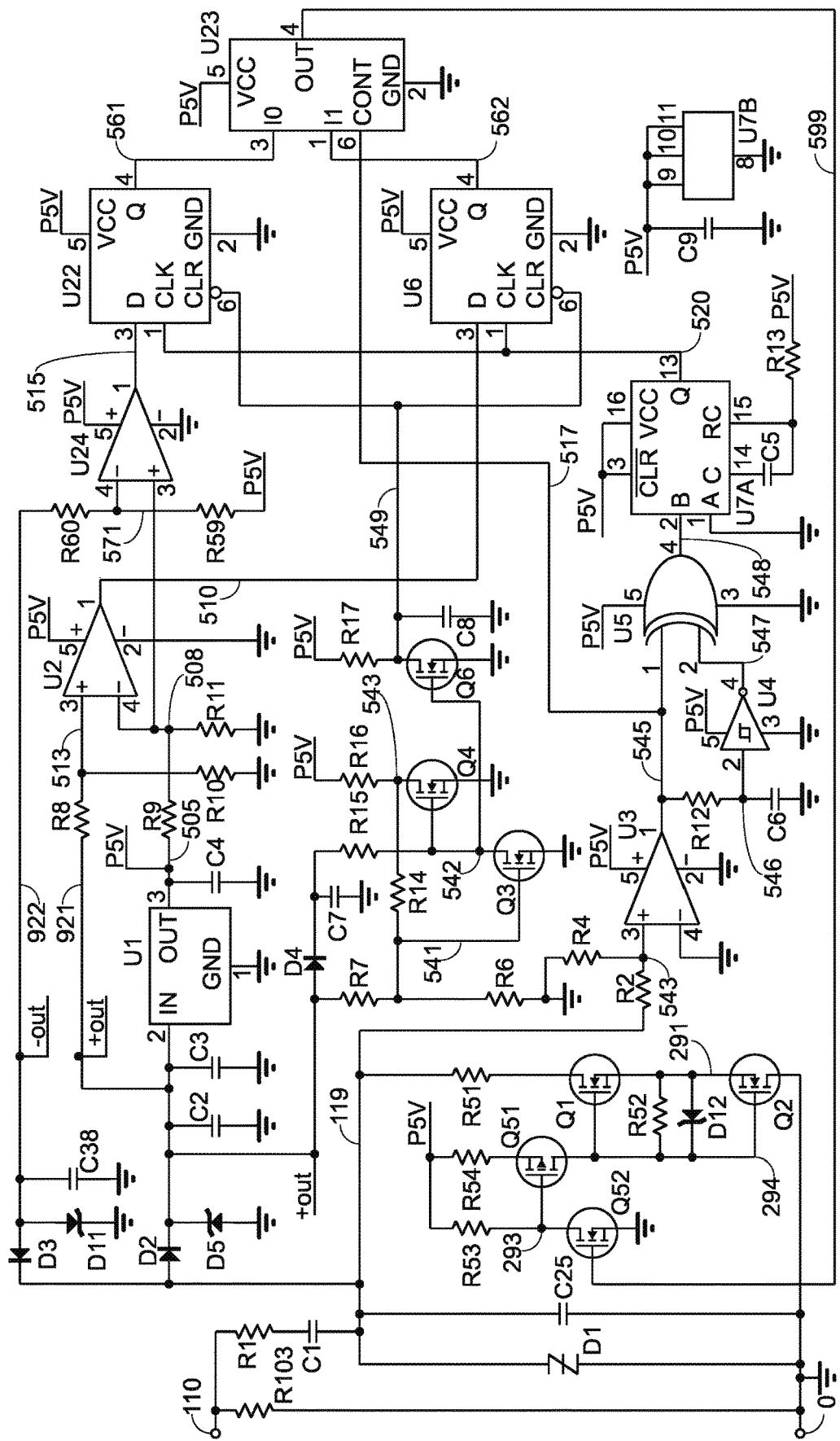
FIG. 45 is a simplified illustration of an AC to DC converter with positive and negative DC outputs according to an example embodiment of the invention.

Reference is now made to FIG. 45, which is a simplified illustration of an AC to DC converter with positive and negative DC outputs according to an example embodiment of the invention.

Operation of the circuit is described similarly to the description of FIG. 42A, where switch 200 of FIG. 42A is implemented similarly to FIG. 42B and includes: Q1, Q2, Q51, Q52, R51, R52, R53, R54 and D12. Control of the positive output voltage is similar to the description of FIG. 15 where the output 562 of Flip-Flop U6 is connected to AC switch control 599 through Multiplexer U23. Rectifier D3 generates negative DC output 922. Zener diode D11 protects negative DC output 922 during start-up and fault condition of the controller. Capacitor C38 filters negative DC output 922. Output 515 of comparator U24 provides logic level "1" when the level of negative DC output 922 is lower than the nominal output voltage. Negative DC output 922 is optionally determined, by way of a non-limiting example, according to the following equation:

$$V_{922} = \frac{5v}{R_{11} + R_9} \cdot \left(R_{11} - R_9 \cdot \frac{R_{59}}{R_{60}}\right) = $$

$$\frac{5v}{2\,M\Omega + 3\,M\Omega} \cdot \left(2\,M\Omega - 3\,M\Omega \cdot \frac{1.4\,M\Omega}{0.604\,M\Omega}\right) = -4.95v$$

Flip-Flop U22 synchronizes U24 output 561 to the zero crossing events 520. The description of Flip-Flops U6 and U22 and Multiplexer U23 is similar to the description of FIG. 43.

Reference is now made to FIG. 46 and FIG. 47, which show a Bill of Material (BOM) table corresponding to the example embodiment of FIG. 45.

Figure 48:
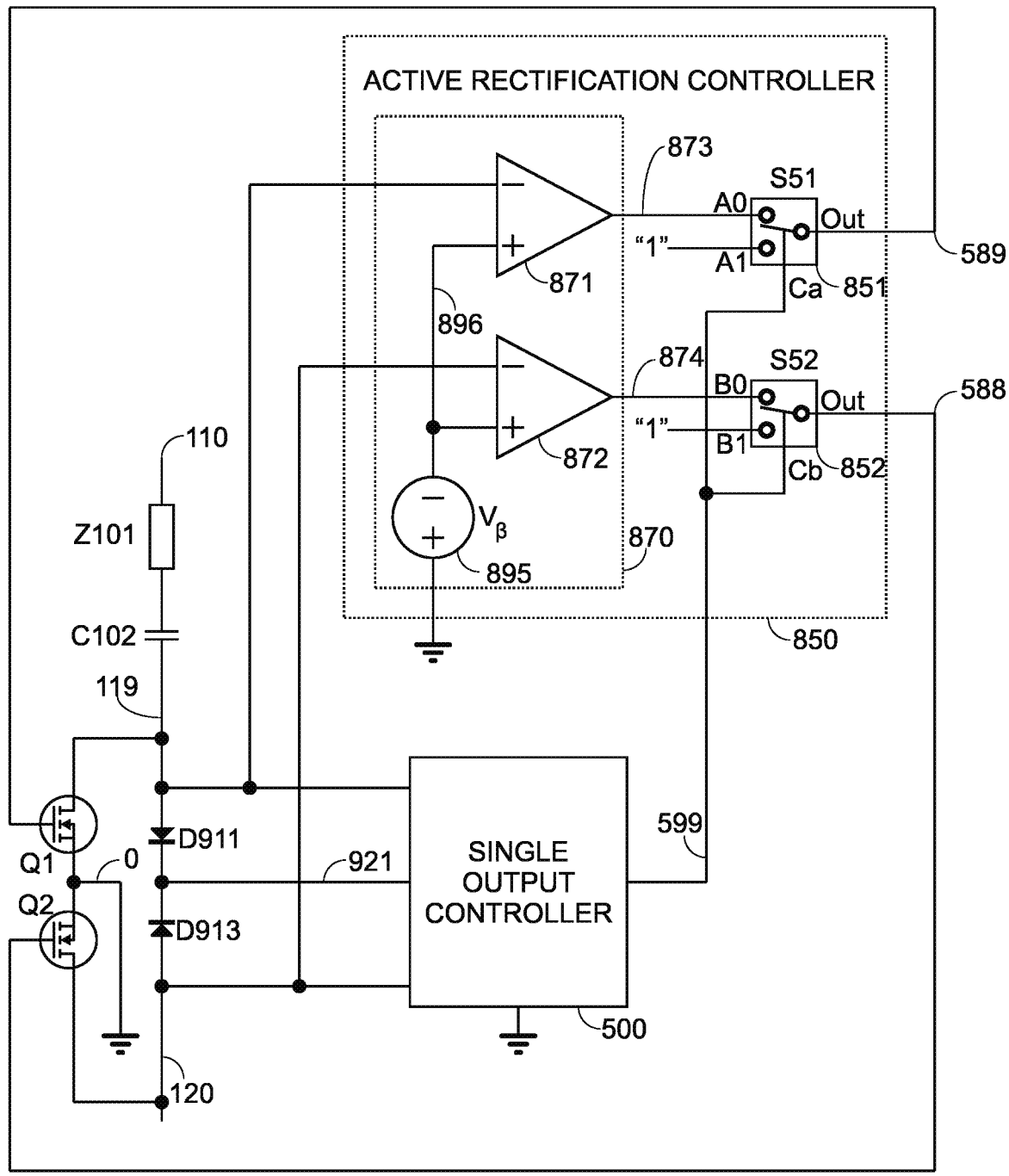
FIG. 48 is a simplified illustration of a dual use Shunt-Switch according to an example embodiment of the invention.

Reference is now made to FIG. 48, which is a simplified illustration of a dual use Shunt-Switch according to an example embodiment of the invention.

FIG. 48 illustrates a dual use Shunt-Switch suitable for use, by way of some non-limiting examples, in the circuits of FIG. 2A, FIG. 7D, FIG. 9A. FIG. 9B, FIG. 12A, and FIG. 12B.

Operation of the circuit of FIG. 48 is described similarly to the description of operation of FIG. 2A. FIG. 12A, and FIG. 12B, where the gates of Q1 and Q2 are separated and an Active-Rectification-Controller (ARC) 850 is added between output 599 and the gates of Q1 and Q2 lines 589 and 588, respectively.

The ARC 850 controls each one of MOSFETs Q1 and Q2 in order to reduce voltage drop across them when they simulate forward bias diode. ARC 850 optionally controls simultaneously both of the MOSFETs when a Shunt-Switch is required. ARC 850 includes error amplifiers 870 and controlled switches 851 and 852. When output 599 is at logic level "1" (indicates that rectified DC 921 is above its rated level), both switches 851 and 852 connect their outputs 589 and 588 to logic level "1", respectively. When output 599 is at logic level "0" (indicates that rectified DC 921 is below its rated level), both switches 851 and 852 connect their outputs 589 and 588 to outputs 873 and 874. Each one of error amplifiers 871 and 872 compares a predetermined value $(-V_\beta)$ to the voltage of rectifier AC inputs 119 and 120, respectively.

When rectifier AC input 119 is higher than $(-V_\beta)$, output 873 of error amplifier 871 is clamped into its negative rail (ground). When rectifier AC input 120 is higher than $(-V_\beta)$ output 874 of error amplifier 872 is clamped into its negative rail (ground).

When rectifier AC input 119 is lower than $(-V_\beta)$ output 873 of error amplifier 871 raises its output until MOSFET Q1 starts to conduct. When rectifier AC input 120 is lower than $(-V_\beta)$ output 874 of error amplifier 872 raises its output until MOSFET Q2 starts to conduct. The conduction of MOSFET Q1 or Q2 reduces the voltage of rectifier AC inputs 119 or 120 to be equal to the value $-V_\beta$, respectively.

Since the substrate of a power MOSFET is connected to its drain, there is an effect of a reverse diode between the drain and the source. When V is higher than the forward voltage of this diode, ARC 850 cannot increase the forward voltage drop of the internal diode of the MOSFETs, and both outputs 589 and 588 will be at ground level. The value of $V_\beta$ should be as low as possible but not less than the product of the maximum current through the MOSFET and $R_{dson}$.

Figure 49B:
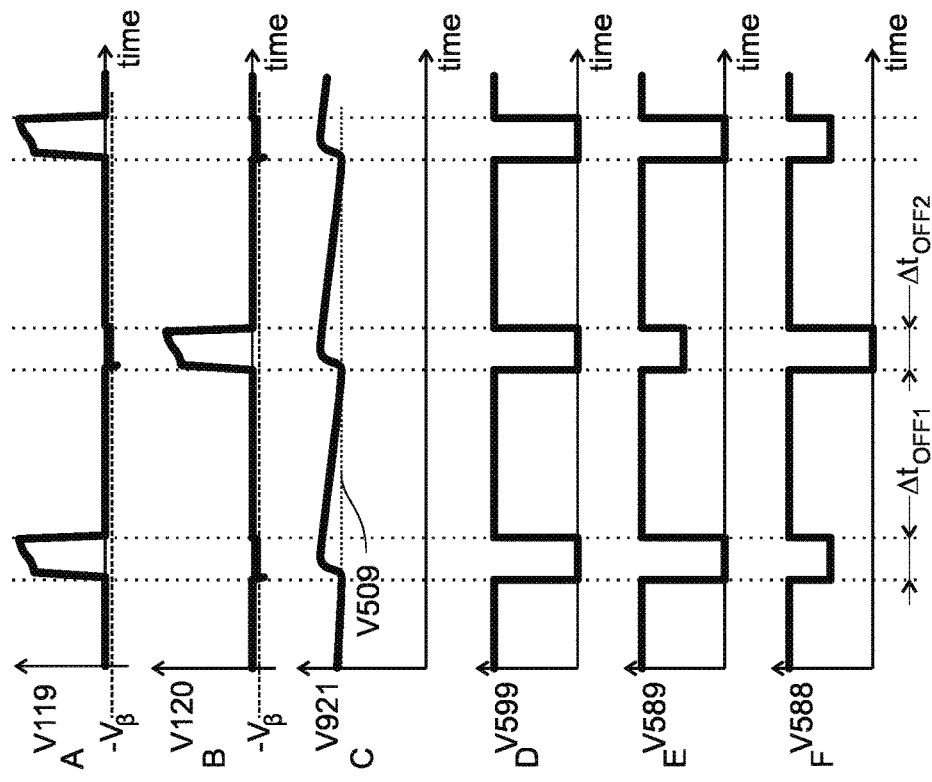
FIG. 49B shows simplified timing diagrams according to an example embodiment of the invention.
Figure 49A:
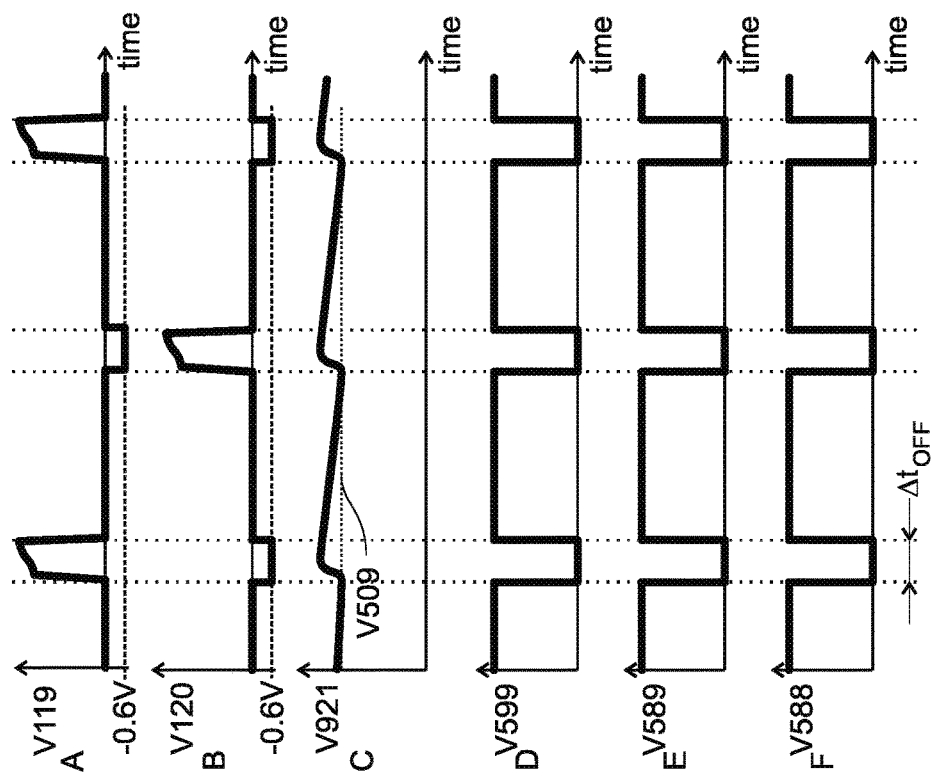
FIG. 49A shows simplified timing diagrams according to an example embodiment of the invention.

Reference is now made to FIG. 49A, which shows simplified timing diagrams according to an example embodiment of the invention.

FIG. 49A shows timing diagrams describing a case where $V_\beta$ is higher than the forward voltage drop across the internal diode of MOSFETs Q1 or Q2. Usually, at low currents, the forward voltage drop of a silicone diode is in the range of 0.6V.

Timing diagram A and timing diagram B demonstrate the voltage of rectifier AC inputs 119 and 120, respectively.

Timing diagram C demonstrates rectified DC 921 and reference voltage 509.

Timing diagram D demonstrates output 599 of Single-Output-Controller 500 and timing diagram E and F demonstrate outputs 589 and 588 of Active-Rectification-Controller (ARC) 850, which drive the gates of MOSFETs Q1 and Q2, respectively.

When rectified DC 921 of timing diagram C falls below reference voltage 509, output 599 falls to logic level "0". On the first zero crossing event of the voltage between rectifier AC inputs 119 and 120 while output 510 of comparator U2 is at logic level "1", output 599 return to logic level "1".

Since $V_\beta$ is higher than 0.6V, it can be seen on timing diagram E and F, that both outputs 589 and 599 of ARC 850 follow output 599. Timing diagram A and B demonstrate that during $\Delta t_{OFF}$, the voltage level of rectifier AC inputs 119 or V120 is in the range of −0.6V.

Reference is now made to FIG. 49B, which shows simplified timing diagrams according to an example embodiment of the invention.

FIG. 49B shows timing diagrams corresponding to the example embodiment of FIG. 48.

FIG. 49B shows timing diagrams describing a case where $V_\beta$ is much lower than the forward voltage drop across the internal diode of MOSFETs Q1 or Q2. Usually, at low currents, the forward voltage drop of a silicone diode is in the range of 0.6V.

Timing diagram A and timing diagram B demonstrate the voltage of rectifier AC inputs 119 and 120.

Timing diagram C demonstrates rectified DC 921 and reference voltage 509.

Timing diagram D demonstrates output 599 of Single-Output-Controller 500 and timing diagram E and F demonstrate outputs 589 and 588 of Active-Rectification-Controller (ARC) 850, which drives the gates of MOSFETs Q1 and Q2, respectively.

When rectified DC 921 of timing diagram C falls below the level of reference voltage 509, output 599 of Single-Output-Controller 500 falls to logic level "0". On the first zero crossing event of the voltage between rectifier AC inputs 119 and 120, while output 510 of comparator U2 is at logic level "1", output 599 return to logic level "1". Timing diagrams E and F demonstrate that during $\Delta t_{OFF2}$, the error amplifiers of ARC 850 provide 0V on output 589 (timing diagram F) and at the same time provide some positive value on output 588 (timing diagram F). During $\Delta t_{OFF2}$, the error amplifiers of ARC 850 provide some positive value on output 589 (timing diagram E) and provide 0V on output 588 (timing diagram F). Timing diagram A and B demonstrate that during times $\Delta t_{OFF1}$ and $\Delta t_{OFF2}$, the negative values of the voltage of rectifier AC inputs 119 and 120 are bounded by $(-V_\beta)$.

Figure 50:
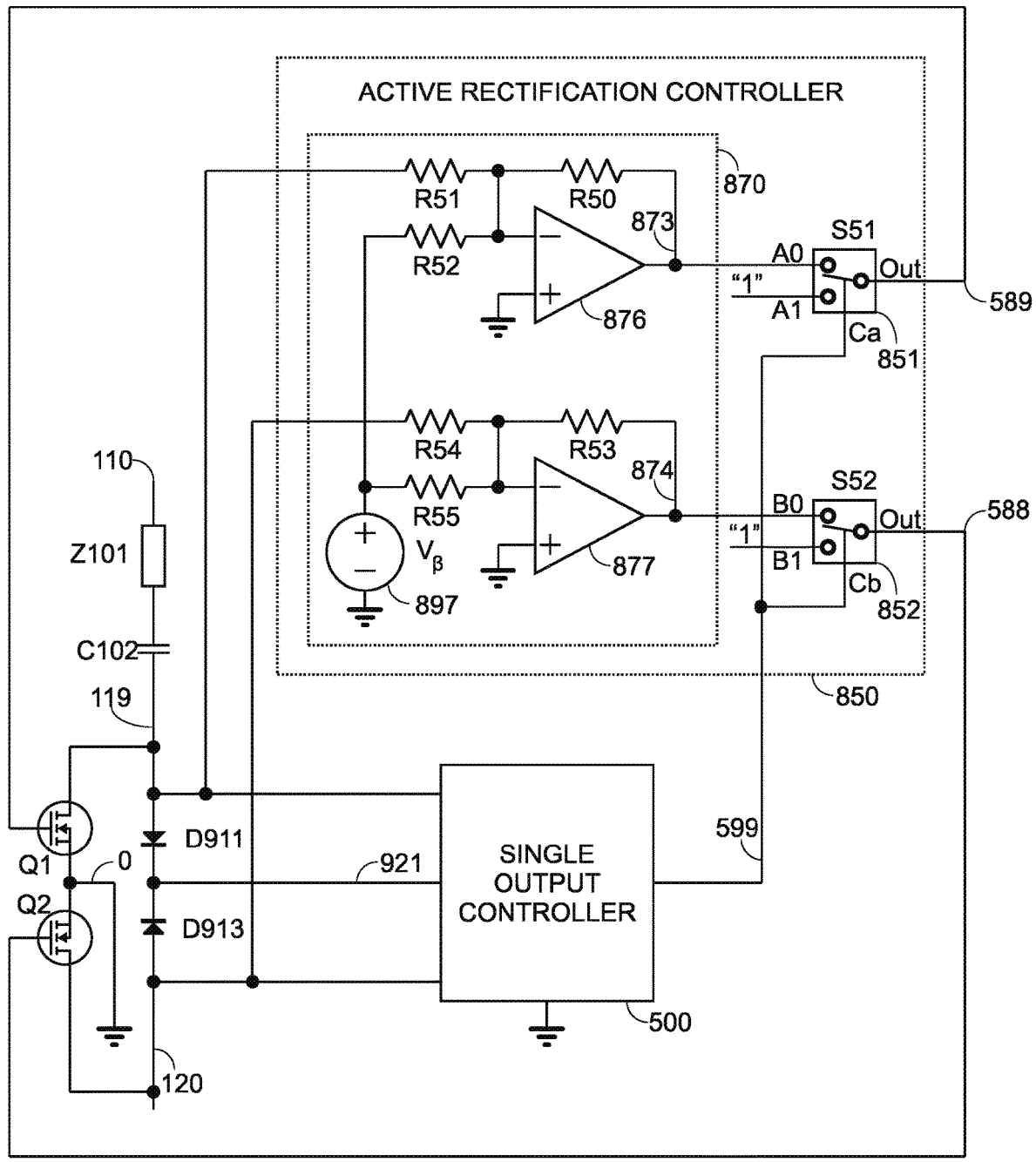
FIG. 50 is a simplified illustration of an example embodiment of the invention.

Reference is now made to FIG. 50, which is a simplified illustration of an example embodiment of the invention.

FIG. 50 shows a circuit similar to the circuit of FIG. 48, and operation of the circuit of FIG. 50 is described similarly to the description of operation of FIG. 48, where the implementation of apparatus 870 is replaced with a different approach. Operational amplifiers 876 and 877 are rail to rail and operated with single supply of 5V (their output voltages can swing between 0V and 5V). Output voltages 873 and 874 of operational amplifier 876 and 877 are determined by:

$$V_{873} = -\left(\frac{R_{50}}{R_{51}} \cdot V_{119} + \frac{R_{50}}{R_{52}} \cdot V_\beta\right); 0 \leq V_{873} \leq 5v$$

$$V_{874} = -\left(\frac{R_{53}}{R_{54}} \cdot V_{120} + \frac{R_{53}}{R_{55}} \cdot V_\beta\right); 0 \leq V_{874} \leq 5v$$

Assuming:

$$R_{50} = R_{53}; R_{51} = R_{52} = R_{54} = R_{55};$$

$$1 \ll \frac{R_{50}}{R_{51}} \equiv h$$

-continued $$V_{873} = -h \cdot (V_{119} + V_\beta); V_{874} = -h \cdot (V_{120} + V_\beta) \xrightarrow[h \to \infty]{} V_{119} = V_{120} = -V_\beta$$

The function of this design is similar to the block diagram presented by apparatus 870 of FIG. 43. However, apparatus 870 of FIG. 50 does not require for its operation a supply of negative voltage and is much simpler.

Figure 51:
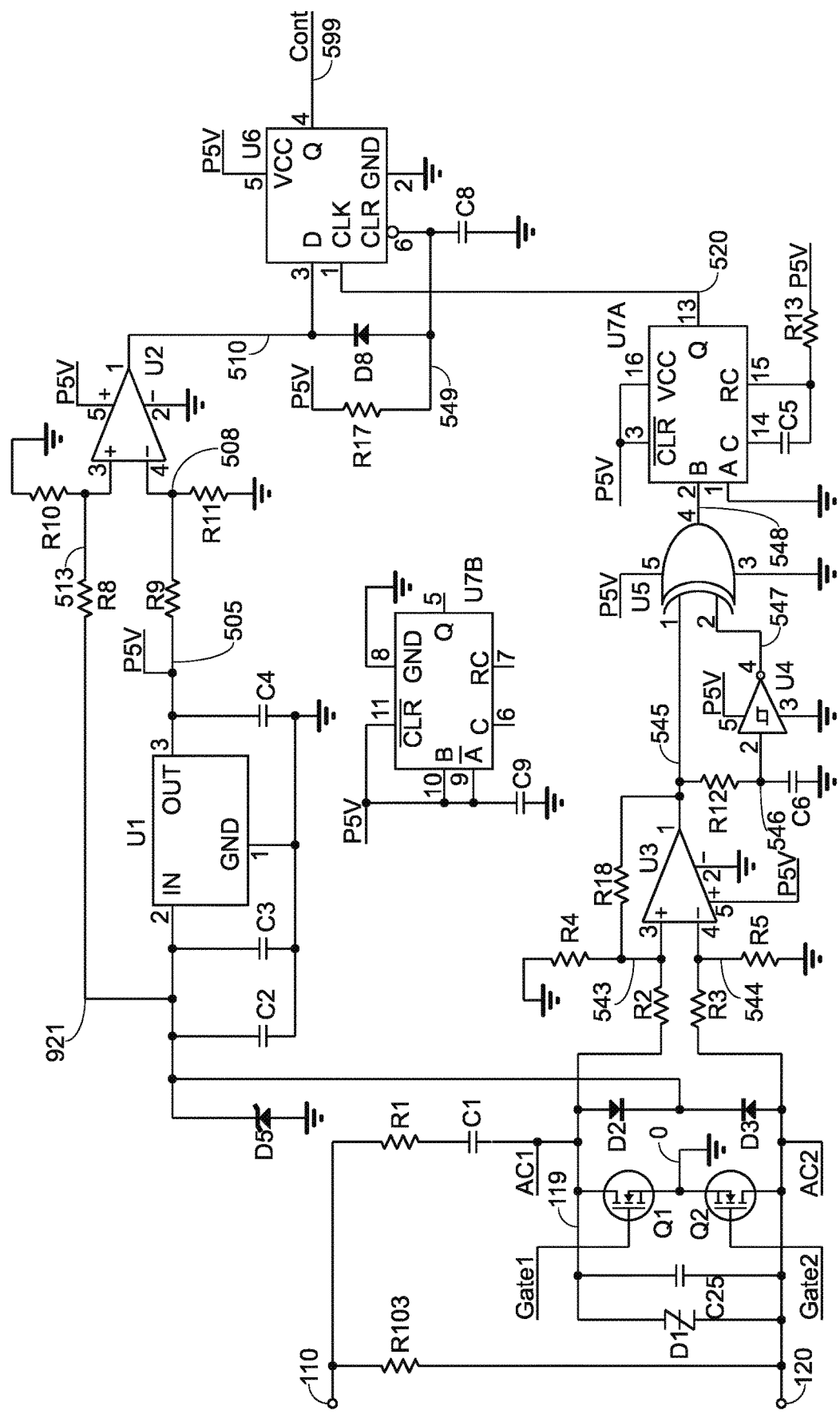
FIG. 51 and FIG. 52 are simplified illustrations of example embodiments of the invention.
Figure 52:
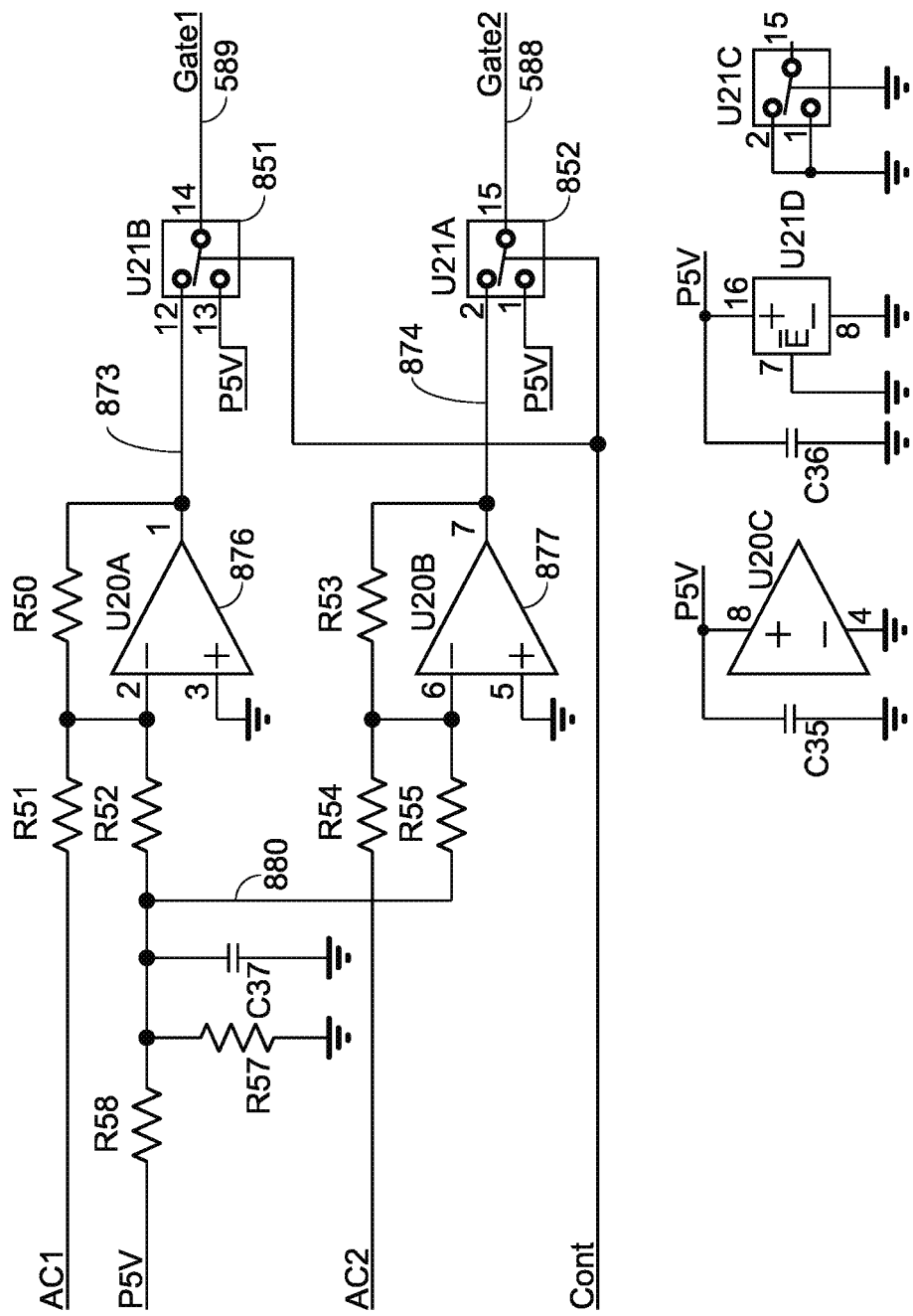

Reference is now made to FIG. 51 and FIG. 52, which are simplified illustrations of example embodiments of the invention.

The description of FIG. 51 is similar to the description of FIG. 18, where an Active-Rectification-Controller (ARC) such as, by way of a non-limiting example ARC 850 of FIG. 52, is connected between output 599 and lines 589, 588. The voltage drop across MOSFETs Q1 or Q2 during their "diode" operation is determined by:

$$R_{50} = R_{53} = 20 \text{ M}\Omega; R_{51} = R_{52} = R_{54} = R_{55} = 1 \text{ M}\Omega;$$

$$V_\beta = 5v \cdot \frac{R_{57}}{R_{57} + R_{58}} = 5v \cdot \frac{0.1 \text{ M}\Omega}{10 \text{ M}\Omega + 0.1 \text{ M}\Omega} \approx 50 \text{ mV}$$

$$V_\beta = 50 \text{ mV} = -V_{119} = -V_{120}$$

Reference is now made to FIG. 53 and FIG. 54, which show a Bill of Material (BOM) table corresponding to the example embodiments of FIG. 51 and FIG. 52.

Figure 55:
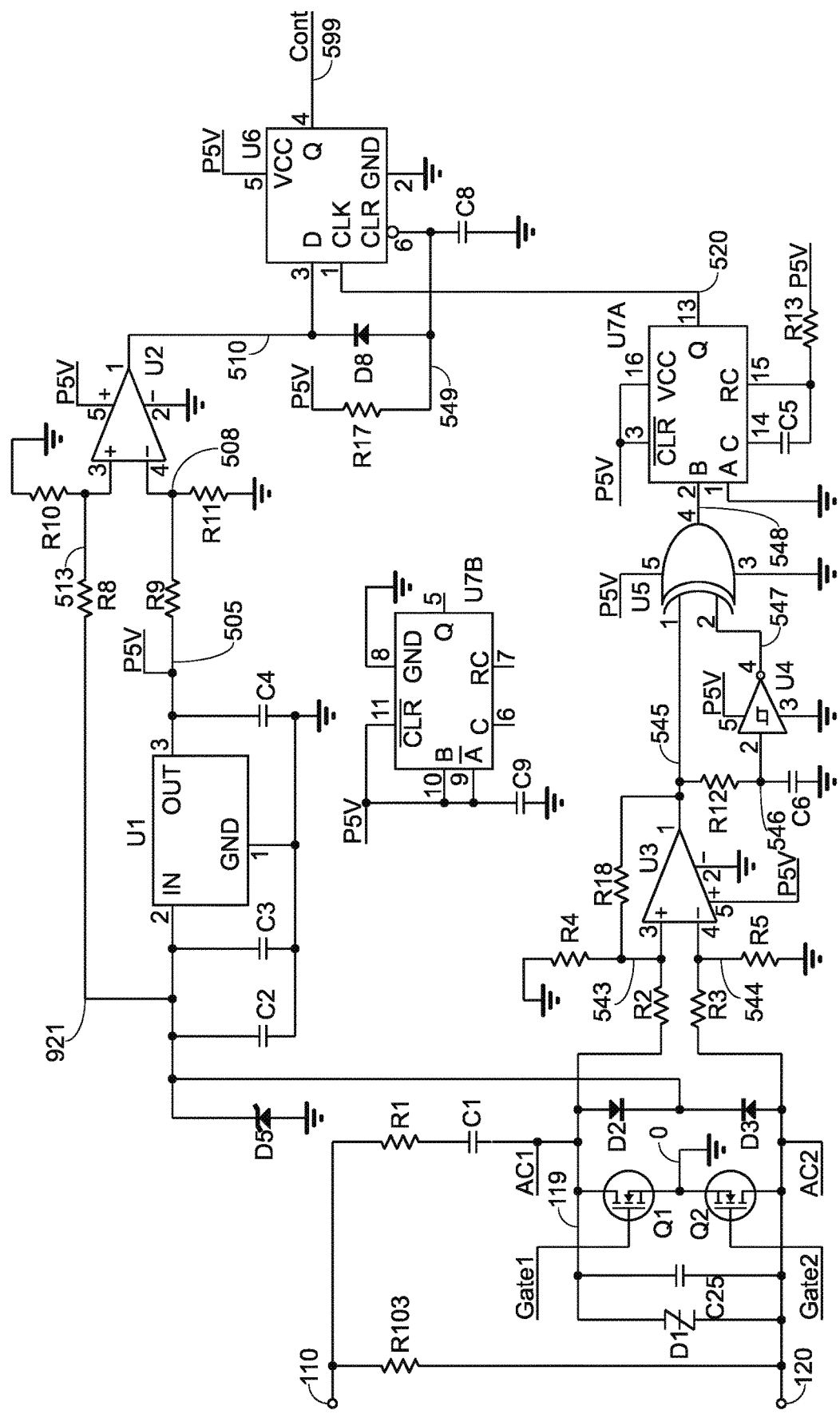
FIG. 55 and FIG. 56 are simplified illustrations of example embodiments of the invention.
Figure 56:
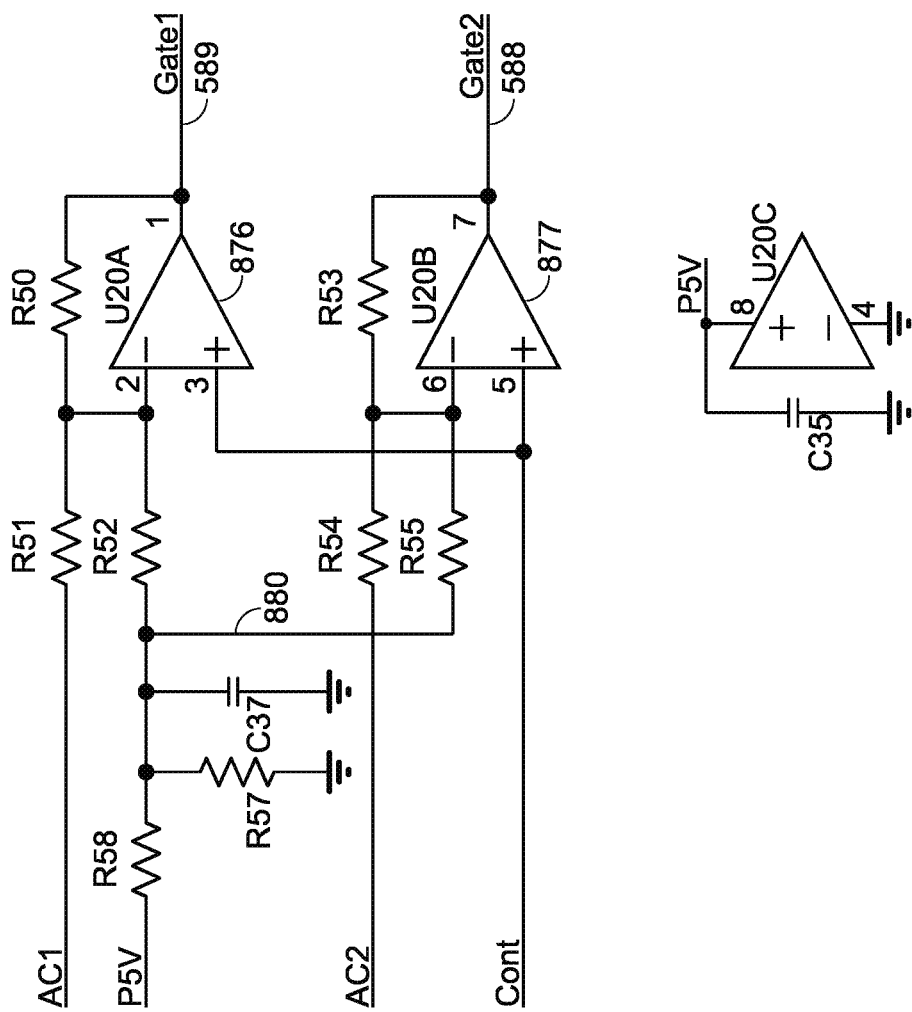

Reference is now made to FIG. 55 and FIG. 56, which are simplified illustrations of example embodiments of the invention.

The description of FIG. 55 is similar to the description of FIG. 51, and the description of FIG. 56 is similar to the description of FIG. 56, where both Flip-Flops (U21A and U21B) are removed and the positive input of operational amplifiers U20A and U20B are connected directly to line 599.

The circuit of FIG. 56 is similar to the circuit of FIG. 52, however, bandwidth requirements of operational amplifiers U20A and U20B are much higher, and the operational amplifiers consume more power.

Reference is now made to FIG. 57 and FIG. 58, which show a Bill of Material (BOM) table corresponding to the example embodiments of FIG. 55 and FIG. 56.

Figure 59:
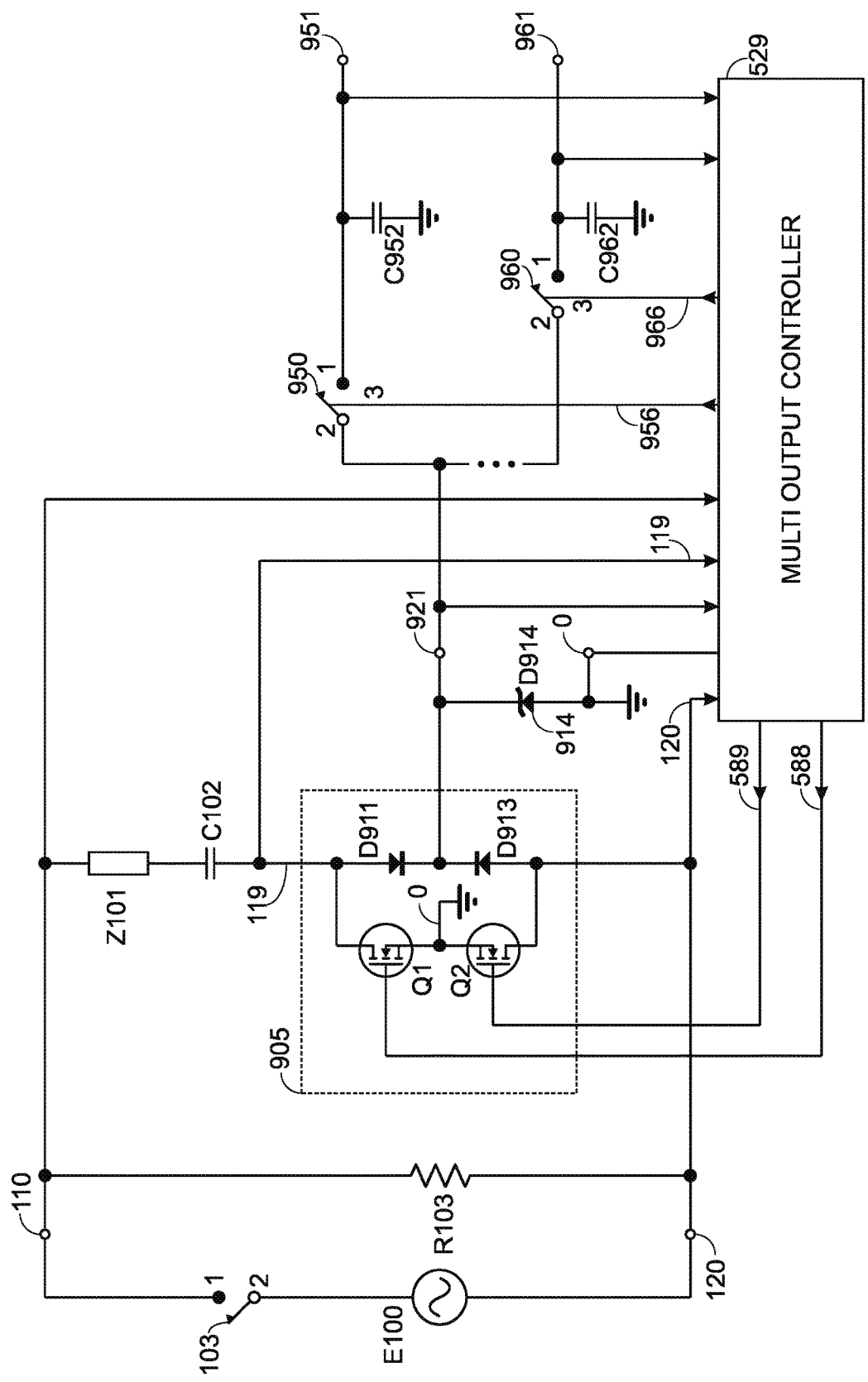
FIG. 59 is a simplified illustration of a multi-output AC to DC converter according to an example embodiment of the invention.

Reference is now made to FIG. 59, which is a simplified illustration of a multi-output AC to DC converter according to an example embodiment of the invention.

The description of FIG. 59 is similar to the description of FIG. 29, where an additional input 110 was added and outputs 588, 589 replace output 599 of FIG. 29. Outputs 588, 589 drive MOSFETs Q1 and Q2 similarly to the description of FIG. 48. MOSFETs Q1 and Q2 replace switch 200 and two diodes 910 and 912 of FIG. 29 and its operation is similar to the description of FIG. 7D. Inputs 110, 119 or 120 are fed to Multi-Output-Controller 529 in order to generate digital synchronization signals similarly to the description of FIG. 4B and FIG. 4C. The digital synchronization compensates (pre-triggering) the effect of the propagation delay caused by the drivers and MOSFETs Q1 and Q2. This compensation enables to optionally switch MOSFETs Q1 and Q2 simultaneously with the zero crossing of the signal between 119 and 120.

Figure 60:
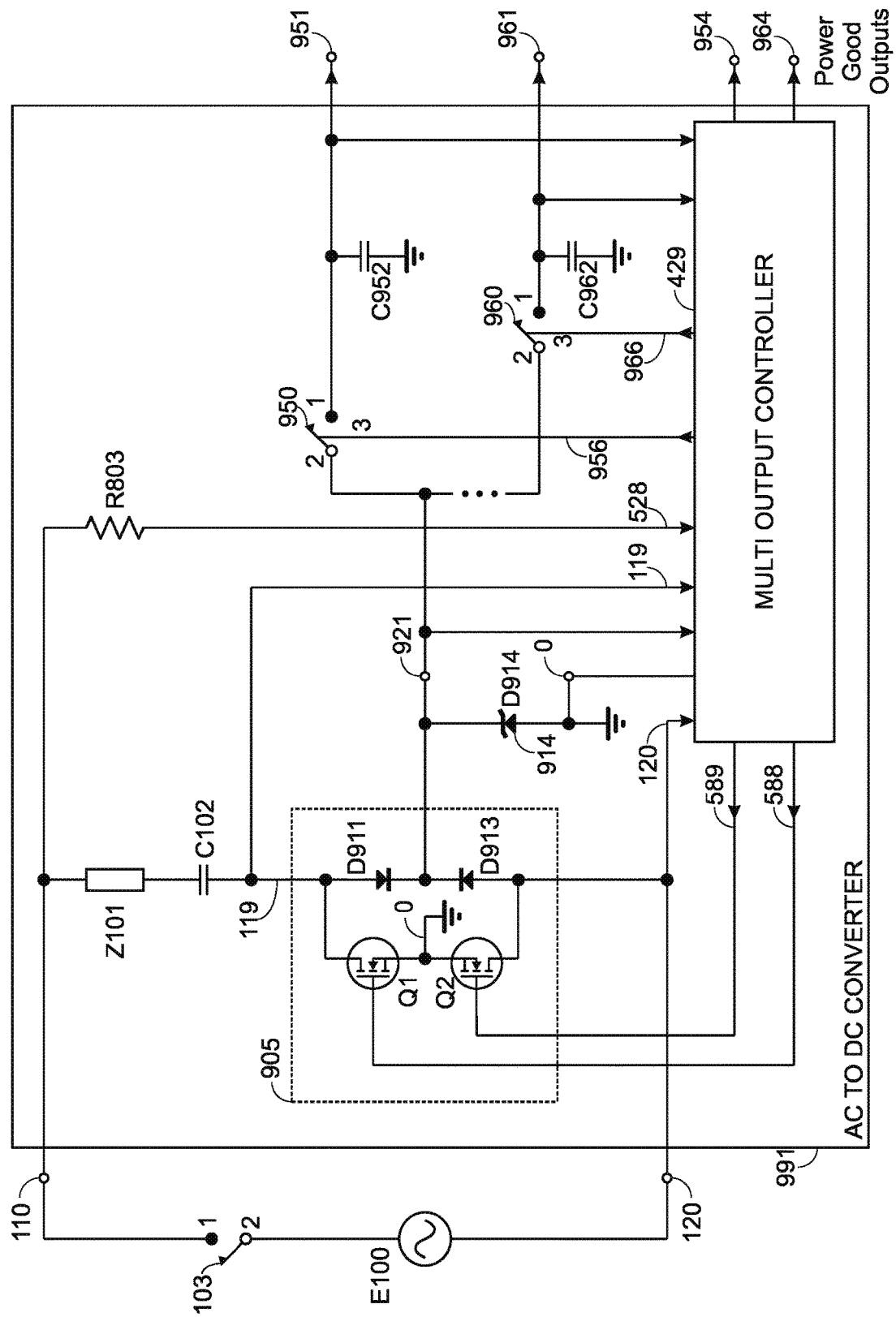
FIG. 60 is a simplified illustration of a multi-output AC to DC converter according to an example embodiment of the invention.

Reference is now made to FIG. 60, which is a simplified illustration of a multi-output AC to DC converter according to an example embodiment of the invention.

The description of FIG. 60 is similar to the description of FIG. 59, where Multi-Output-Controller 529 was replaced with a Multi-Output-Controller 429 of FIG. 60, R103 was removed, R803 was added between terminal 110 and AC input 528 of Multi-Output-Controller 429 and two Power-Good outputs 954 and 964 were added. Description of the Multi-Output-Controller 429 is similar to the description of Multi-Output-Controller 529, where AC input 528 collects the power line signal from terminal 110 through resistor 803. Resistor R803 does not cause any effect on the sampled signal. However, when switch 103 is turned into OFF position, R803 operates as a "bleeder" resistor and discharges capacitor C102. AC input 528 of Multi-Output-Controller 429 includes an active switch technique such as, by way of a non-limiting example, described with reference to FIG. 21A and FIG. 21B wherein resistor R803 of FIG. 60 operates similarly to R24 of FIG. 21A or FIG. 21B. Power-Good output 954 or 964 indicate when output level 951 or 961, respectively, does not require a correction (the output level is "good"). The Power-Good signal can be taken from signals such as listed below:

Signal 510 of FIG. 8, FIG. 9A, FIG. 9B, FIG. 12A, FIG. 12B, FIG. 15, FIG. 18 or FIG. 25;
signal XA at the output of comparator 54A of FIG. 31A;
signal 535 at the output of comparator U8B of FIG. 34 or FIG. 38 is a Power-Good output of the relay RL1 of FIG. 35 or FIG. 39 respectively, and signal 536 at the output of comparator U8C is the Power-Good output of the 5V output;
signal 510 or signal 515 of the positive or negative output of FIG. 43 and FIG. 45, respectively; and
signal 510 at the output of comparator U2 of FIG. 51.

Figure 61B:
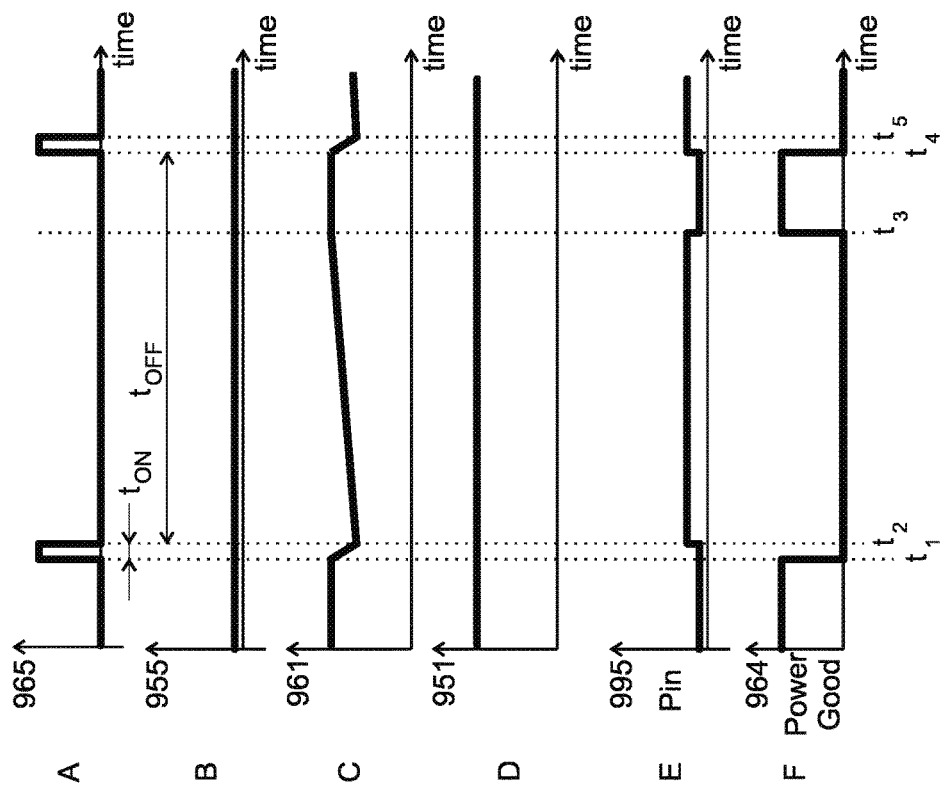
FIG. 61B shows simplified timing diagrams according to an example embodiment of the invention.
Figure 61A:
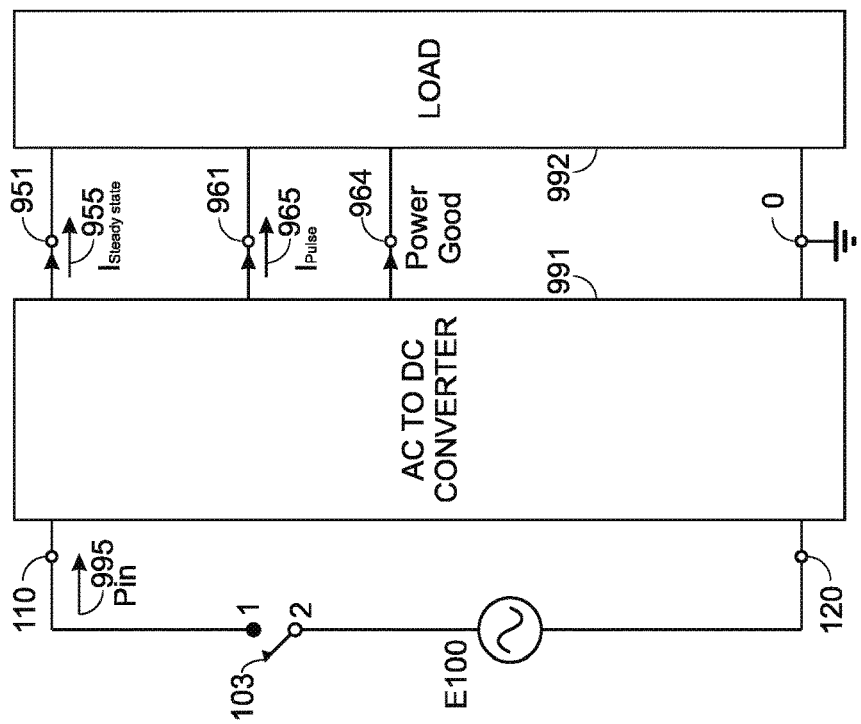
FIG. 61A is a simplified illustration of a load connected to a Multi-Output AC to DC converter according to an example embodiment of the invention.

Reference is now made to FIG. 61A which is a simplified illustration of a load connected to a Multi-Output AC to DC converter according to an example embodiment of the invention.

By way of a non-limiting example, FIG. 61A shows an AC to DC converter 991 similar to the AC to DC converter 991 of FIG. 60. A Load 992 in FIG. 61A is characterized with two supply chains. A first supply chains is shown by line 951, which optionally draws a continuous low current 955 from AC to DC converter 991. A second supply chains is shown by line 961 which optionally draws a high peak current with a low or very low duty cycle. An Internet of Thing (IoT) device is a good example of such a load. The output voltage levels of 951 and 961 can be of equal or different voltage levels.

Reference is now made to FIG. 61B, which shows simplified timing diagrams according to an example embodiment of the invention.

FIG. 61B shows timing diagrams corresponding to the example embodiment of FIG. 61A. Timing diagram A describes current characteristics of pulse current 965. In the case of IoT device the ratio $T_{OFF}/T_{ON}$ can be greater than 100 and the level of a current pulse can be much higher than the $T_{OFF}$ current.

Timing diagram B describes current 955 characteristics at a low constant level (steady state). For example the current consumption of an IoT device during steady state ("sleep mode") can be in the range of few mA down to several μA.

Timing diagram C describes output voltage 961 and demonstrates that during the current pulses (between $t_1 \div t_2$ and $R_4 \div t_5$) of load 992, output capacitor C962 of FIG. 60 is discharged and during the OFF time of load 992, output capacitor C962 charges (between $t_2 \div t_3$). Since at $t_3$ output voltage 961 reached its desired level, the charge of capacitor C962 is stopped (between $t_3 \div t_4$).

Timing diagram D describes output voltage 951 and it demonstrates that the output voltage level is constant.

Timing diagram E describes the power consumption 995 by AC to DC converter 991. It is demonstrated that the peak of the current pulse 965 (proportional to the power) is dumped. The reason for that is that capacitor C962 of FIG. 60 provides the peak current ($t_1 \div t_2$) and during the OFF time ($t_2 \div t_3$) the output capacitor is charged again. For a load with similar characteristic to IoT device, the OFF time is much longer than the ON time. The peak of the current pulse can be much higher than the $T_{OFF}$ current in order to reach "almost" constant input power 995.

Timing diagram F describes Power-Good output 964. It is demonstrated that when the current pulse starts at $t_1$ and until capacitor C962 of FIG. 60 is charged again, Power-Good output 964 indicates to load 992 that output voltage at 961 is too low to start another current pulse.

Traditional design requires selecting the AC to DC converter according to the highest power demanded by the load where the new invention technology enables selecting the AC to DC converter according to a power level slightly high than the steady state power. In the case of loads with similar characteristic to IoT devices, the AC to DC power can be in the range of milliWatts compare to watts in the traditional designs.

Figure 62:
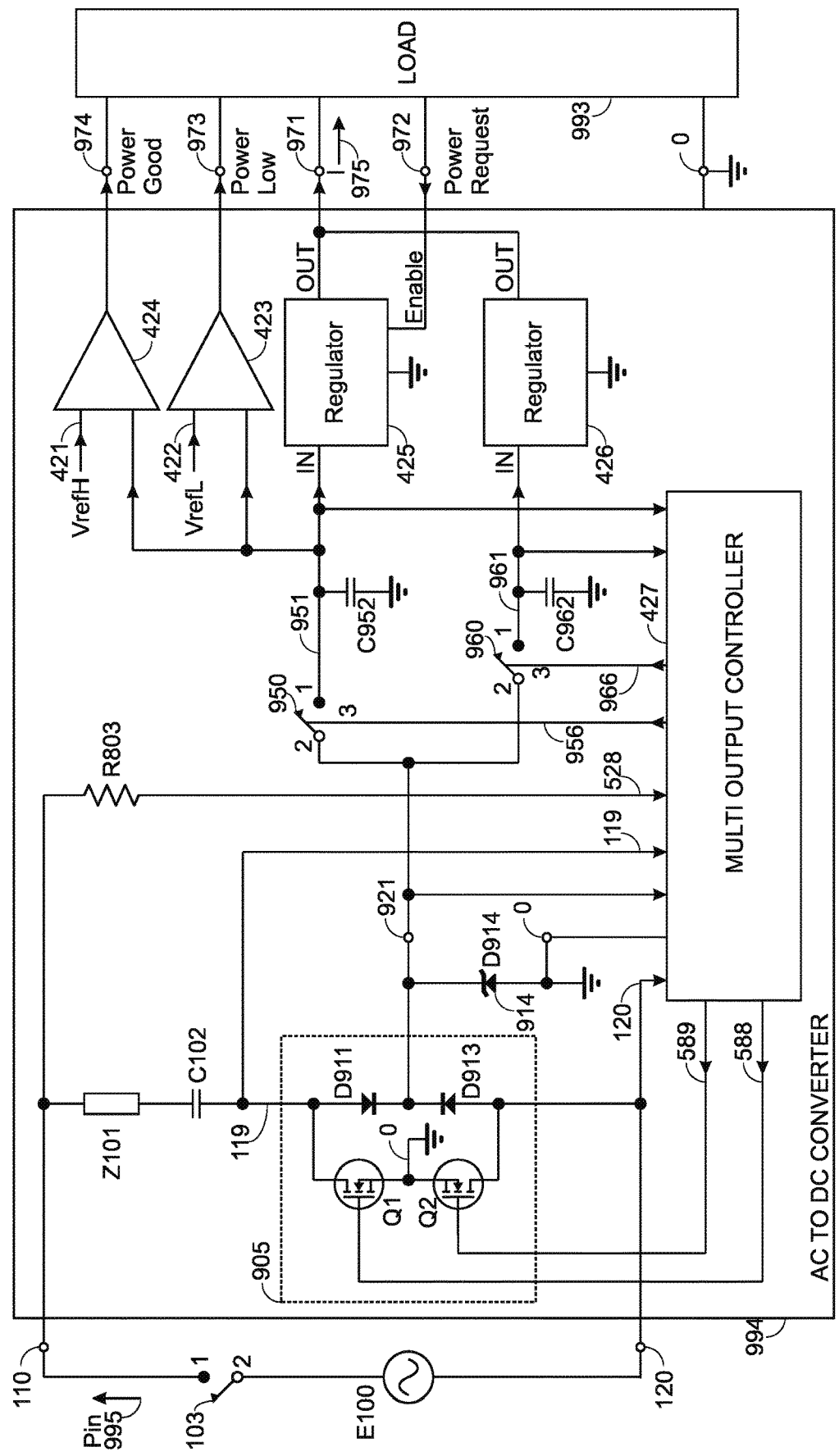
FIG. 62 is a simplified illustration of a multi output AC to DC converter connected in parallel to a load according to an example embodiment of the invention.

Reference is now made to FIG. 62 which is a simplified illustration of a multi output AC to DC converter connected in parallel to a load according to an example embodiment of the invention.

The description of FIG. 62 is similar to the description of FIG. 60, where Multi-Output-Controller 429 was replaced with a Multi-Output-Controller 427 of FIG. 60, two comparators 423 and 424 were added, and two regulators (Regulators 425, 426) are feeding DC output 971 from the energy stored in capacitors C962 and C952, respectively.

In addition to FIG. 60, FIG. 62 describes a load 993 which is fed by AC to DC converter 994. Regulators 425 and 426 can be linear regulators (optionally LDO type—Low Drop-Out regulator) and/or SMPS (Switch Mode Power Supply). Regulator 426 supplies the output energy during standby condition of load 923. According to load 993 request (by enabling regulator 425 through line 972—Power Request—PR), regulator 425 transfers the energy stored in capacitor C952 to output 971. This technique allows feeding a high power pulse to load 993. Since the high power capabilities depends on the energy stored in capacitor C952, comparator 424 indicates to load 993 through line 974 (Power Good—PG) when capacitor C952 is fully loaded and comparator 423 indicates to load 993 through line 973 (Power Low—PL) when capacitor C952 is at its minimum energy level. Outputs 973 and 974 replace outputs 954 and 964 of Multi output controller 429 of FIG. 60. The output voltage level 951 and 961 are determined according to the energy required at the output. The characteristic power consumption of load 993 is low standby power consumption with short duration of high power consumption.

In some embodiments, Internet of Things (IoT) devices can be such a load. An IoT device typically has a low standby power consumption (several uA at a DC voltage of, by way of a non-limiting example, 3V) with impulsive current consumption (during the connection with the Internet) in the range of 100 mA for a duration of, by way of a non-limiting example, several milliseconds. For example if regulators 425 and 426 are linear regulators the relations between the value of C952 and voltages 951 and 961 are optionally as follows:

$V_{Dropout426}$—The minimum dropout voltage across regulator 426 [V]

$V_{Dropout425}$—The minimum dropout voltage across regulator 425 [V]

$V_{max}$<The DC voltage across capacitor $C_{952}$ ($V_{951}$) [V]

$I_{pulse}$—The pulse current through load 993 [A]

$T_{pulse}$—the duration of $I_{pulse}$ [Seconds]

Figure 63:
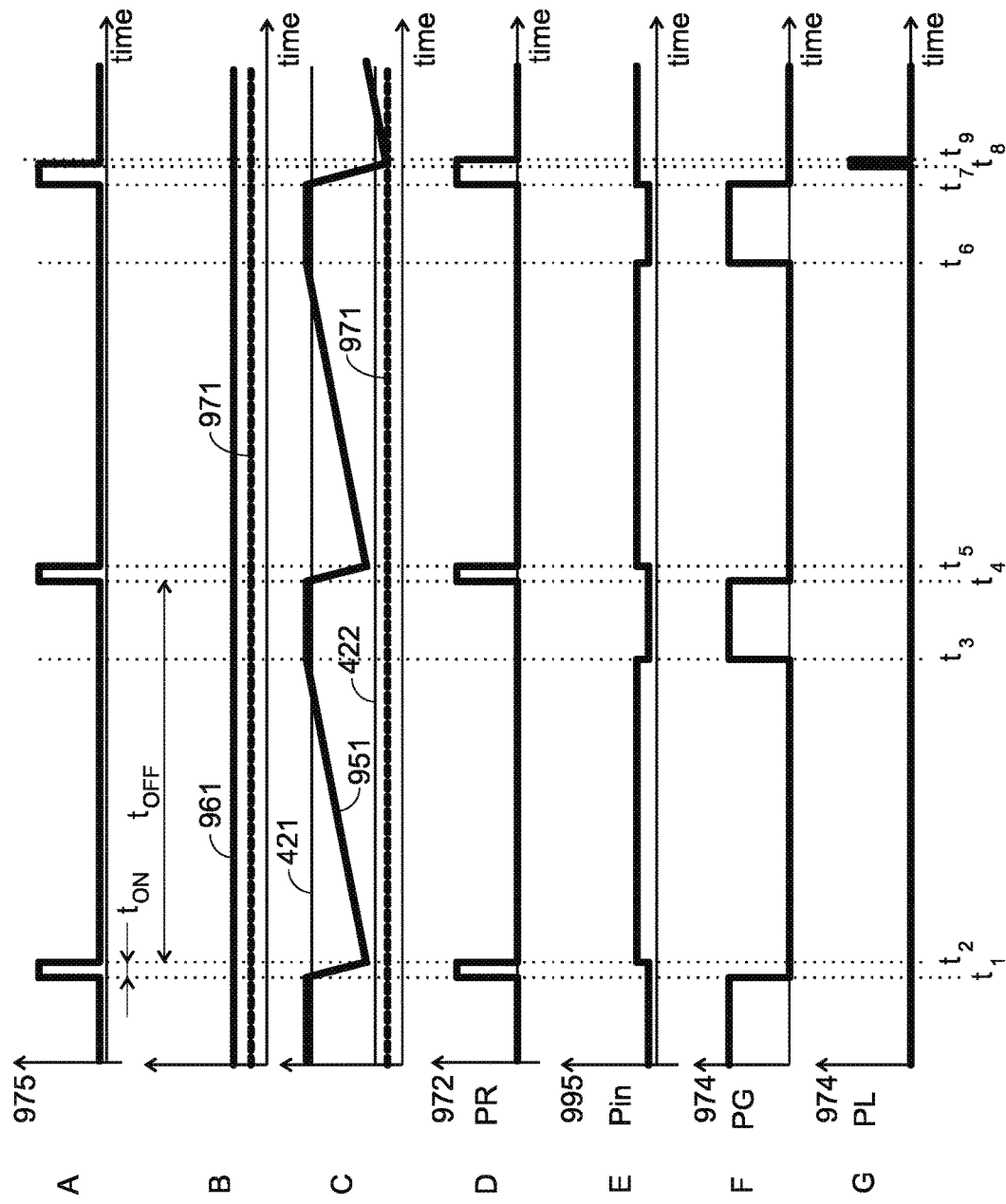
FIG. 63 shows simplified timing diagrams according to an example embodiment of the invention.

$V_{961} - V_{Dropout26} < V_{971}$ $(V_{max} - V_{971} - V_{Dropout425}) \cdot C_{952} = I_{pulse} \cdot T_{pulse}$ Reference is now made to FIG. 63, which shows simplified timing diagrams according to an example embodiment of the invention.

FIG. 63 shows timing diagrams corresponding to the example embodiment of FIG. 62.

The timing diagrams describe a case where regulators 425 and 426 are linear regulators.

Timing diagram A describes the current of load 993-$I_{975}$. $T_{ON}$ is a time of the current pulses (between $t_1 \div t_2$, $t_4 \div t_5$, and $t_7 \div t_9$). Timing of $t_7 \div t_9$ pushes the duration of the current pulse to its limit. $T_{OFF}$ is a time of the standby mode of load 993.

Timing diagram B describes output voltage 971 (with the dash line) in respect to voltage 961 which is the input voltage of regulator 426.

Timing diagram C describes output voltage 971 (with the dash line) in respect to voltage 951 which is the input voltage of regulator 425. In addition two reference voltages 421 and 422 demonstrated on the same timing diagram with the thin lines.

Timing diagram D describes a load (993) request (Power Request—PR) for high power at line 972.

Timing diagram E describes the power consumption 995 by AC to DC converter 994. It is demonstrated that the peak of the current pulse 975 is dumped. A reason for that is that capacitor C952 of FIG. 62 provides the peak current ($t1 \div t_2$, $t_4 \div t_5$, and $t_7 \div t_9$) and during the OFF time ($t_2 \div t_3$, $t_5 \div t_6$, and is-next cycle) capacitor C952 is charged again.

Timing diagram F describes Power Good—PG output. It is demonstrated that when voltage 951 falls below the level of voltage 421, output 974 falls to logic level. "0" ($t_2 \div t_3$, and $t_5 \div t_6$).

Timing diagram G describes Power Low—PL output. It is demonstrated that when voltage 951 falls below the level of voltage 422, output 974 raise to logic level "1" ($t_8 \div t_9$).

Figure 64:
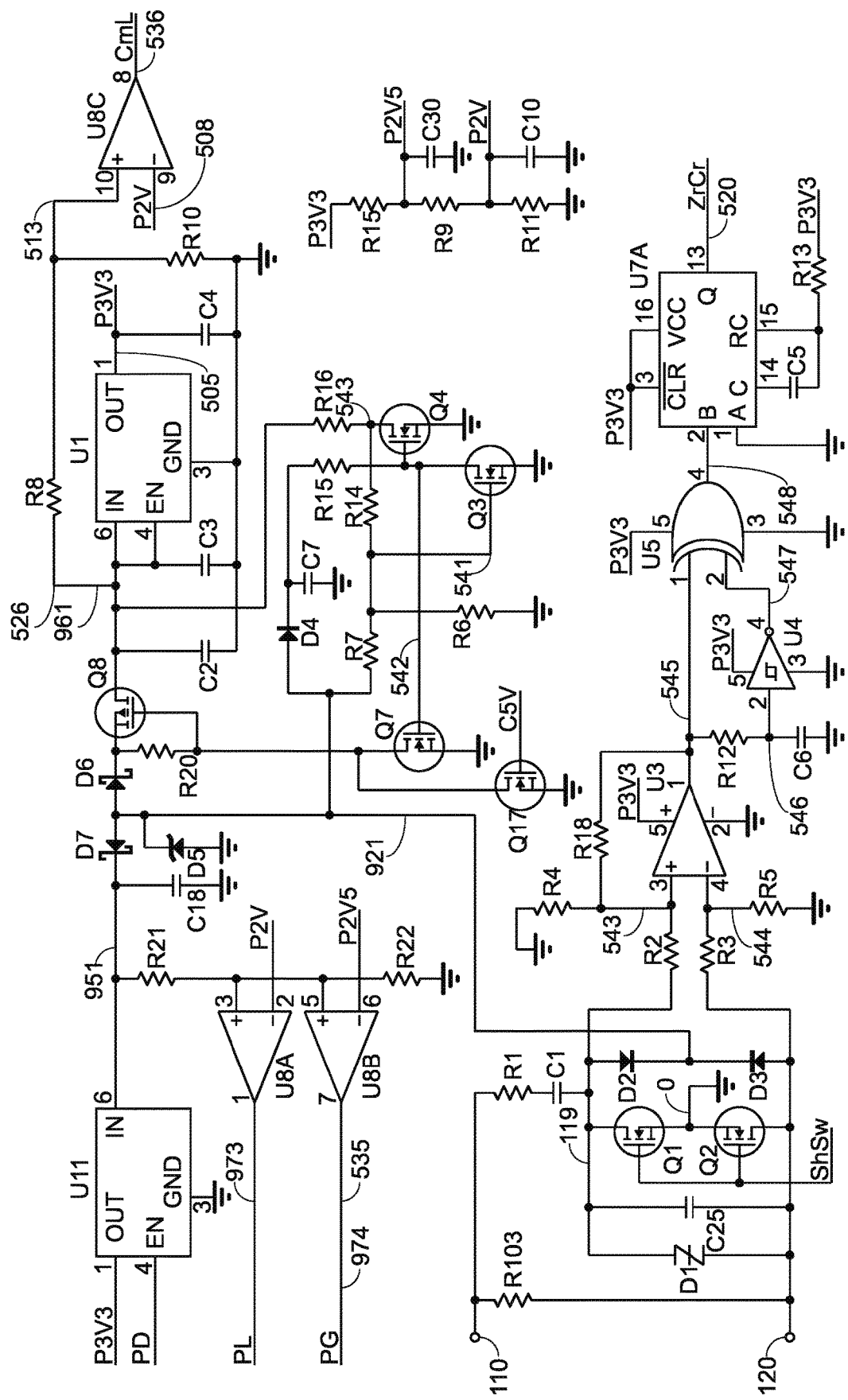
FIG. 64 and FIG. 65 are simplified illustrations of a dual output AC to DC converter according to an example embodiment of the invention.
Figure 65:
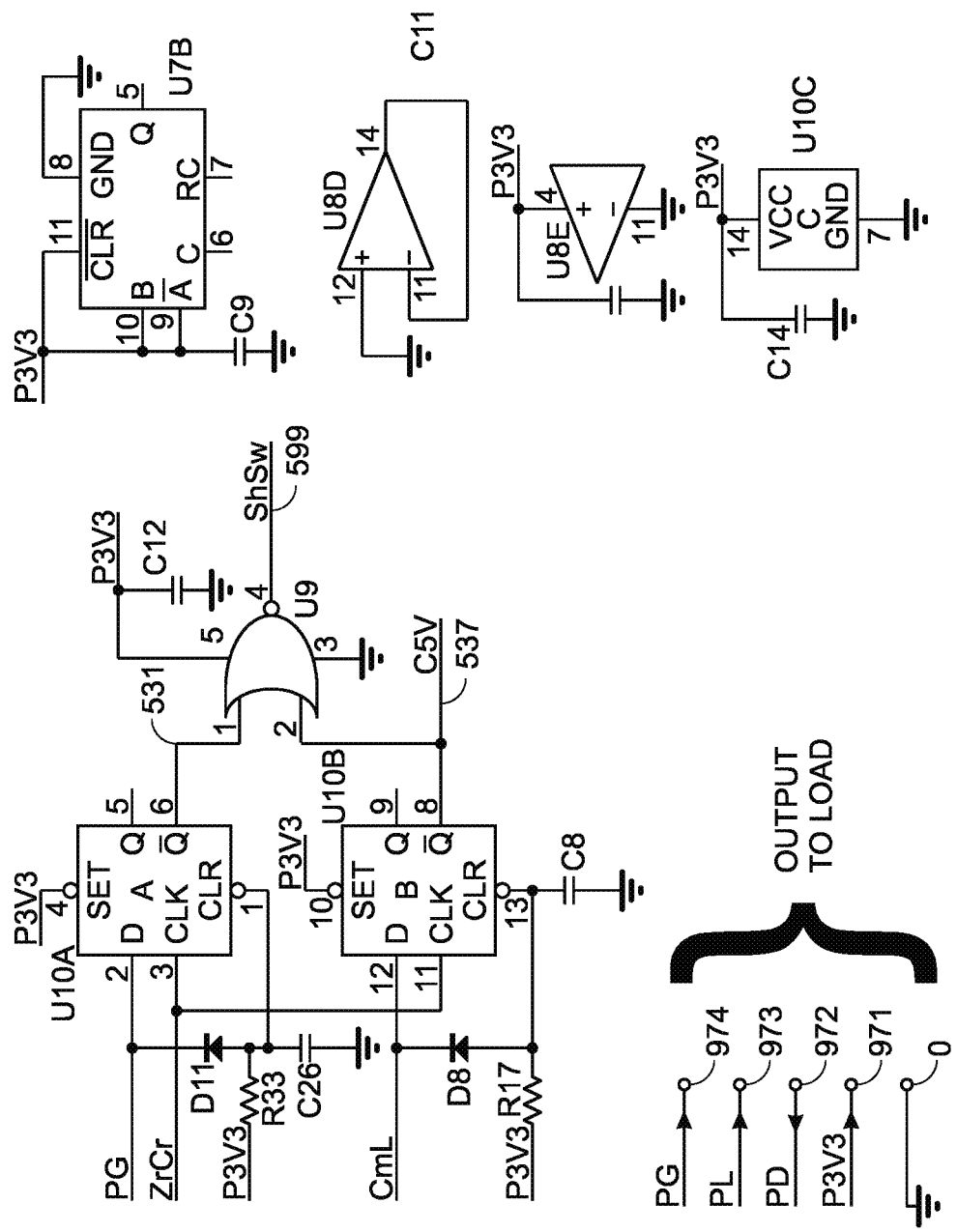

Reference is now made to FIG. 64 and FIG. 65 which are simplified illustrations of a dual output AC to DC converter according to an example embodiment of the invention.

FIG. 64 and FIG. 65 show circuits optionally suitable for driving an IoT load as described above.

FIG. 64 and FIG. 65 show circuits optionally suitable for driving an IoT load with a single supply chain By way of a non-limiting example similar to descriptions of FIG. 38, FIG. 39, and FIG. 60.

Description of operation of FIG. 64 and FIG. 65 follows similarly to the description of FIG. 38 and FIG. 39 with the following changes:

Linear regulators U1 and U11 drive the IoT load through output line P3V3. Their operation is similar to the description of regulators 426 and 425 of FIG. 62, respectively.

The operation of comparators U8A, U8B and resistors R9, R11, R15, R21 and R22 is similar to the description of comparators 423 and 424 of FIG. 62.

All the components related to relay RL1 of FIG. 38 and FIG. 39 were cancelled.

Reference is now made to FIG. 66 and FIG. 67, which show a Bill of Material (BOM) table corresponding to the example embodiments of FIG. 64 and FIG. 65.

Figure 68:
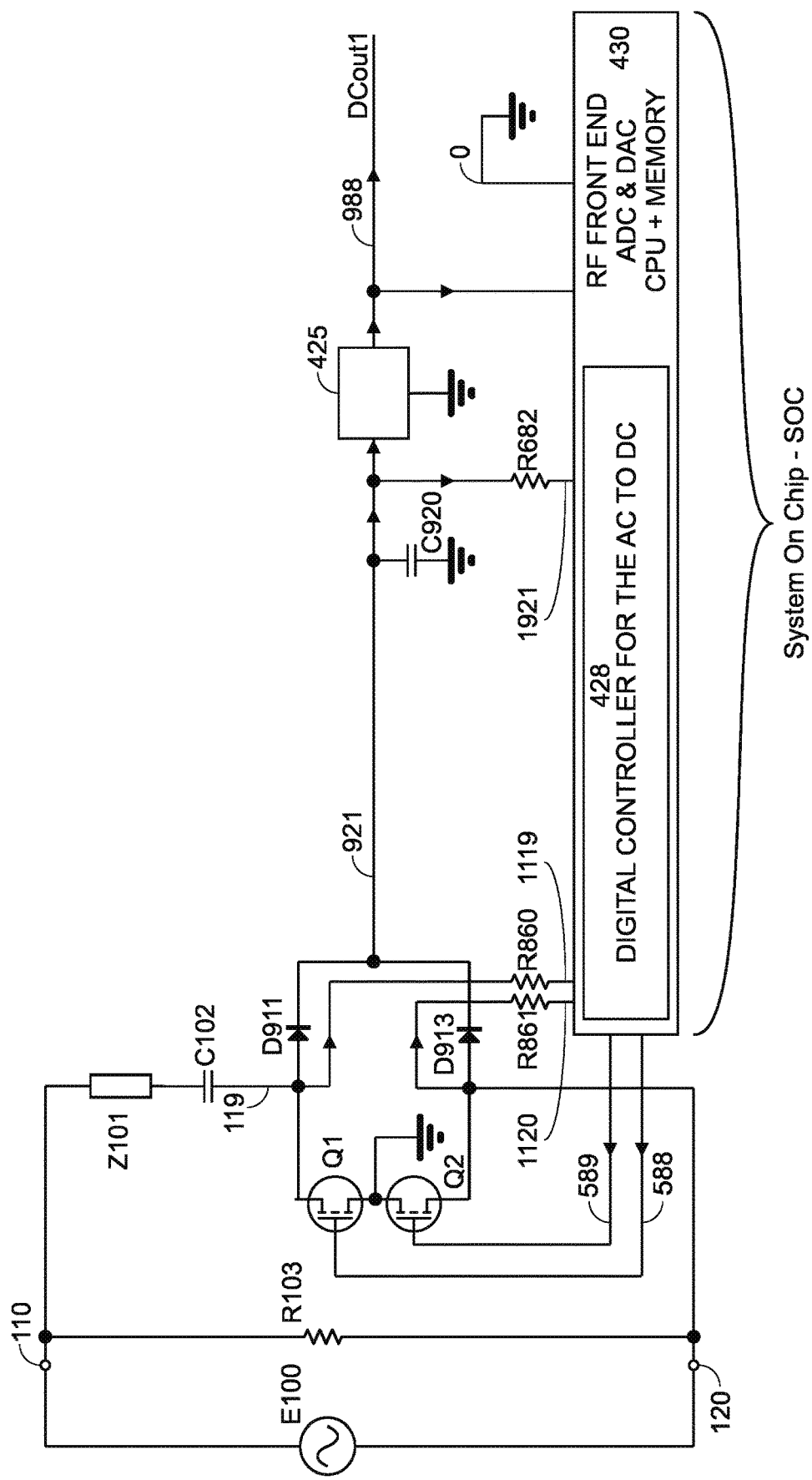
FIG. 68 is a simplified illustration of a single DC output AC to DC converter implemented with low voltage silicon technology according to an example embodiment of the invention.

Reference is now made to FIG. 68 which is a simplified illustration of a single DC output AC to DC converter implemented with low voltage silicon technology according to an example embodiment of the invention.

Description of operation of an input stage which includes of Z101, C102, Q1, Q2, D911, D913 is similar to the description provided with reference to FIG. 7D.

The digital controller 428 provides output signals 588 and 589 similarly to the description of FIG. 4A and FIG. 4B, where signals 520 and 522 in FIG. 4B are similar to signals 588 and 589 in FIG. 68 and in the description of FIG. 48.

Resistors R680, R861, R682 transfer sampled signals while protecting the silicon chip 428 and 430 against high voltage.

Voltage regulator 425, which can optionally be a linear regulator or a SMPS, reduces DC voltage from 921 toward 988 to provide operation voltage to components 428 and 430 on the silicon chip. Such an implementation on a SOC (System On Chip) demonstrate a full SOC from high power line voltage to any digital and/or analog low voltage silicon circuit with minimal external components Reference is now made to FIG. 69 which is a simplified illustration of a multiple DC output AC to DC converter implemented with low voltage silicon technology according to an example embodiment of the invention.

DC voltage for the logic components and the SOC 428 and 430 are provided similarly to the description provided with reference to of FIG. 68. A difference is with MOSFETs 950 and 960, where their operations are similar to the description provided with reference to FIG. 29. Level Shift 956 and 966 converts the logic levels of the SOC to the required voltage levels to control MOSFETS 950 and 960

Reference is now made to FIG. 70 which is a simplified illustration of a single DC output with common input output ground AC to DC converter implemented with low voltage silicon technology according to an example embodiment of the invention.

Figure 69:
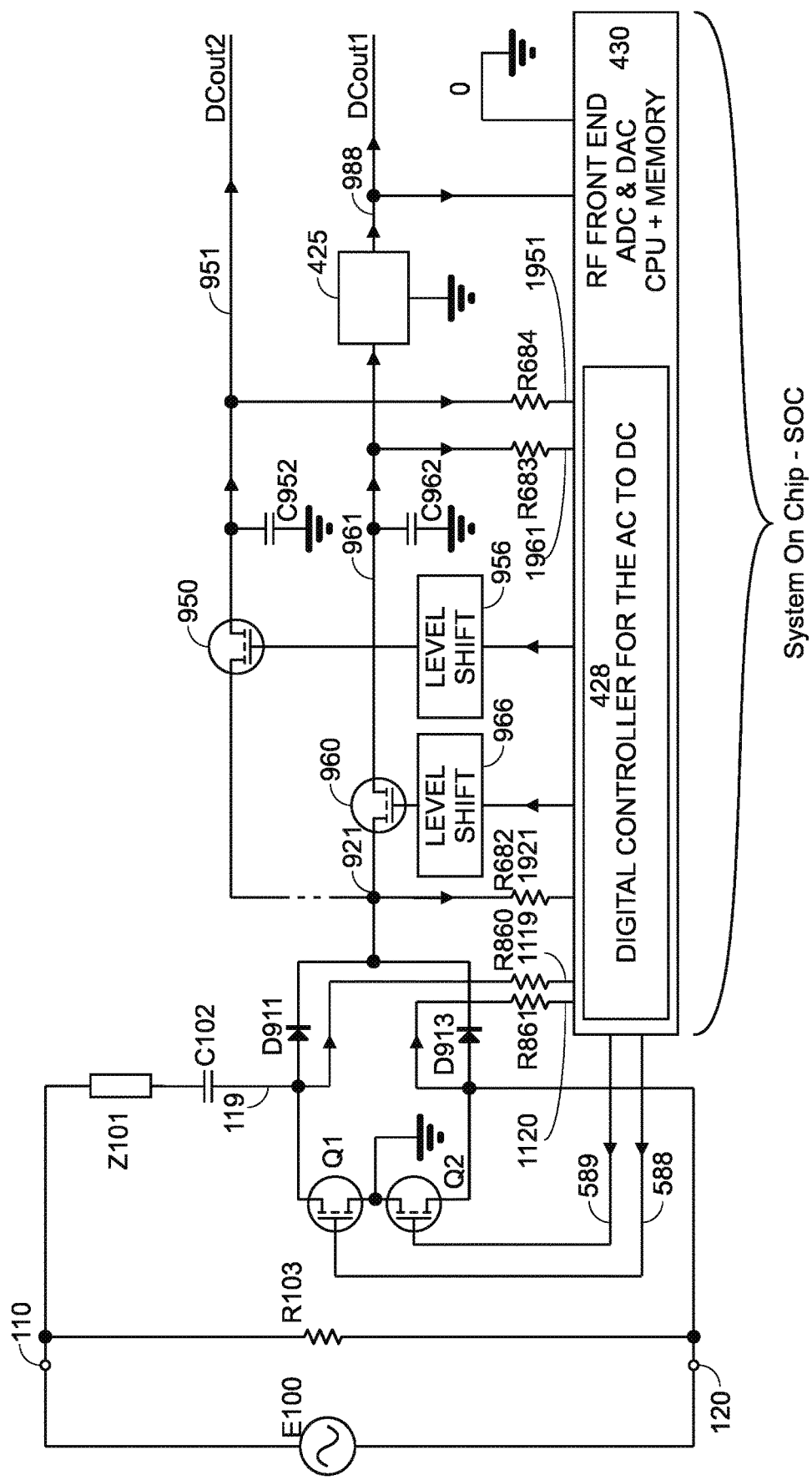
FIG. 69 is a simplified illustration of a multiple DC output AC to DC converter implemented with low voltage silicon technology according to an example embodiment of the invention.

Description of operation of FIG. 70 is similar to the description of operation of FIG. 69, one example difference being at the input stage D910, D911, Q1 and Q2, where the operation of the embodiment of FIG. 70 is similar to the description of FIG. 2B. Level shift 601 converts the logic levels of the SOC to the required voltage levels to control MOSFETS Q1 and Q2.

Reference is now made to FIG. 71 which is a simplified illustration of a multiple DC output AC to DC converter with common input output ground implemented with low voltage silicon technology according to an example embodiment of the invention.

The operation of the input stage of FIG. 71 is similar to the operation of FIG. 70 and the operation of the multiple output stage is similar to the description of FIG. 69.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device comprising:
a rectifier connected to an AC input;
a first output circuit connected to the rectifier, for providing a desired DC output;
a switch for shunting the AC input to the rectifier;
a first capacitor for charging to a first voltage of the desired DC output;
a first series switch for connecting and disconnecting a DC output of the rectifier to the first capacitor;
a second capacitor for charging to a second voltage greater than the first voltage;
a second series switch for connecting and disconnecting the DC output of the rectifier to the second capacitor;
a controller comprising:
 a first connection to the first output circuit for the controller to determine a measured output of the first output circuit;
 a second connection to the AC input for the controller to determine voltage across the AC input; and
 a command output for the controller to provide a command signal to the switch to shunt the AC input,
wherein the controller is configured for:
 monitoring the measured output of the first output circuit;
 determining if the measured output is within a first threshold range of the desired DC output;
 monitoring an instantaneous AC voltage across the AC input;
 determining if an absolute difference of the AC input from zero voltage is less than a second threshold value;
 providing the command signal to the switch to shunt the AC input when (a) the measured output is within the first threshold range of the desired DC output, and (b) the absolute difference of the instantaneous AC voltage from zero voltage is less than the second threshold value;
 monitoring a measured voltage on the first capacitor and a measured voltage on the second capacitor;
 connecting the first series switch when the measured voltage on the first capacitor falls below the first voltage and disconnect the first series switch when the measured voltage on the first capacitor is greater than the first voltage; and
 connecting the second series switch when the measured voltage on the second capacitor falls below the second voltage and disconnect the second series switch when the measured voltage on the second capacitor is greater than the second voltage.

2. The device of claim 1, further comprising:
at least a second output circuit connected to the rectifier, for providing a second desired DC output;
wherein the controller is further configured for:
monitoring a second measured output of the second output circuit;
determining if the second measured output is within a third threshold range of the second desired DC output; and
providing the command signal to shunt the AC input when (a) the measured output of the first output circuit is within the first threshold range of the desired DC output of the first output circuit, (b) the second measured output is within the third threshold range of the second desired DC output, and (c) the absolute difference of the instantaneous AC voltage from zero voltage is less than the second threshold value.

3. The device of claim 1, further comprising:
at least a second output circuit connected to the rectifier, for providing a second desired DC output.

4. The device of claim 1, wherein the desired DC output of the first output circuit is a power consumption of an IoT device.

5. The device of claim 1, further comprising: an AC input circuit which accepts incoming AC power at a voltage in a range of 85-380V from an AC source.

6. The device of claim 1, wherein the desired DC output is in a range of 800 mV-60V.

7. The device of claim 1, wherein the controller is configured for determining when the absolute difference of the instantaneous AC voltage from zero voltage will be less than the second threshold based on values from previous AC cycles.

8. A method for providing an AC input to a rectifying device comprising:
monitoring an output of a rectifier;
connecting a common ground to an input circuit and an output circuit of the rectifier;
determining if the output of the rectifier is within a first threshold range of a desired output;
monitoring an instantaneous voltage across an input of the rectifier;
determining if an absolute difference of the instantaneous voltage across the input of the rectifier from zero voltage is less than a second threshold; and
when the output of the rectifier is within the first threshold range of the desired output and the absolute difference of the instantaneous voltage across the input of the rectifier from zero voltage is less than the second threshold, then shunting the input of the rectifier;
providing a second DC output;
determining when the AC input is in a first polarity and wherein the shunting is when said AC input is in the first polarity;
determining if the output of the rectifier is within a third threshold range of the second DC output; and
when the output of the rectifier is within the third threshold range of the second DC output, the AC input is not in the first polarity and the absolute difference of the instantaneous voltage across the input of the rectifier from zero voltage is less than the second threshold, then further shunting the input of the rectifier.

9. The method of claim 8, further comprising determining when the absolute difference of the instantaneous voltage across the input of the rectifier from zero voltage will be less than the second threshold using stored values based on values from previous AC cycles.

10. The method according to claim 9, wherein a voltage of the second output is greater than a voltage of the desired output, the method further comprising:
monitoring voltage on the desired output;
monitoring voltage on the second DC output;
connecting the second DC output to the desired output through a DC to DC converter to boost the desired output.

11. A device comprising:
a rectifier connected to an AC input;
a first output circuit connected to the rectifier, for providing a desired DC output;
a switch for shunting the AC input to the rectifier;
a first capacitor for charging to a first voltage of the desired DC output wherein the AC input and a channel of the first output circuit are referred to a common ground;
a controller comprising:
a first connection to the first output circuit for the controller to determine a measured output of the first output circuit;
a second connection to the AC input for the controller to determine voltage across the AC input; and
a command output for the controller to provide a command signal to a switch to shunt the AC input,
wherein the controller is configured for:
monitoring the measured output of the first output circuit;
determining if the measured output is within a first threshold range of the desired DC output;
monitoring an instantaneous AC voltage across the AC input;
determining if an absolute difference of the AC input from zero voltage is less than a second threshold value;
providing the command signal to the switch to shunt the AC input when the measured output is within the first threshold range of the desired DC output, and the absolute difference of the instantaneous AC voltage from zero voltage is less than the second threshold value.

12. The device of claim 11, further comprising: a boost circuit connecting the first output circuit to a second output circuit, the boost circuit configured for supplying energy from the second output circuit to the first output circuit.

13. The device of claim 11, wherein the desired DC output of the first output circuit is a power consumption of an IoT device.

14. The device of claim 11, further comprising: an AC input circuit which accepts incoming AC power at a voltage in a range of 85-380V from an AC source.

15. The device of claim 11, wherein the desired DC output is in a range of 800 mV-60V.

16. The device of claim 11, further comprising:
a plurality of further output circuits and
wherein the controller is further configured to change a voltage output of each of the first output circuit and the plurality of further output circuits independently by changing a timing of the shunting the AC input to the rectifier.

17. The device of claim 16, wherein the desired DC output of the first output circuit is of opposite polarity than a second desired output voltage of at least a second output circuit of the plurality of further output circuits.

18. The device of claim 17, wherein the desired DC output of the first output circuit is of positive polarity and the second desired output is of negative polarity; and
wherein the command signal to shunt the AC input is provided to adjust separately a negative polarity output of the second output circuit and a positive polarity output of the first output circuit via an action selected from a group consisting of:
shunt the AC input when a difference between the measured output of the first output circuit and the desired DC output of the first output circuit is greater than the first threshold range and the AC input is positive;
release the shunt to the AC input when the measured output of the first output circuit is less than the first voltage of the desired DC output of the first output circuit and the AC input is positive;

shunt the AC input when a second measured output of the second output circuit is less than the second desired output voltage and the AC input is negative; and release the shunt to the AC input when the second measured output is above the second desired output voltage and the AC input is negative.

19. The device of claim 16, wherein:
the controller is further configured for said providing the command signal to shunt the AC input to the device when
  a respective output of one circuit selected from the first output circuit and the further plurality of outputs circuits is within a respective threshold range of the one circuit,
  the absolute difference of the AC input from zero voltage is less than a second threshold value and
  a polarity of the AC input directs rectifier output to the one circuit.

* * * * *